US012299385B2

United States Patent
Tran

(10) Patent No.: US 12,299,385 B2
(45) Date of Patent: *May 13, 2025

(54) MACHINE CONTENT GENERATION

(71) Applicant: Bao Tran, Saratoga, CA (US)

(72) Inventor: Bao Tran, Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,790

(22) Filed: Jul. 11, 2023

(65) Prior Publication Data

US 2023/0351102 A1    Nov. 2, 2023

Related U.S. Application Data

(63) Continuation of application No. 17/582,852, filed on Jan. 24, 2022, now Pat. No. 11,748,555.

(60) Provisional application No. 63/140,774, filed on Jan. 22, 2021.

(51) Int. Cl.
| | | |
|---|---|---|
| G06F 40/137 | (2020.01) | |
| G06F 40/169 | (2020.01) | |
| G06N 20/00 | (2019.01) | |
| G06F 21/10 | (2013.01) | |
| G06F 40/30 | (2020.01) | |

(52) U.S. Cl.
CPC .......... *G06F 40/169* (2020.01); *G06F 40/137* (2020.01); *G06N 20/00* (2019.01); *G06F 21/105* (2013.01); *G06F 40/30* (2020.01)

(58) Field of Classification Search
None
See application file for complete search history.

(56) References Cited

U.S. PATENT DOCUMENTS

| | | | |
|---|---|---|---|
| 7,716,581 B2 | 5/2010 | Tran | |
| 8,295,471 B2 | 10/2012 | Spottiswoode | |
| 8,386,350 B2 | 2/2013 | Plow | |
| 9,990,351 B2 | 6/2018 | Tran | |
| 10,195,513 B2 | 2/2019 | Tran | |
| 2008/0004904 A1 | 1/2008 | Tran | |
| 2010/0145678 A1* | 6/2010 | Csomai | G06F 40/169 |
| | | | 704/10 |
| 2012/0141959 A1 | 6/2012 | von Ahn Arellano | |
| 2013/0317994 A1 | 11/2013 | Tran | |
| 2016/0092405 A1* | 3/2016 | Lee | G06F 40/186 |
| | | | 715/202 |
| 2018/0232361 A1* | 8/2018 | Schick | G06F 40/137 |

(Continued)

OTHER PUBLICATIONS

Priya Shree, "The Journey of Open AI GPT models", Nov. 9, 2020, Walmart Global Tech Blog, pp. 1-20. (Year: 2020).*

(Continued)

*Primary Examiner* — Ariel Mercado-Vargas
(74) *Attorney, Agent, or Firm* — PatentPC PowerPatent

(57) ABSTRACT

Computerized systems and methods are disclosed to generate a document from one or more first and second text prompts, generating one or more context-sensitive text suggestions using a transformer with an encoder on the text prompts and a decoder that produces a text expansion to provide the context-sensitive text suggestions based on the one or more first and second text prompts by applying generative artificial intelligence with token biased weights for zero-shot, one-shot or some-shot generation of the artificial intelligence context-sensitive text suggestions from the one or more first and second text prompts.

19 Claims, 19 Drawing Sheets

(56) References Cited

U.S. PATENT DOCUMENTS

| | | | | |
|---|---|---|---|---|
| 2019/0340217 | A1 | 11/2019 | Tran | |
| 2020/0034432 | A1 | 1/2020 | Jain | |
| 2020/0125574 | A1* | 4/2020 | Ghoshal | G06F 3/0484 |
| 2020/0293605 | A1* | 9/2020 | Nelson | G06N 20/00 |
| 2021/0081411 | A1* | 3/2021 | Begun | G06F 16/248 |
| 2021/0192140 | A1* | 6/2021 | Galley | G06F 3/167 |
| 2021/0248474 | A1* | 8/2021 | Baker | G06N 3/045 |
| 2021/0374603 | A1* | 12/2021 | Xia | G06N 3/045 |
| 2022/0067486 | A1* | 3/2022 | Klein | G06N 3/084 |
| 2022/0075929 | A1* | 3/2022 | Booth | G06F 40/284 |

OTHER PUBLICATIONS

Vaswani et al, Attention Is All You Need, arXiv:1706.03762v5 [cs.CL] Dec. 6, 2017.

Devlin et al, BERT: Pre-training of Deep Bidirectional Transformers for Language Understanding, arXiv:1810.04805v2 [cs.CL] May 24, 2019.

Horev, BERT Explained: State of the art language model for NLP, https://towardsdatascience.com/bert-explained-state-of-the-art-language-model-for-nlp-f8b21a9b6270 Nov. 10, 2018.

Alammar, The Illustrated Transformer, http://jalammar.github.io/illustrated-transformer/ , Jun. 27, 2018.

Kitaev et al, Reformer: the Efficient Transformer, ICLR 2020.

Beltagy, Longformer: The Long-Document Transformer, arXiv:2004.05150v1 [cs.CL] Apr. 10, 2020.

Clark et al, Electra: Pre-Training Text Encoders as Discriminators Rather Than Generators, 2020 International Conference on Learning Representation.

Yao, Reformer, Longformer, and Electra: Key Updates to Transformer Architecture in 2020 https://www.topbots.com/key-updates-to-transformer-architecture-2020/, Jun. 2, 2020.

Balog et al, Deepcoder: Learning to Write Program, arXiv:1611.01989v2 [cs.LG] Mar. 8, 2017.

Ye et al, MISIM: An End-to-End Neural Code Similarity System, arXiv:2006.05265v2 [cs.LG] Jun. 15, 2020.

Radford, Language Models are Unsupervised Multitask Learners, https://github.com/openai/gpt-2 2019.

Von Platen, How to generate text: using different decoding methods for language generation with Transformers, blog at https://huggingface.co/blog/how-to-generate, Mar. 18, 2020.

Roller et a,, Recipes for building an open-domain chatbot, arXiv:2004.13637v2.

Kent, Animating gAnime with StyleGAN: Part 1, Oct. 27, 2019 , https://towardsdatascience.com/animating-ganime-with-stylegan-part-1-4cf764578e, Apr. 30, 2020.

Kelvin Guu et al, REALM: Retrieval-Augmented Language Model Pre-Training, arXiv:2002.08909 (Feb. 10, 2020) at https://arxiv.org/abs/2002.08909.

* cited by examiner

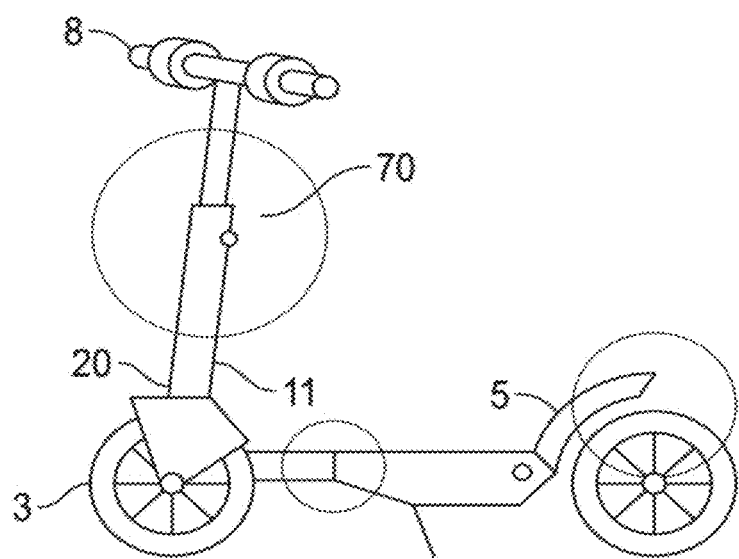
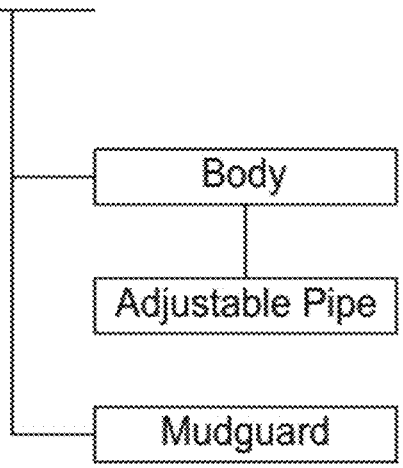
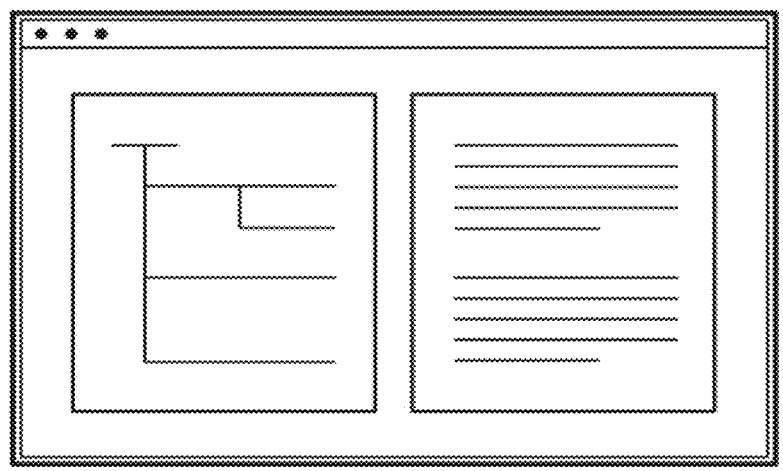
FIG. 1F

FIG. 2A

| |
|---|
| Provide a document structure having one or more seed landmark texts therein, each landmark text including a milestone overview text and a plurality of component texts |
| From the milestone overview text, generating one or more computer-generated text suggestions to supplement the milestone overview text |
| Combine the milestone overview text with each component text and generating one or more computer-generated component text suggestions, and |
| Create the document by combining the milestone overview, the one or more computer-generated text suggestions, and each component text with corresponding one or more computer-generated component text suggestions |

FIG. 2B

| |
|---|
| A sentence tokenizer splits the text into set of sentences |
| After tokenization, a representation for sentences is done. The system uses is the Skip- Thought Encoder where the representations encode the inherent semantics and meaning of the corresponding sentence. The Skip-Gram Word2Vec is method for generating the embeddings for words. A weighted average of the words in the sentences is used to form the sentence embedding |
| To put the sequence of words in account, the Skip-Thought sentence encoder is used with two parts, an encoder and a decoder. The encoder part is a GRU-RNN which generate a fixed length vector for each sentence. The decoder part takes the vector representation as an input and tries to generate two sentences (the next and the previous to it) |
| The encoder-decoder network is trained to minimize the sentence reconstruction loss, so that after training the encoder can produce representation of semantically similar sentence that are closer to each other |
| After generating the embedding, the next step is to cluster them into a pre-defined number of clusters. The number of cluster represents the desired number of sentences in the summary |

FIG. 2C

| |
|---|
| Provide a document structure having one or more chapters and for each chapter add a seed brief descriptive text for the chapter and add a plurality of sub-plot texts for the chapter |
| For each chapter:<br><br>    From the seed brief descriptive text, generating one or more computer-generated text suggestions to supplement the seed brief descriptive text to form a second brief descriptive text<br><br>    For each sub-plot text, generate one or more computer-generated component text suggestions based on the second brief descriptive text and each component text; and |
| Create the document by combining each second brief descriptive text with each component text with corresponding one or more computer-generated component text suggestions |

FIG. 2D

| |
|---|
| Provide a storyboard structure having one or more pictures therein and for each picture add a seed brief descriptive text for the picture and add a plurality of sub-plot texts for the picture |
| For each picture:<br><br>    From the seed brief descriptive text, generating one or more computer-generated text and computer-generated image suggestions to supplement the seed brief descriptive text to form a second brief descriptive text<br><br>    For each sub-plot text, generate one or more computer-generated component text suggestions and corresponding pictures based on the second brief descriptive text and each component text; and |
| Create the storyboard by combining each second brief descriptive text with each component text with corresponding one or more computer-generated component text and computer-generated image suggestions |

FIG. 2E

| |
|---|
| Provide a document structure having one or more pictures and for each picture add a seed brief descriptive text for the picture and add a plurality of component texts like a part-list for the picture; |
| For each picture:<br><br>    From the seed brief descriptive text, generating one or more computer-generated text suggestions to supplement the seed brief descriptive text to form a second brief descriptive text;<br><br>    For each component text, generate one or more computer-generated component text suggestions based on the second brief descriptive text and each component text; and |
| Create the document by combining each second brief descriptive text with each component text with corresponding one or more computer-generated component text suggestions |

FIG. 2F

| |
|---|
| Provide a document structure having one or more pictures and for each picture add a seed brief descriptive text for the picture and add a plurality of component texts like a part-list for the picture; |
| For each picture:<br><br>    From the seed brief descriptive text, generating one or more computer-generated text suggestions to supplement the seed brief descriptive text to form a second brief descriptive text;<br><br>    For each component text, generate one or more computer-generated component text suggestions based on the second brief descriptive text and each component text; and |
| Create the document by combining each second brief descriptive text with each component text with corresponding one or more computer-generated component text suggestions |

FIG. 2G

| |
|---|
| Select deep neural network architecture (for example, retrieval, generative, and retrieve/refine, transformer-based, BERT-based, GPT-based, among others) for a learning machine |
| Train the learning machine with data that is logically grouped or clustered to provide context and accuracy (for example, by technology field or by industry/specialization; by computer code such as ASIC code, database code, html code, neural network code; by type of writing, by type of novel or movie them such as Mysteries, Romance, Thriller, Science Fiction, Fantasy, Historical Fiction, among others) |
| Gather customization information from user by interacting with the user and request DNN to generate context sensitive text suggestion |
| Determine the trained group or cluster best matching the customization information and apply the customization information to bias the learning machine to generate context-sensitive responses that are realistic in terms of accuracy and depth |

FIG. 2H

| |
|---|
| Identify the international patent classification (IPC) code:<br>    A) Ask user to indicate or select IPC with graphical user interface, or<br>    B) Auto detect IPC from contextual data |
| Token Bias Process |
| Train BERT (or similar transformer) to classify sections of patent text (title, summary, abstract, technology field, ...) to predict an IPC |
| Given user contextual data (title, summary, abstract, technology field, ...), predict likely IPC |
| Assign token values to each IPC class (outside of vocabulary) |
| Tokenize input text |
| Prepend IPC token to input block  - This has the effect of notifying the model at train and generation time of the IPC class at each forward pass, thus biasing predictions towards IPC-specific outputs |

FIG. 2I

| |
|---|
| Collate all contextual data (title, claims, abstract, field of invention, ...) |
| Tokenize context via model tokenizer |
| Determine token frequencies as map {token : freq} |
| At generation step, augment token sampling probabilities using a predetermined policy, for example:<br>  P = sampling probability distribution over all tokens in vocabulary<br>  i = initial token prob given prompt<br>  f = frequency of token in context<br>  d = high-frequency damper (0-1 for damping effect, >1 for emphasis)<br>  a = augmentation constant (user selected)<br>  overwrite i:<br>    i <= (i*(f^d)) * a<br>  (This has the effect of selectively biasing generation of more frequent tokens) |
| Re-normalize P s.t. sum(P) == 1 (required for sampling):<br>    P_aug <= softmax(P) |
| Sample next token using P_aug instead of P |

FIG. 3A

| |
|---|
| Select deep neural network architecture (for example, retrieval, generative, and retrieve/refine, transformer-based, BERT-based, GPT-based, among others) for a learning machine |
| Collect training data and update on periodic basis:<br>    Store non-public information into a database from a site desiring to have a chatbot to answer questions, including CRM databases for common user questions and non-public product maintenance or service information for products<br>    Crawl web site of the company desiring to have the chatbot to answer questions to extract user manuals, frequently asked questions (FAQs) and question and answers (Q&As), and all publicly available text<br>    Crawl fan sites or product review sites for information about company / product /service<br>    Crawl competitor sites to extract industry text<br>    Crawl the internet for any mention of the company name or product names including negative reviews and flag such reviews for company responsive text as training data |
| Train learning machine with data that is logically grouped or clustered to provide context and accuracy (for example, by technology field; by product; by customer type (engineers, housewife, student, ..., or by industry/specialization, etc) and periodically update training with new data |
| Gather customization information from user by interacting with the user and retrieving prior interactions with the user and prior purchases and complaints/returns by the user |
| Determine the trained group or cluster best matching the customization information and apply the customization information to bias the learning machine to generate context-sensitive chats that are optimized to answer or interact with the user |
| Detect user emotions during the interaction based on user facial expression (periodic sampling of camera image and/or verbal expression), or based on text response by user, or by explicit happiness rating next to the chat box text entry space |
| If user is satisfied with the interaction based on detected emotion, continue responding/chatting |
| If user is dissatisfied based on detected emotion, request opportunity to have a company person to follow up at later time, or optionally select a call-center agent best matched to the user profile or need and transfer to selected agent at a call center |

FIG. 3B

| |
|---|
| Select deep neural network architecture (for example, retrieval, generative, and retrieve/refine, transformer-based, BERT-based, GPT-based, among others) for a learning machine |
| Collect training data and update on periodic basis:<br>    Store non-public information into a database from a site desiring to have a chatbot to answer questions, including CRM databases for common user questions and non-public product maintenance or service information for products, and CRM databases for customer profiles and agent profiles and customer-agent interaction profiles<br>    Crawl web site of the company desiring to have the chatbot to answer questions to extract user manuals, frequently asked questions (FAQs) and question and answers (Q&As), and all publicly available text<br>    Crawl fan sites or product review sites for information about company / product /service<br>    Crawl competitor sites to extract industry text<br>    Crawl the internet for any mention of the company name or product names including negative reviews and flag such reviews for company responsive text as training data |
| Train learning machine with data that is logically grouped or clustered to provide context and accuracy (for example, by customer profile; by agent grade/performance, by agent-caller interaction history; by technology field; by product; by customer type (engineers, housewife, student, ..., or by industry/specialization, etc) and periodically update training with new data |
| Gather customization information from user by interacting with the user and retrieving prior interactions with the user and prior purchases and complaints/returns by the user |
| Determine the trained group or cluster best matching the customization information and apply the customization information to bias the learning machine to generate context-sensitive chats that are optimized to answer or interact with the user |
| Route caller to select agent based on trained learning machine |
| Detect user emotions during the interaction based on user facial expression (periodic sampling of camera image and/or verbal expression), or based on text response by user, or by explicit happiness rating next to the chat box text entry space |
| If user is satisfied with the interaction based on detected emotion, continue agent-caller interaction |
| If user is dissatisfied based on detected emotion, select another call-center agent best matched to the user profile or need and transfer to new selected agent or supervisor (escalation of service) |

FIG. 3C

| |
|---|
| Select deep neural network architecture (for example, retrieval, generative, and retrieve/refine, transformer-based, BERT-based, GPT-based, among others) for a learning machine |
| Collect training data<br>    Gather customization information from user by collecting web site map and proposed web site content for new web site design, or by crawling an existing web site, focusing on frequently asked questions (FAQs) and question and answers (Q&As) and all publicly available text<br>    Gather marketing input including marketing positioning, top keywords/semantic concept/questions to be ranked from SEO tools identifying top keywords are being used and what questions are being asked to create high quality content (system can handle target keywords with accurate keyword volume and difficulty metrics)<br>    Crawl competitor sites to extract industry text<br>    Crawl the internet for any mention of the company name or product names |
| Train the learning machine with data that is logically grouped or clustered to provide context and accuracy (for example, by technology field; by product; by customer type (engineers, housewife, student, ..., or by industry/specialization, etc) |
| Determine the trained group or cluster best matching the customization information and apply the customization information to bias the learning machine to generate context-sensitive structured data markup. |
| Generate proposed web content that anticipates answers and solutions in the content and grow the authority of the domain |
| Generate Semantic Knowledge Mapping and schema markup for crawlers to use |
| Test SEO performance, and generate new text and repeat until SEO performance reaches a predetermined target |

FIG. 3D

| |
|---|
| Select deep neural network architecture (for example, retrieval, generative, and retrieve/refine, transformer-based, BERT-based, GPT-based, among others) for a learning machine |
| Collect training data and update on periodic basis:<br>    Store non-public information into a database from a site desiring to have a chatbot to answer questions, including hospital databases for patient private data and databases containing mobile fitness tracking devices for users<br>    Crawl web sites of WHO, government agencies, and predetermined reputable internet publishing sites, recognized research magazines or established research institutions knowledgeable about infectious diseases to extract instructions, frequently asked questions (FAQs) and question and answers (Q&As), and all publicly available text<br>    Crawl the internet for any mention of solutions/methods/product names, and mark negative reviews from trusted resources or SEO designed fake news links as training data for negative answers |
| Train learning machine with data that is logically grouped or clustered to provide context and accuracy (for example, by age, sex, race, home location, health history, social economics, risks for lung or breathing diseases etc) and periodically update training with new data |
| Gather customization information from user by collecting recent data from mobile fitness devices and by interacting with the user and retrieving prior interactions with the user and prior health reports by the user, as well as by the clusters of people the user is affiliated with |
| Determine the trained group or cluster best matching the health condition information and apply the customization information to bias the learning machine to generate context-sensitive chats that are optimized to answer or interact with the user regarding symptoms |
| Detect user emotions during the interaction based on user facial expression (periodic sampling of camera image and/or verbal expression), or based on text response by user, or by explicit happiness rating next to the chat box text entry space |
| If user is satisfied with the interaction based on detected emotion, continue responding/chatting |
| If user appears ill, upset or exhibits unusual behaviors not observed before, request opportunity to have a health professional to follow up at later time, or optionally select a call-center agent best matched to the user profile or need and transfer to selected agent at a call center |

Encoder Block
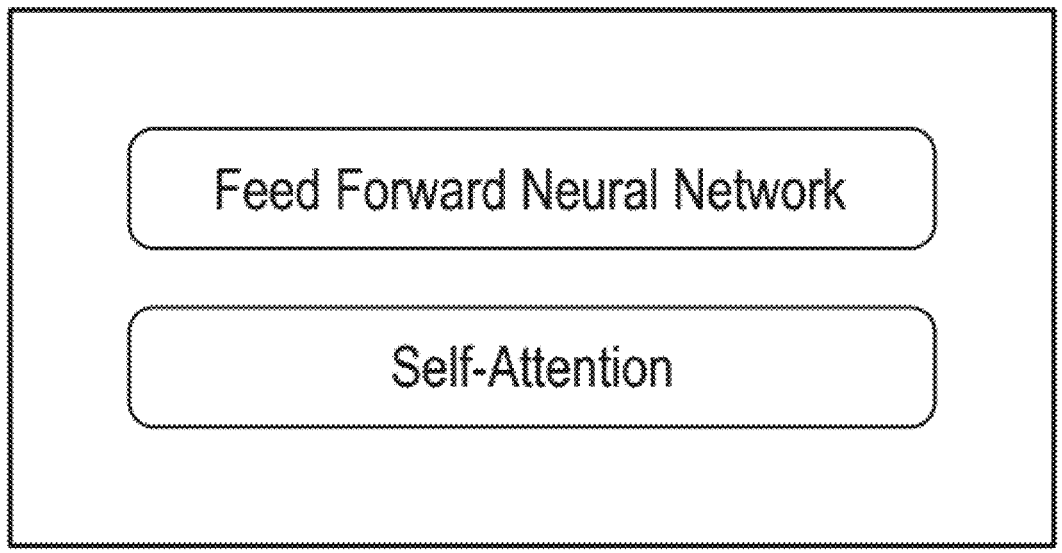
Encoder Block
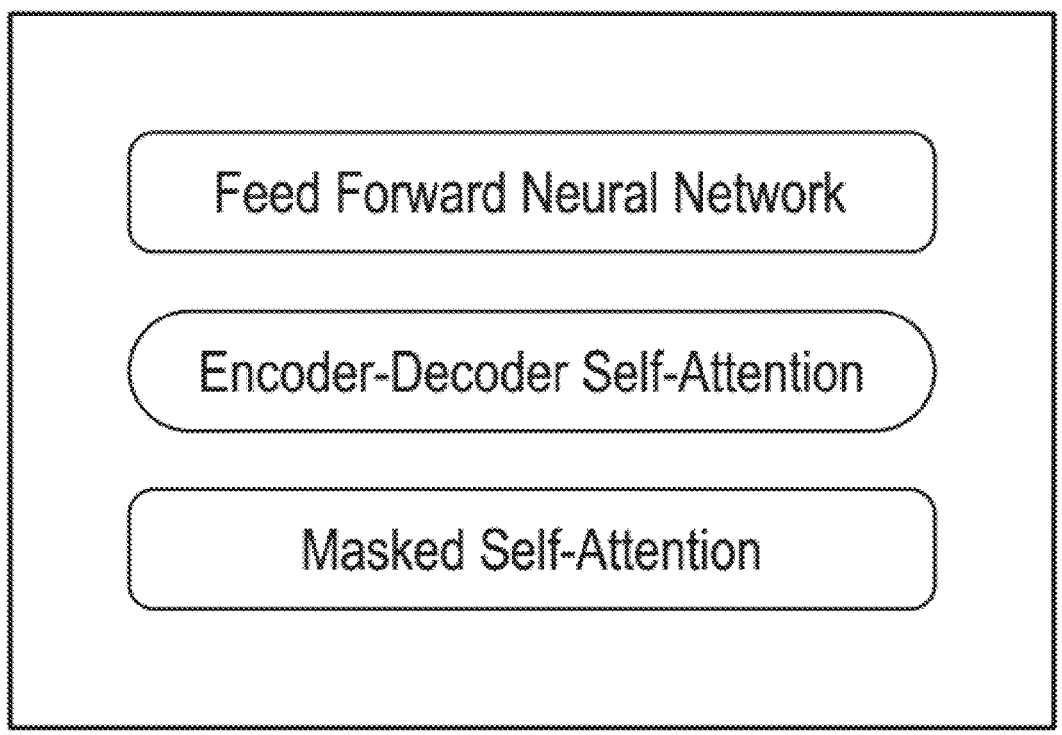
FIG. 4C

Scaled Dot-Product Attention

Multi-Head Attention

| Provide an on-line creative work generation tool to the student to draft and submit a creative work as part of a class requirement or graduation requirement |
|---|
| Receive a completed creative work and checking creative work quality and upon passing acceptant criteria, funding at least a portion of educational expenses for the student |

FIG. 5A

| Provide an on-line creative work generation tool to the student to draft and submit a creative work as part of a class requirement or graduation requirement |
|---|
| Crowd-sourced quality assurance of the student's creative work by having other students in the class rate, review and critique the creative work |
| Crowd-sourced quality assurance of the student's creative work by having the teacher or professor or industry expert rate, review and critique the creative work |
| receiving a completed creative work and checking creative work quality and upon passing acceptant criteria, rewarding the student or the institution to offset educational expenses for the student |
| Pool the creative works to bundles of rights for commercialization with companies |

FIG. 5B

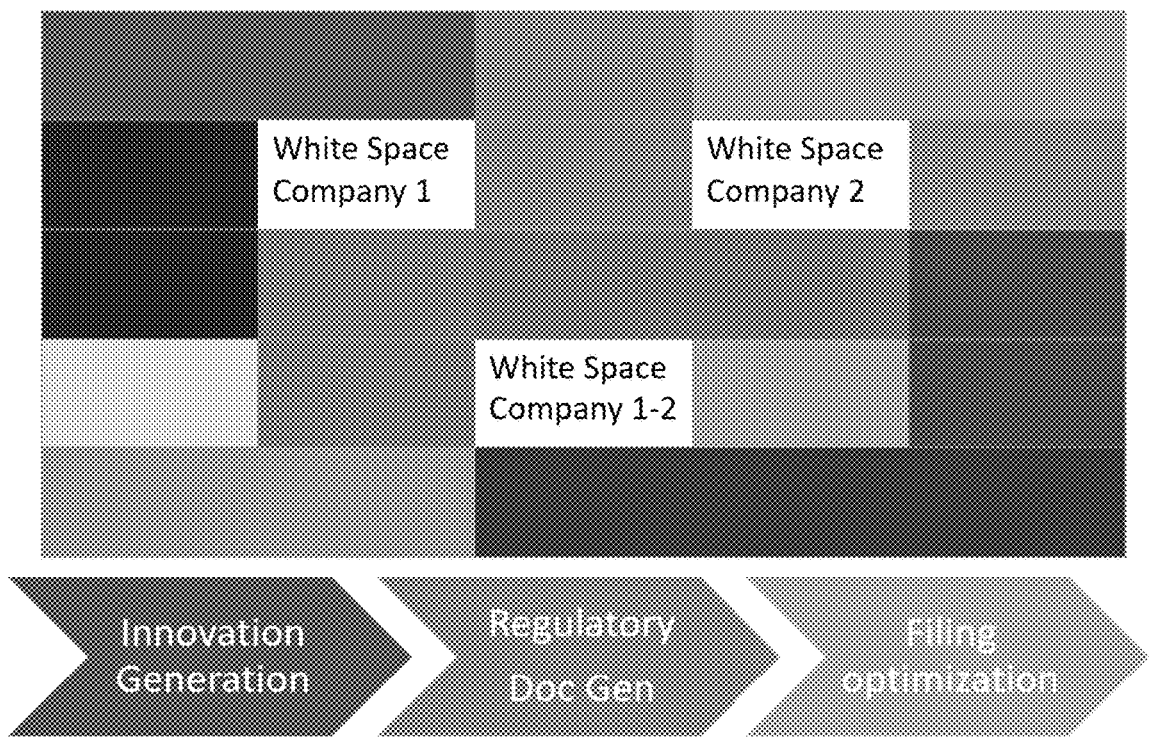

FIG. 5C

MACHINE CONTENT GENERATION

The present invention relates to computer assisted or automated content generation.

BACKGROUND

Writing well is a must have skill for professionals such as poets and authors, and for corporate employees, writing one of those skills that can help a person rise above in her career. For novelists and writers, getting started can be hard. A writer is not someone who thinks obsessively about writing, or talks about it, or plans it, or dissects her writing. The terror of the white page is real for most. When such roadblocks occur, the writer can lose valuable time in completing a book on time and on-budget. Video content creators face similar issues when pitching new movie concepts to funders. FIG. 1A shows a conventional outlining method for books, while FIG. 1B shows a conventional outlining method for video/movie content. In these examples, FIG. 1A shows exemplary plans for the Harry Potter books while FIG. 1B shows a sample well-known science fiction movie storyboard.

Generating natural language from machine representation systems is a common and increasingly important function. Existing natural language generation (NLG) systems, such as translators, summarizers, dialog generators, etc., while common, cannot produce variable output based on user-desired tunable specifications. Additionally, such existing systems cannot take input in the form of a variable form of text and a variable set of specifications and output a transformed version of the input text according to the specifications. Further, such existing systems are generally not readily extendable. U.S. application No. 20200034432 mentions generating tunable stylized text (such as, for example, one or more sentences) by transforming received user text input and one or more user-originated stylistic parameters (directed to polarity of subjective opinion, such as sentiments, valence, emotions, formal, business, readability, etc.) in vector form, using unsupervised natural language processing (NLP) systems such as rule-based and/or machine learning-based classifiers and/or regressors, metric computation systems as style scorers, etc.

SUMMARY

The AI architecture herein can be used for communication, for example, to generate long text or video using the neural network architectures. In one aspect for AI content generation, computerized systems and methods are disclosed to generate a document from one or more first and second text prompts, generating one or more context-sensitive text suggestions using a transformer with an encoder on the text prompts and a decoder that produces a text expansion to provide the context-sensitive text suggestions based on the one or more first and second text prompts by applying generative artificial intelligence with token biased weights for zero-shot, one-shot or some-shot generation of the artificial intelligence context-sensitive text suggestions from the one or more first and second text prompts.

In yet another aspect, a method to generate content with a plurality of images or video includes providing a multimedia structure having one or more seed landmark images therein, each landmark image including a milestone overview text and a plurality of component texts; from the milestone overview text, generating one or more computer-generated image suggestions to supplement the landmark image; combining the milestone overview text with each component text and generating one or more computer-generated component image suggestions; and creating the content by combining the landmark image and the one or more computer-generated image suggestions.

In a further aspect, a method provides a chatbot trained with context sensitive data whose response is biased during runtime with highly customized responses and with realistic human like response is presented.

In yet another aspect, a chatbot serves in place of human agents to provide answers for customers. The bot detects user emotions and if it detects charged emotions, get help from the best matching agent to help the customer.

In yet a further aspect, a web site content generator renders AI content that is SEO optimized. The text includes ontology or semantic tags to aid a search engine in locating best matching responses that are in natural language.

Implementations of the above aspects may include one or more of the following additions to the above aspect. The document structure comprises an outline, wherein each landmark text comprises a chapter overview, and wherein the component texts comprise a chapter outline. The document comprises a fiction work, a non-fiction work, a computer readable code, a machine specification, or a mechanical description. The document structure may be one or more figures, wherein each figure comprises a brief description of the drawing, a figure description overview, and a detailed description for the figure with component texts corresponding to items in the figure. The system The system may include biasing neural network weights with the milestone overview text when generating a context-sensitive component text suggestion. The combining further may include combining a title and a background text with the one or more seed landmark texts and providing the combined title, background, and seed landmark texts to a learning machine to synthesize artificial-intelligence-generated text. The system The system may include extracting one or more references from a figure and annotating the one or more references with text; and forming one or more artificial-intelligence-generated reference text suggestions. The system The system may include performing grammar analysis and suggesting grammar correction and editing the document for conciseness. The system The system may include a transformer can use an encoder that reads the text input and a decoder that produces a prediction for the text. The transformer may be a generative pre-trained transformer (GPT). The system applies GPT (Generative Pre-trained Transformer) model or a BERT (Bidirectional Encoder Representations from Transformers) model to generate the text. The system The system may include determining when two pieces of text, component, module, code, data structure, or image perform a similar task and showing the determined text, component, module, code, data structure, or image to a user. The system may include breaking-down the milestone overview text into one or more alternate components with different component text but capable of performing the milestone overview text based on teachings from prior art documents and showing the one or more alternate components as a artificial-intelligence-generated design around satisfying the milestone overview text, wherein the breaking-down comprises applying an artificial intelligence software to detect similarity of functions. The system may include detecting plagiarism in the document by matching the document text to text crawled from the Internet. The system may include generating a part list by detecting noun phrases (NPs) in the document and corresponding numbers for the NPs. The system may include generating a list of claimed elements. The system may include generating a list of unclaimed elements. The document may be part of a portfolio accessible to one or more licensees. The system may include granting rights to the document and/or guiding text generation with a chatbot. The system may include generating context-sensitive text by: training a learning machine architecture (LMA) a corpus on a specific domain (such as engineering, medical, chemical, patent), wherein the architecture can be BERT, GPT, or a suitable network; using a first text input to retrieve a first set of documents responsive to the first text input to provide context; applying the first set of documents as input to the LMA to generate the context sensitive text. The system may include generating long form context-sensitive text by: training a learning machine architecture a corpus on a specific domain (such as engineering, medical, chemical, patent), wherein the architecture can be BERT, GPT, or a suitable network, wherein the LMA is trained on 200, 500, or 800 token frames of data; using a first text input to retrieve a first set of documents responsive to the first text input to provide context; applying the first set of documents as input to the LMA to generate the context sensitive text.

Advantages of the system may include one or more of the following. The system increases communication effectiveness. The system generates good technical writing in a time-saving manner, and the results avoid misunderstanding and increase workplace efficiency by promoting good communication between engineers and other staff. The system directs the writing to the intended audience will allow the reader to understand the content on the first read, rather than needing to ask for additional details or explanation. By understanding the audience's goal in reading the document, the system helps the writer to highlight the important data, focusing on significant supplementary or background information and bringing such information to the user to decide. Thus, the information needed for a decision, instruction or education take center stage. The system keeps the information accessible and uses the simplest and most direct language to convey the information with a neutral and professional tone. The system helps the users with diagrams or schematics where they add value and increase reader comprehension. When used, the diagrams are directly referenced within the text and clearly explained in the text. The system provides a Visual and intuitive user interface with built-in semantic and technical understanding, automatic relevant passage suggestions. The system reduces the cost of writing documents by serving as writing assistants that fill (or inbetween) details based on the abstract. For more technical descriptions where engineering details are important, the system can expand from an abstract to a full description with clarity. In other applications that demand flowery language, the efficiency of human drafters can be improved significantly when a master drafter generates a summary of the major points in the article, and the computer fills in the missing details, much similar to inbetweening of animation. The user would draw the keyframes which define the movement, then, hands the scene to a human or computer assistant. The assistant does the clean-up and the necessary inbetweens, or, in large studios, only some breakdowns which define the movement in more detail, before handing down the scene to their assistant, the inbetweener, who does the rest. The system can adapt the detail resolution or rate to the current scene. Different scenes components of a story might be animated at different resolutions or rates to conform to the master drafter's command. The result is a significant speedup in document generation, while cost is reduced.

BRIEF DESCRIPTION OF THE DRAWINGS

For the purposes of illustrating the invention, there are shown in the drawing forms which are presently preferred, it being understood, however, that the invention is not limited to the precise arrangements and instrumentalities shown. It is to be understood that both the foregoing general description and the following detailed description are not limiting but are intended to provide further explanation. Further features and advantages, as well as the structure and operation of various embodiments thereof, are described in detail below with reference to the accompanying drawings. The accompanying drawings which are incorporated in and constitute part of the specification are included to illustrate and provide a further understanding of the methods, systems, and computer program products. Together with the description, the drawings explain the principles.

FIGS. 1B-1E shows exemplary long form content generation user interface.

FIG. 1F shows an exemplary outline user interface.

FIG. 2A-2I shows exemplary long form content generation flowcharts.

FIG. 3A-3C shows exemplary processes to use AI for generating chatbot responses, for selecting and assisting call center agent in answering calls, and for search engine optimization, among others.

FIG. 3D shows an exemplary AI chatbot to respond to infectious outbreaks.

FIG. 4C shows in more detail the encoder and decoder blocks of the Transformer architecture.

FIG. 5A-5C show various embodiments for applying the content generation system to generate revenues for providing additional resources for schools or educational institutions.

DETAILED DESCRIPTION

The exemplary embodiments consist of major and subsidiary components implemented through a variety of separate and related computer systems. These components may be used either individually or in variety of combinations to achieve the objective of providing a new and improved way to enable content providers to price their specified target audience, for purchase or sale, anytime, based on real-time demand or otherwise, and anywhere without limitation of device platform or an association with content that may limit the distribution of that content. Further, the disclosed embodiments provide for commercialization of price optimization mechanisms within organized electronic marketplaces where rights to access audience profiles and or display space can be traded, in a primary or secondary market.

It is noted that the invention is not limited to the specific embodiments described herein. Such embodiments are presented herein for illustrative purposes only. Additional embodiments will be apparent to persons skilled in the relevant art(s) based on the teachings contained herein. The section headings used herein are for organizational purposes only and are not to be construed as limiting the subject matter described.

Figure 1A:
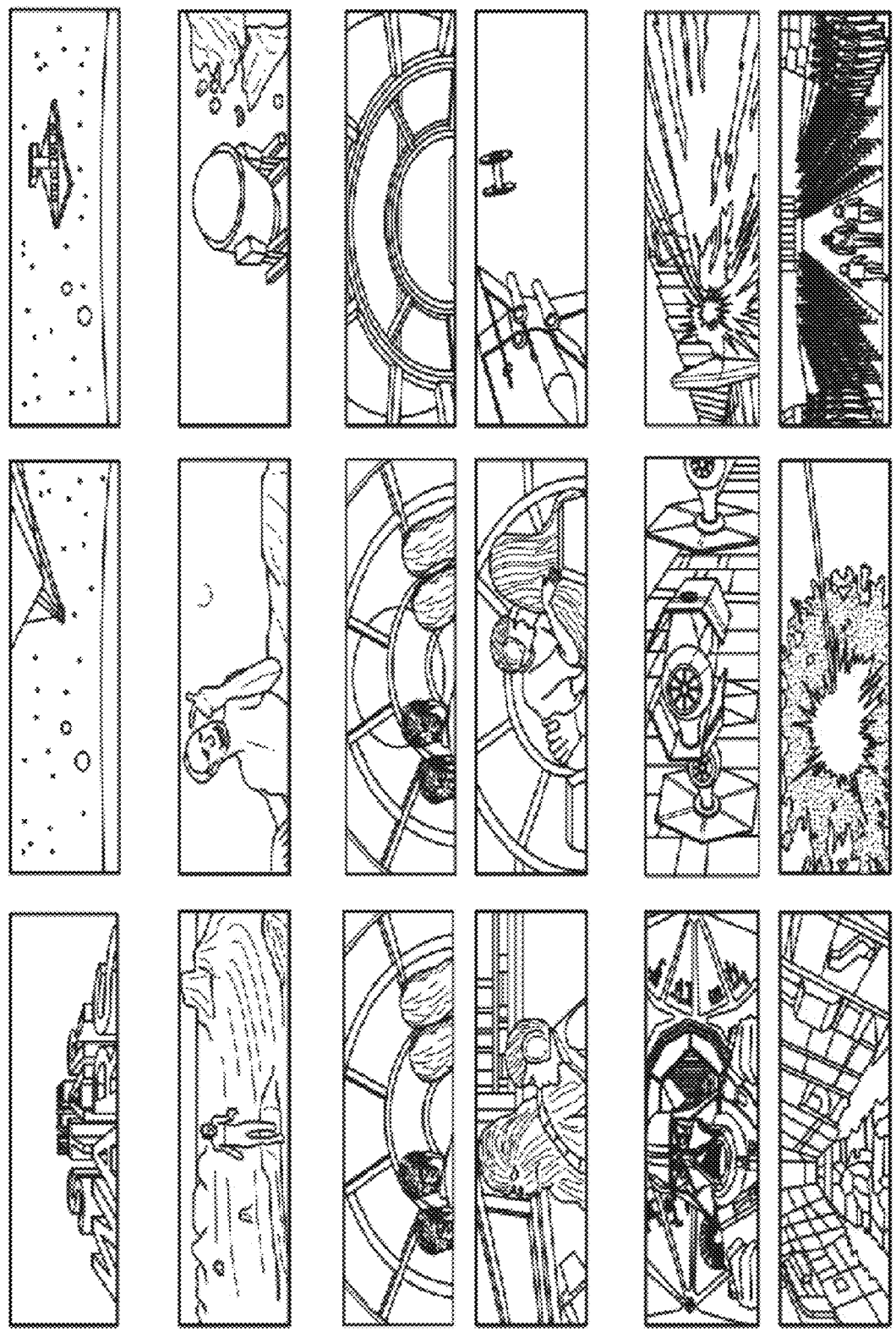
FIG. 1A shows an exemplary storyboard for a video or movie where the plot can be computer generated, human generated, or a combination thereof.
Figure 1B:
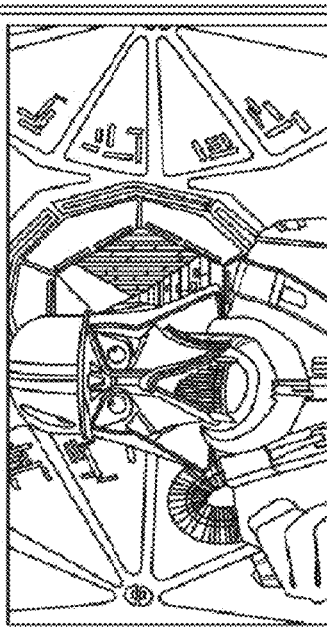

FIG. 1B shows an exemplary system to generate a document using computer-generated outlines, or alternatively using digitized hand-crafted outlines or storyboards. Gathering the writer's thoughts when writing a novel can be a tricky process, which is why many writers plan their plots. In FIG. 1A, users upload a series of drawings or figures. In this example, the image uploaded is a handwritten outline of a book or paper, for example. FIG. 1A shows the storyboard for Star Wars but can also be a table that shows the planning of the Harry Potter books, for example. Storyboards may be comic book illustration of the entire movie, or selected scenes in a movie, including camera angles and the motion of actors through the sets.

As shown in the example of FIG. 1B, a thumbnail 2, is shown on the left side and, when clicked, is shown in full size in space 4. The user can annotate major numbers in the image with a text summary in the annotation section 6. The annotations form an outline of the resulting document or book. The annotation can have adjustable opaqueness so that the annotation can overlay the image. The annotation can be typed in or can be optically recognized using a learning machine, computer vision (OpenCV), or other suitable machine recognition techniques. The user can type in brief descriptions of the drawings on the top of space 4, and a few sentences in the detailed description section 10. With that seed information, the artificial intelligence software starts suggesting one or more text paragraphs for the user to adopt or edit/revise and then add to the detailed description. Next, the system goes through each annotation in space 6 and machine-generated additional text suggestions for the user to apply to the detailed description.

Figure 4A:
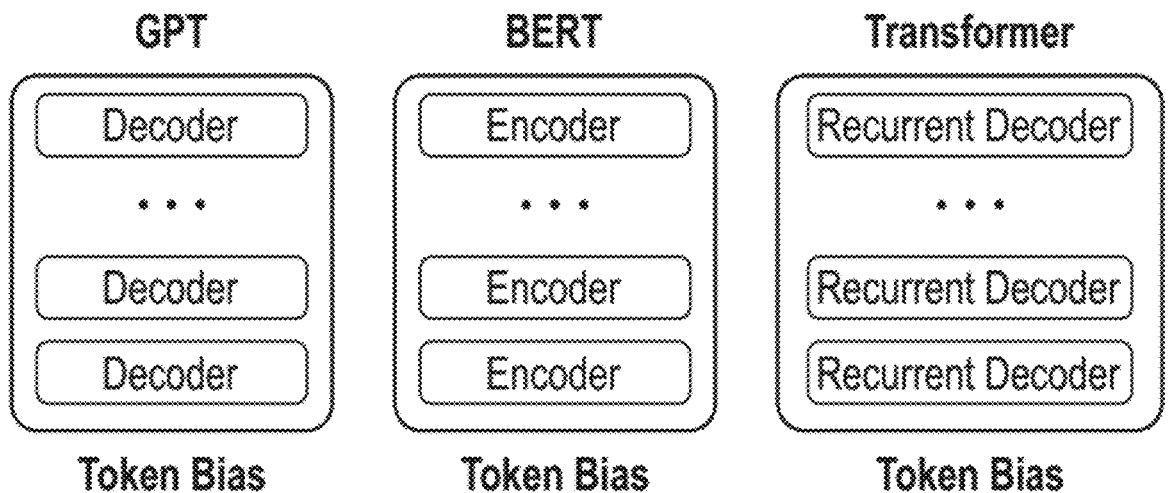
FIG. 4A shows top level views of the GPT, BERT, and Transformer architectures.
Figure 4B:
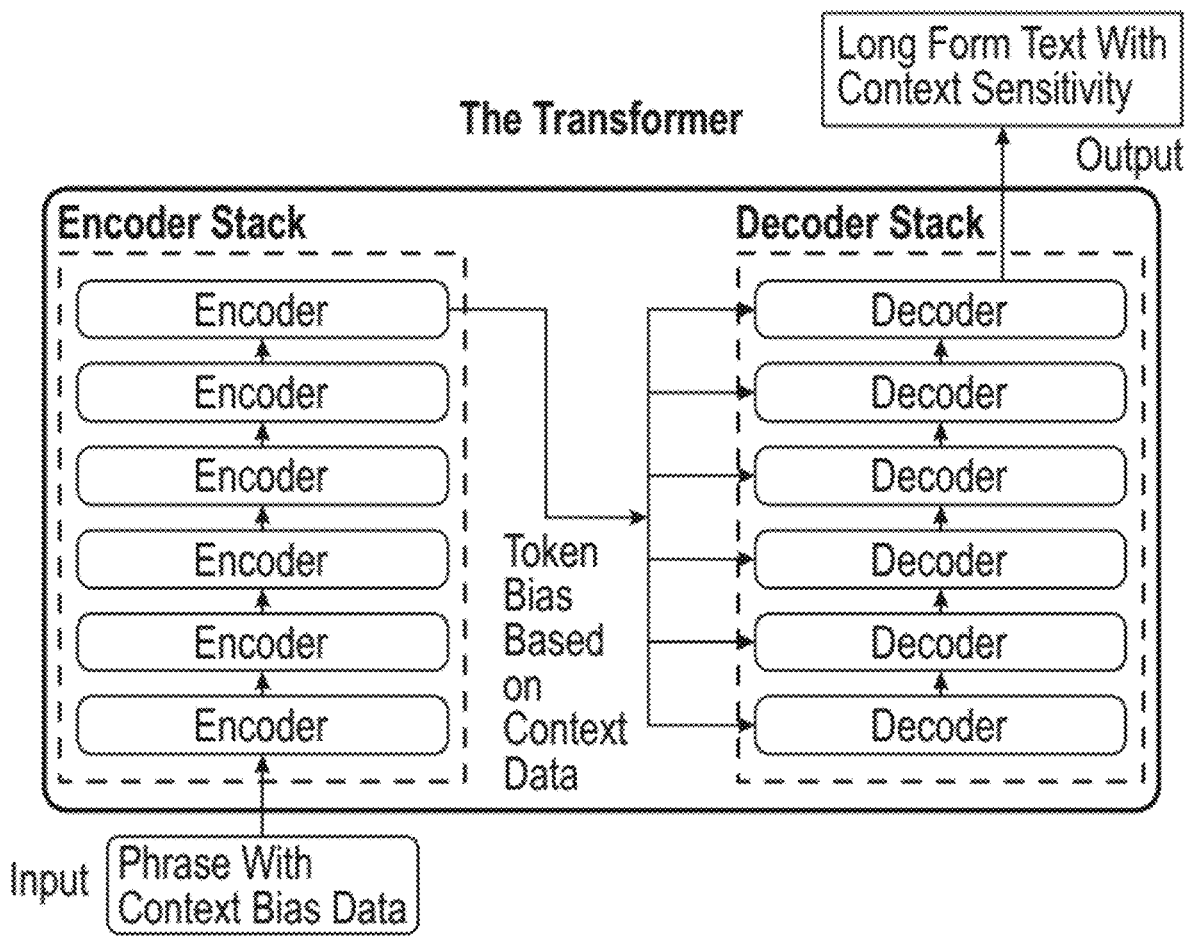
FIG. 4B shows the encoder and decoder stacks of the Transformer architecture.
Figure 4D:
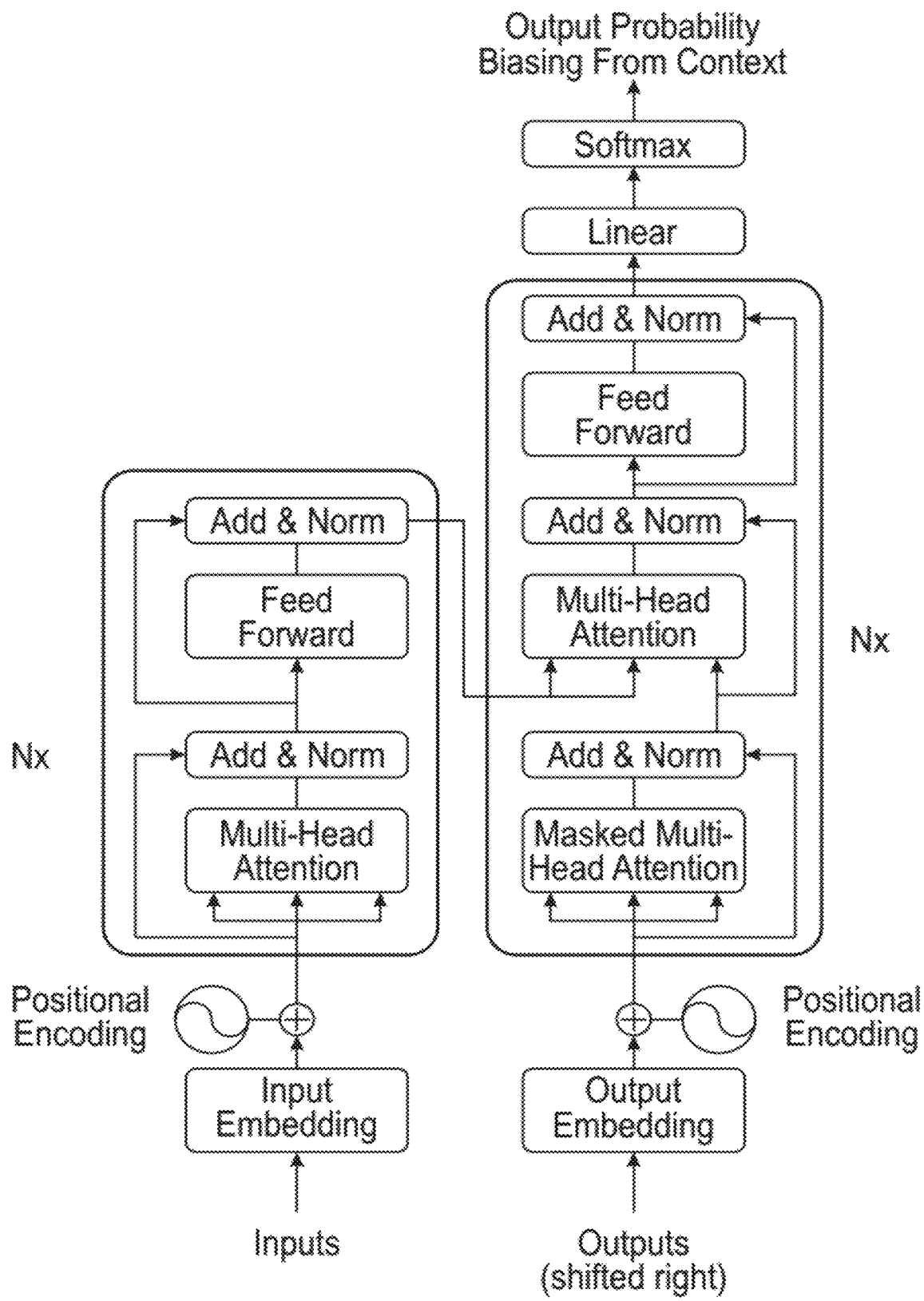
FIGS. 4D-4G show additional views of the Transformer architecture for long-form text generation.
Figure 4E:
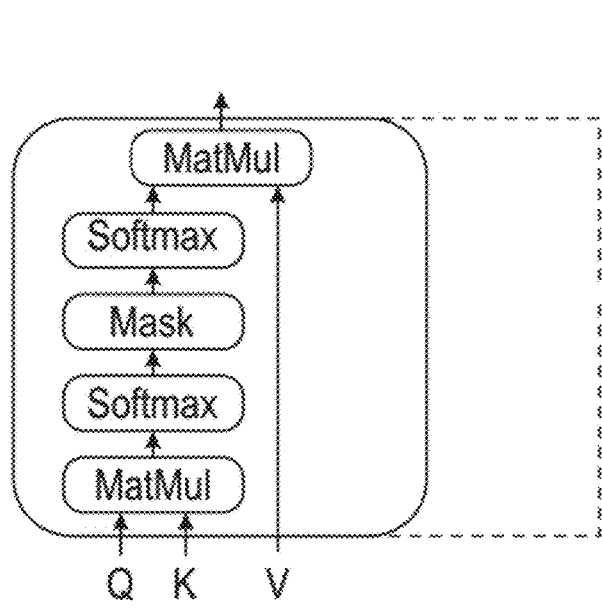
Figure 4F:
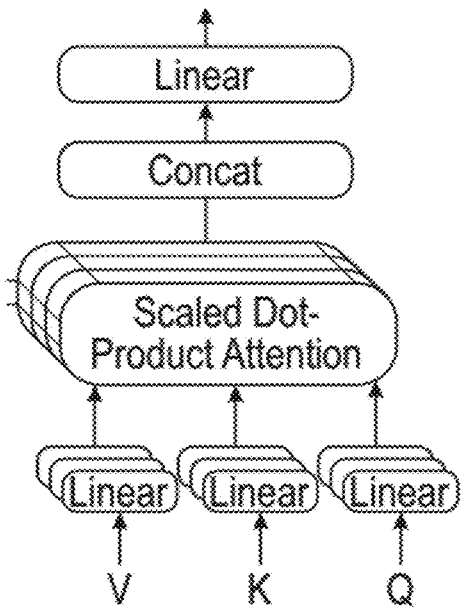
Figure 4G:
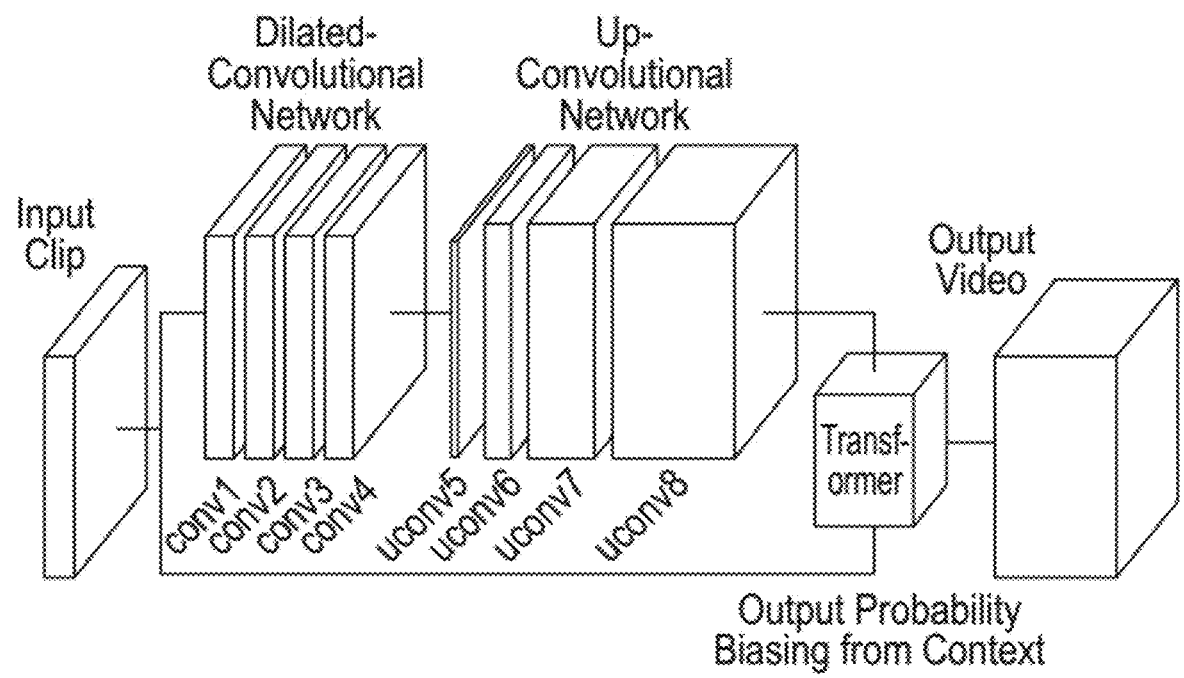
Figure 4H:
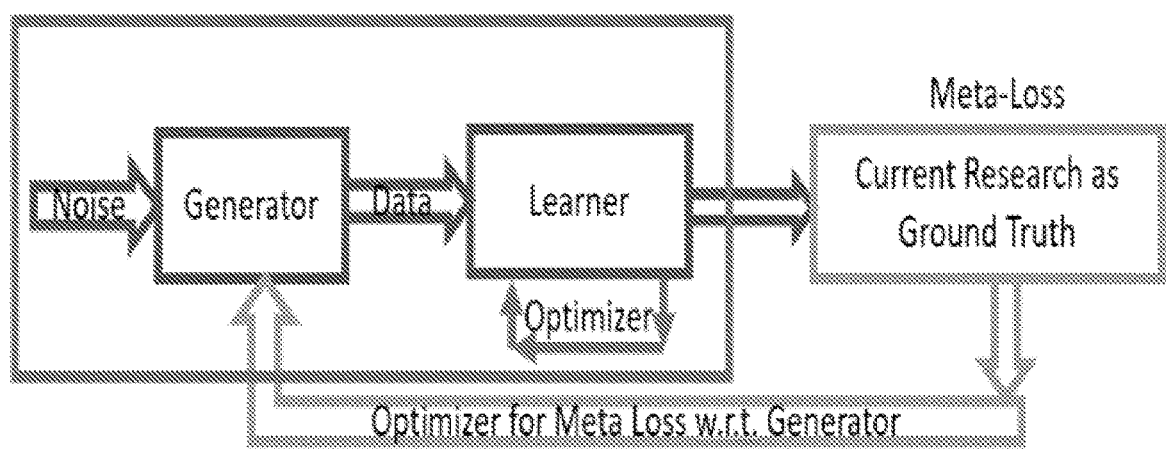
FIG. 4H shows an exemplary adversarial architecture for text or video generation.

In FIG. 1B, the user can specify stick figures and the system can render character Illustrations from the stick figures using a stacked Generative Adversarial Network (GAN) detailed in FIG. 4H, where two pix2pix-based blocks are stacked to form a stack GAN to generate images. The GAN takes a line drawing and creates an illustration of a person in a pose that matches the line drawing.

The system of FIG. 1C-1F supports computer-aided outlining and first draft generation of content. Advantages of starting with the outline in the system of FIG. 1C may include speed and structure. With a book outline aided by AI text suggestions, the writer knows exactly what to write about next when aided by the AI text agent and the outline can help create a solid structure for the novel. The computer can automatically expand and machine generate concepts for the writer to adopt/edit instantly to overcome blank page syndrome for fiction writers. Technical writers face similar blocks. Engineers often believe technical writing to be highly detailed documentation for fellow engineers. While engineers have a great wealth of technical knowledge, they can struggle with how to prepare technical documents, and communicating technical information can be just as important as developing it. Further, the writing of computer code can be viewed as a type of technical writing, and businesses have emphasized the need to write well-documented code. Top-down design means designing from the client application programmer interface (API) down to the code. The API lays out a precise functional specification, which says what the code will do, not how it will do it. Coding bottom up means coding the lowest-level foundations first, testing them, then continuing to build up. The process of code-writing is similar to writing text for reading, but simply more structured. The system can also be used for transforming input text to adopt a general style (for example, transforming the text to include a persuasive tone or style), and/or transforming input text to adopt a personal style (for example, transforming the text to encompass the style of any person, if the style is measurable). Example use cases can additionally include transformations involving variable-length and/or variable-linguistic complexity (specified as input) abstractive summarization, as well as domain-driven text transformations (for example, transforming a technical article on quantum physics to a generic domain text which can be understood by a non-technical person, or vice-versa). As noted above, an abstractive summarization can refer, for example, to a summarization of an input paragraph to multiple sentences, while retaining semantic relatedness. Moreover, an abstractive summarization can be carried out across one or more domains (for example, from a paragraph about quantum physics to plain language English sentences, or vice versa).

In one embodiment, the AI helps the user expand the outline using a chatbot (as detailed below) which conversationally engages the user and ask the user to expand on where what who why how questions: What? What is the concept, topic, or idea? Where? Where does this concept, topic, or idea, apply? Maybe it's an event, or a context situation. Why? Why does this matter? Who? Who is this for, or who is involved? When? Is there a concept of time involved? How? If applicable, how will this happen? Working through the outline, asking and answering these basic questions, the computer can build a story that can stretch the imagination. While the foregoing relates to fiction writing, the system can be used for non-fiction writing such as for software coding, technical documentation, SEO for web site content, among others.

Figure 1C:
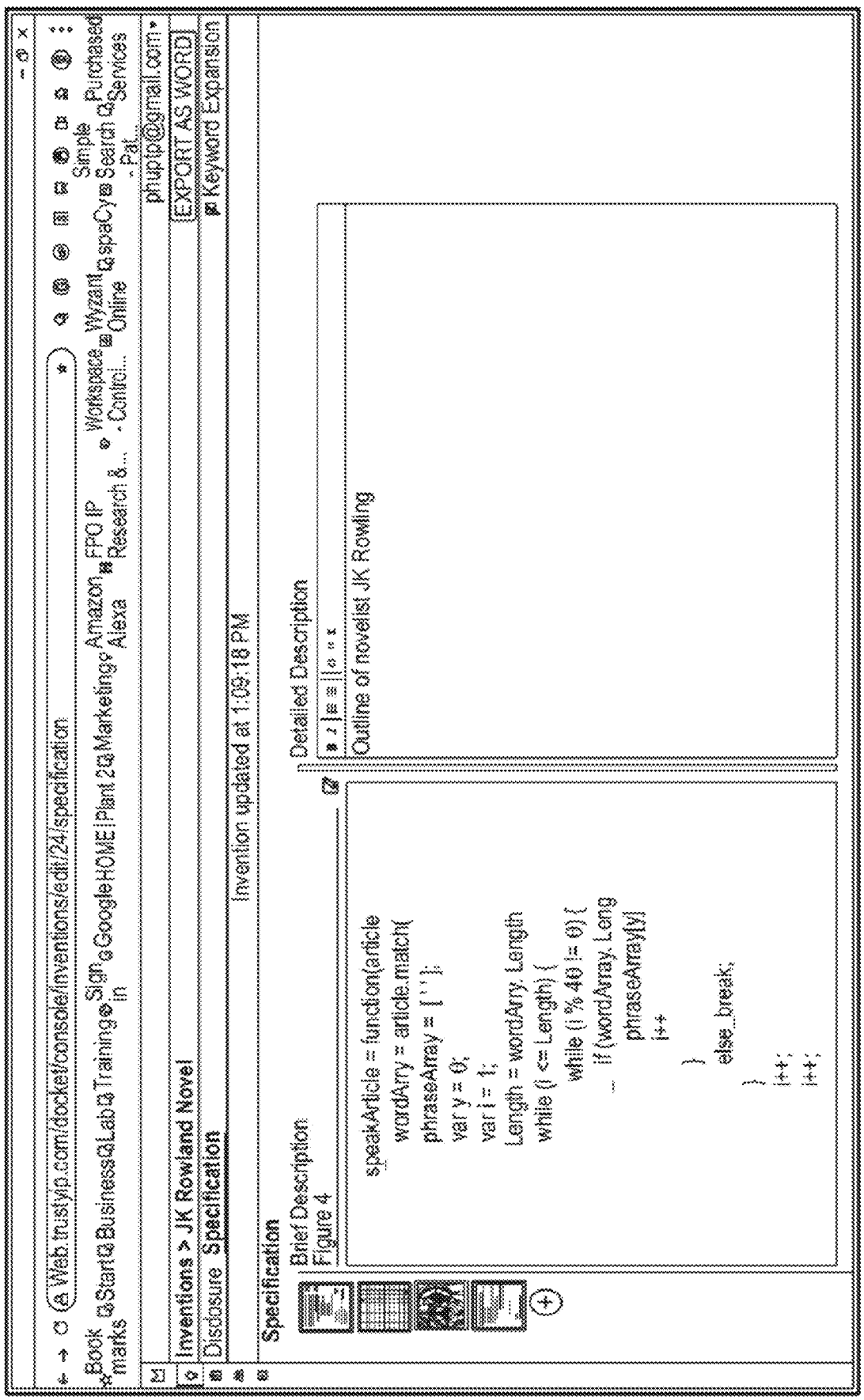

FIG. 1C shows an exemplary machine programming CAD system. Machine programming is a fusion of machine learning, formal methods, programming languages, compilers and computer systems. Machine learning and other automatic methods are used to create software capable of creating its own software and is fundamentally about automating software development and maintenance. The instant machine programming enables everyone to express their creativity and develop their own software without writing a single line of code. The system has a module to determine code similarity-whether two code snippets show similar characteristics or aim to achieve similar goals. The AI neural network can determine when two blocks of code perform a similar computation, even when those blocks use different data structures and algorithms. The system can be configured to a specific context, allowing it to capture information that describes the code at a higher level. The neural network can provide more specific insight into what the code does rather than how it does it. The system can assist with incomplete blocks of code that a developer may be currently writing as part of code recommendation systems or automated bug fixing. The neural network systems provide similarity scores to blocks of code based on the functional specifications. In other words, if two blocks of code look different in their structure but perform the same function, the neural networks would classify them as largely similar. The system would recognize the intent behind a algorithm input by a developer and offer candidate codes that are semantically similar but with improved performance. The system can also automatically generate documentation for the code on behalf of the developer to improve code documentation.

Figure 1D:
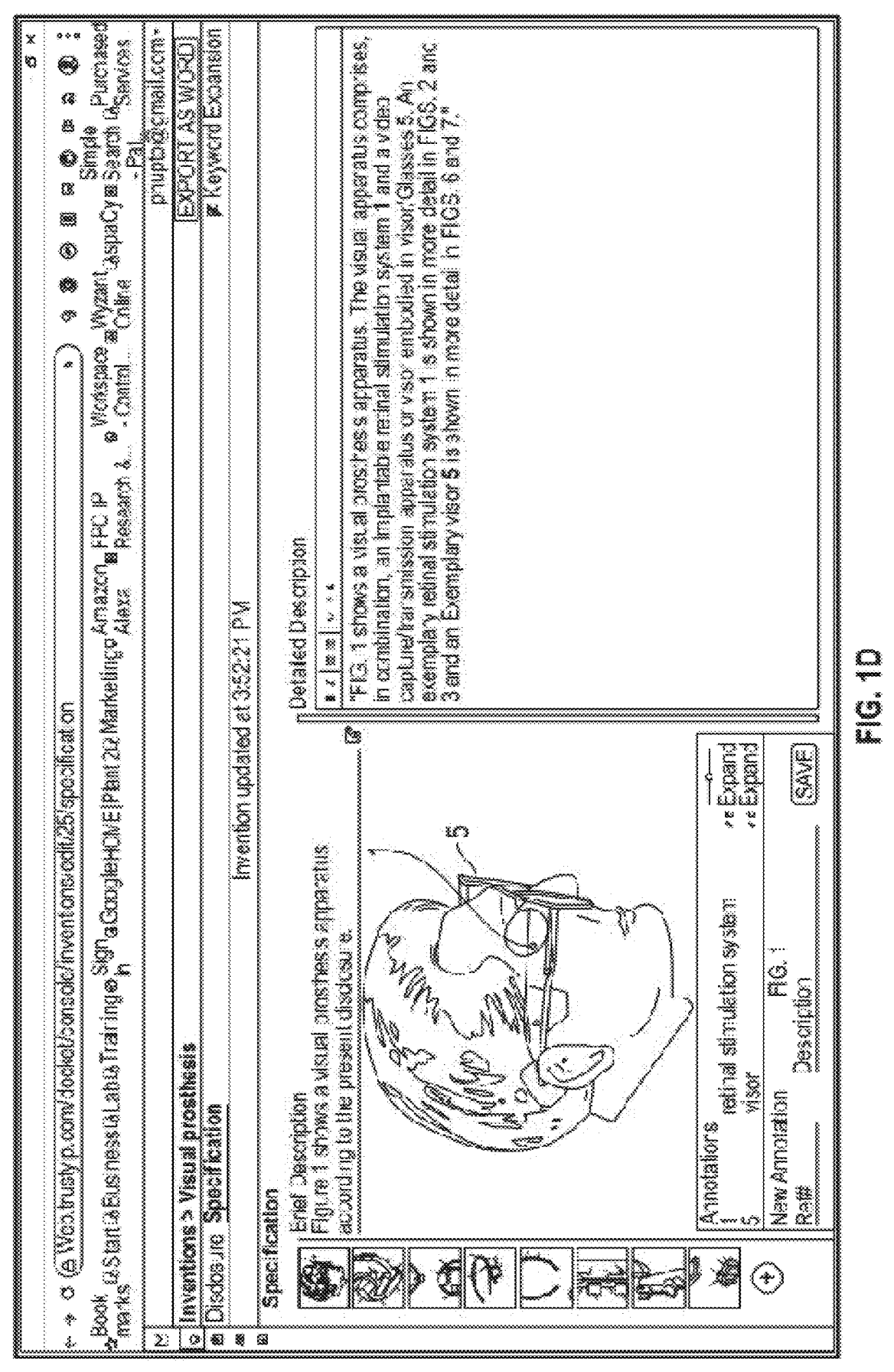

Turning to FIG. 1D, a technical writing assistant tool is shown. In FIG. 1F, the user uploads a series of technical diagrams and enters a brief description of the drawings as well as an initial seed text in the detailed description on what operational aspects or clarification of the system being documented. The seed text can be a small paragraph or can be a detailed text. This system also includes a title, a background text and an abstract/summary text providing useful information along with the seed text that are fed to the AI text suggestion system to generate topically relevant text suggestions for the user to edit.

Figure 1E:
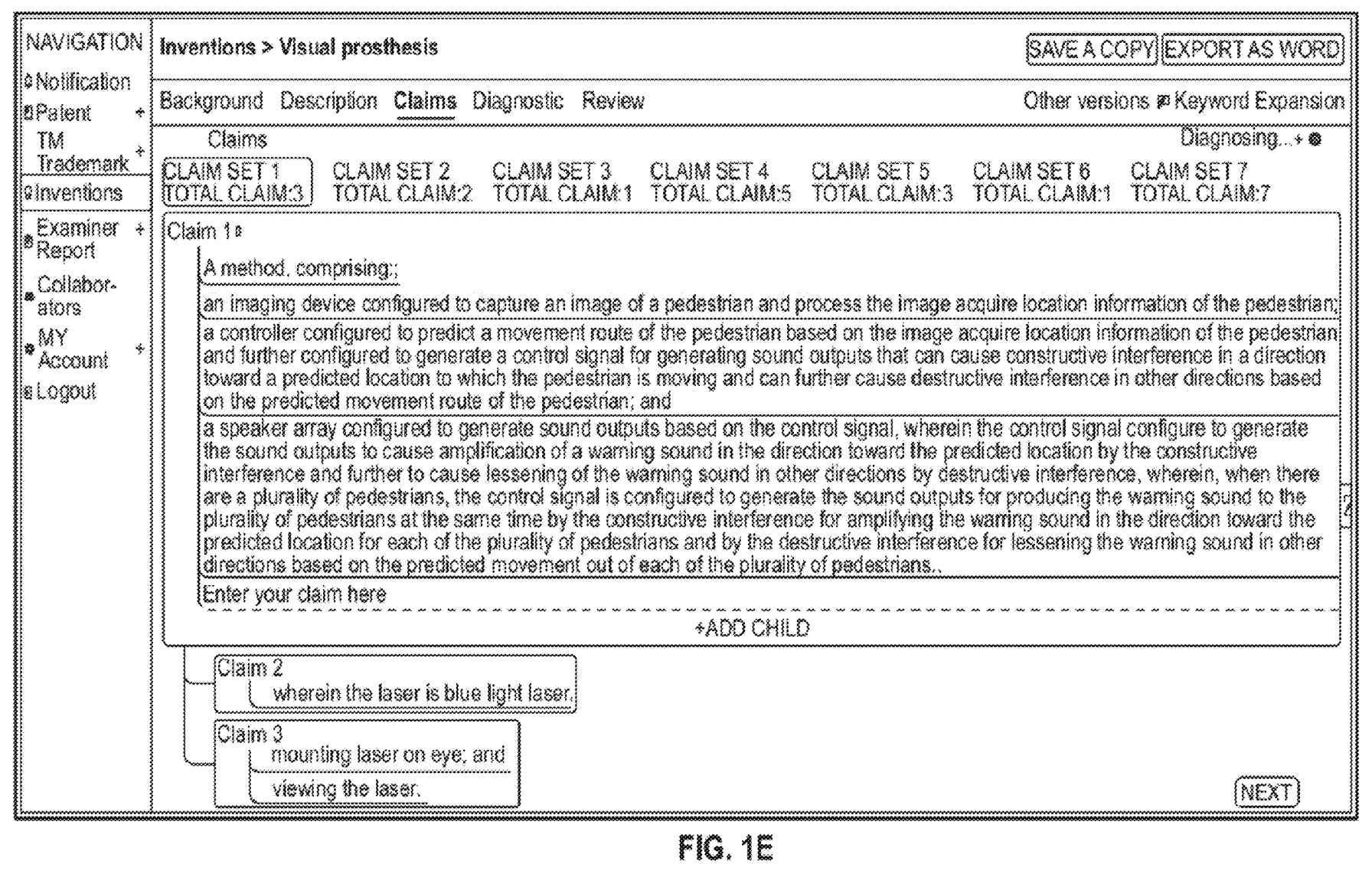

Next, the system of FIG. 1E identifies part numbers in the drawings and extracts corresponding part names associated with the part numbers. This can be done automatically using computer vision, OCR engines, or neural networks trained to recognize numbers, among others. One embodiment uses image recognition to automatically label the part names for the user.

FIG. 1F shows an exemplary system to sketch a tree outline version of the current drawing with reference numerals therein. The part names can be dragged and dropped into the tree structure to generate graphs with noun phrases (NP), like "vehicle", "water hose", "means for manipulating", "at least two elements" that can be nested under each other. A parent NP either contains or conceptually covers its child features. A root feature has no parents as it is the main concept. Relations help to define complex technical relationships, that cannot be expressed simply by nesting features. Relations are nested in the graphs under features but cannot be nested with each other. A relation must refer to its parent feature. A single-feature relation is for example "water hose for watering garden" (defining the purpose of the feature water hose). A multi-feature relation is for example "water hose is connected at first end to a water output and at second end to sprinkler means".

In another embodiment for FIG. 1F, to help convert the drawing into text with relationships, the drawings can be rendered lightly as a background, and the user can move the part names over the section of the drawing, and the system can auto-generate connection lines or curves representing a stick figure or a simple distillation of the drawing with a few lines, curves, and dots to graphically illustrate the relationship connecting the noun phrases or features. One embodiment shows the user all the part names entered for all figures, then the user can drag it to position the elements on the tree. The title is shown on top. When the mouse is hovered over a particular part name, the corresponding expanded text from the detailed description section can be shown with reduced opacity. The system can apply graphs and text around dependency trees where all the words are kept but the computer sees them in a semantic order. In other embodiments, the graphs allow compression of text into text relationships that represent the technical core to the graph. If items are removed from the graph, the described system becomes more general and if something defined similar system before, it would still be relevant. Graphs can also be split. If all the pieces of a design are found from a document, the document should be identified for precedential work.

In the systems of FIGS. 1E and 1F, the system involves generating the series of steps that a machine would have to execute to fulfill a user's intent; in essence, it is the process of generating computer code or algorithms. This may require discovering new algorithms that are unique and different from prior contributions within the same space. In many instances, however, invention will be accomplished by identifying how to combine and adapt known data structures and algorithmic primitives to solve a particular problem. The graph can be used as a syntactic representation of each program in the search space. Another approach involves symbolic search techniques, where the entire program space is represented symbolically, either using a special purpose representation, or, in the case of constraint-based synthesis, by reducing it to a set of constraints whose solution can be mapped to a concrete program, which can be solved using a SAT or SMT solver or in some cases a numerical optimization procedure. Deductive synthesis can be used to generate solution proposals for the user, where the idea is to start with a high-level specification and refine it to a low-level implementation by applying deductive rules or semantics preserving transformations.

FIG. 2A shows an exemplary method to generate a document by providing a document structure having one or more seed landmark texts therein, each landmark text including a milestone overview text and a plurality of component texts; from the milestone overview text, generating one or more computer-generated text suggestions to supplement the milestone overview text; combining the milestone overview text with each component text and generating one or more computer-generated component text suggestions; and creating the document by combining the milestone overview, the one or more computer-generated text suggestions, and each component text with corresponding one or more computer-generated component text suggestions.

In implementations, the document structure can be an outline, and each landmark text can be a chapter overview, and wherein the component texts comprise a chapter outline. The document can be a fiction or a non-fiction work. The document can be computer code. The document can be a design specification of a new mechanical system. The document structure can have one or more figures, wherein each figure comprises a brief description of the drawing, a figure overview, and wherein the component texts comprise a part list of items in each figure. When suggesting, the computer text generation can emphasize the component text over the milestone overview text when generating the component text suggestions. The computer combining can include a title and a background text with the one or more seed landmark texts and providing the combined title, background, and seed landmark texts to a learning machine to synthesize computer-generated text. The method includes extracting one or more references from a figure and annotating the one or more references with text; and forming one or more computer-generated reference text suggestions. The method includes performing grammar analysis and suggesting grammar correction and editing the document for conciseness. The method includes applying a transformer with an encoder that reads the text input and a decoder that produces a prediction for the text. The transformer can be a GPT (Generative Pre-trained Transformer) or a BERT (Bidirectional Encoder Representations from Transformers) to generate the text.

The first GPT, released in 2018, contained 117 million parameters, these being the weights of the connections between the network's nodes, and a good proxy for the model's complexity. GPT-2, released in 2019, contained 1.5 billion parameters. GPT-3, by comparison, has 175 billion parameters-more than 100 times more than GPT2 and ten times more than comparable programs and trained on large corpus from the Internet. The present system supplements GPT-3 training data by feeding the transformers with technical publications and US, EPO and Chinese intellectual property/patent text, and with source code from Github™, among others.

For generating alternatives, the method includes determining when two pieces of text, component, module, code, data structure, or image perform a similar task and showing the determined text, component, module, code, data structure, or image to a user. For designs, the method includes breaking-down the milestone overview text into one or more alternate components with different component text but capable of performing the milestone overview text based on teachings from prior art documents and showing the one or more alternate components as a computer-generated design around satisfying the milestone overview text, wherein the learning machine learns from prior art and from publicly available data such as Wikipedia™, and Github™.

One embodiment captures semantically salient properties of the input code. The embodiment captures information that describes the context of the code (e.g., it is a function call, it is an operation, etc.). Code similarity measurement (such as vector dot product, cosine similarity) is used to determine the similarity score between the input program and any other program that has undergone the same code transformation process.

One embodiment uses the neural network to map from a goal or intention (given as a set of examples) to a restricted set of components that it has learned to recognize as useful when satisfying similar goals or intentions. This allows it to then use a synthesizer to solve the synthesis problem on this restricted program space. The system can handle complex conditional distributions, allowing it to automatically determine, for example, how to use complex Java® and Android® APIs. The system includes reasoning at a high-level of abstraction about how those building blocks fit together, and only then reasoning at the code level in a targeted fashion. The neural networks model and learn the mapping from input-output examples to attributes with: an encoder—a differentiable mapping from a set of M input-output examples generated by a single program to a latent real-valued vector, and a decoder—a differentiable mapping from the latent vector representing a set of M input/output examples to predictions of the ground truth program's attributes. The neural network is used to guide the search for a program consistent with a set of input-output examples instead of directly predicting the entire source code. Depth-first search (DFS) can search over programs with a given maximum length. When the search procedure extends a partial program by a new function, it tries the functions in the DSL in some order. At this point DFS can opt to consider the functions as ordered by their predicted probabilities from the neural network. Another approach is the "Sort and add" enumeration, which maintains a set of active functions and performs DFS with the active function set only. Whenever the search fails, the next most probable function (or several) are added to the active set and the search restarts with this larger active set. The neural network is trained from large-scale data sources, such as code repositories like GitHub™, or synthetic data-sources such as randomly generated programs and datasets.

While automation of code is discussed in the above example, another example can identify mechanical or biological modules useful in translating a desired goal/intent into a practical implementation. This is done by analyzing the patent literature and generate design arounds from prior documented solutions in the patent literature. This embodiment captures semantically salient properties of the input requirement or specification. The system is also context-aware, as it can capture information that describes the context of the hardware involved. Code similarity detects the similarity score between the input and any other implementation that has undergone the same mapping or transformation process. The resulting machine operation feature vector is provided to the learning machine. The neural network to map from a goal or intention (given as a set of examples) to a restricted set of components that it has learned to recognize as useful when satisfying similar goals or intentions. This allows it to then use a synthesizer to solve the synthesis problem on this restricted program space. The system includes reasoning at a high-level of abstraction about how those building blocks fit together, and only then reasoning at the code level in a targeted fashion.

FIG. 2B shows an exemplary learning system to generate long text documents from a summary or given abstract. The system is trained on a corpus of data that includes an abstract and a detailed description. After training, given a new abstract, the system generates a draft for review. In one embodiment to generate a summary or abstract, the system includes the following:

A sentence tokenizer splits the text into set of sentences.

After tokenization, a representation for sentences is done. The system uses is the Skip-Thought Encoder where the representations encode the inherent semantics and meaning of the corresponding sentence. The Skip-Gram Word2Vec is method for generating the embeddings for words. A weighted average of the words in the sentences is used to form the sentence embedding.

To put the sequence of words in account, the Skip-Thought sentence encoder is used with two parts, an encoder and a decoder. The encoder part is a GRU-RNN which generate a fixed length vector for each sentence. The decoder part takes the vector representation as an input and tries to generate two sentences (the next and the previous to it).

The encoder-decoder network training minimizes the sentence reconstruction loss, so that after training the encoder is able to produce representation of semantically similar sentence that are closer to each other.

After generating the embedding, the next step is to cluster them into a pre-defined number of clusters. The number of clusters represents the desired number of sentences in the summary.

In one embodiment with user supervision, the system includes code to:

extract noun phrases from an abstract;

look up corresponding entries in a database such as Wikipedia™ to get descriptive text;

look up from technical articles and patent databases for information on the descriptive text;

present text from various sources for the user to select;

allow the user to refine the abstract and repeat the above steps if desired; and autogenerate a long article based on user guidance.

In another embodiment, the system includes code to:

extract noun phrases from an abstract;

look up corresponding entries in a database such as Wikipedia™ to get descriptive text;

look up from technical articles and patent databases for information on the descriptive text; and autogenerate the article based on user guidance.

In yet another embodiment, the system includes code to:

extract noun phrases from an abstract;

train a neural network such as an RNN to generate description for the noun phrases from Wikipedia™, technical articles and patent databases for information on the descriptive text; and autogenerate the article.

Advantages of the system may include one or more of the following. The system reduces the cost of writing documents by serving as writing assistants that fill (or in-between)

details based on the abstract. For more technical descriptions where engineering details are important, the system can expand from an abstract to a full description with clarity. In other applications that demand flowery language, the efficiency of human drafters can be improved significantly when a master drafter generates a summary of the major points in the article, and the computer fills in the missing details, similar to inbetweening of animation. In the current system, Inbetweening or tweening is a process in all types of content expansion, including text and video animation. The video inbetweening includes generating intermediate frames between two images, called key frames, to smoothly transition the first image into the second image, where the inbetweens are intermediate drawings which create the illusion of motion from one key frame to the next key frame, all generated using the image transformers. The transformer/learning machine receives from the user designations on how objects in an image and can move and change during the tweening process. To aid the transformer, the user can manually render or adjust transitional frames by hand or software may be used to automatically render transitional frames using interpolation of graphic parameters. The instant video inbetweening applies the learning machines to the inbetweening workflow where keyframes are generated by a skilled artisan, and then inbetween movements are specified for rendering software. The computerized renderer does the clean-up and the necessary in-betweens. The system can adapt the detail resolution or rate to the current scene. Detailed points may be written on threes or fours chapters of writeups. Different scenes components of a story might be animated at different resolutions or rates to conform to the master drafter's command. The result is a significant speedup in document generation, while cost is reduced.

In another embodiment, the text inbetweening includes generating intermediate paragraphs between two points in the text outline to evolve smoothly between the major points in the text outline, where the text inbetweens are intermediate paragraphs, pages, or even chapters which follow the text outline to create a cohesive flow as specified by the outline, all generated using the image transformers or learning machines to generate long form text as guided by a structure such as an outline.

In one implementation, text preprocessing is the first step for the given dataset to prepare it to be an input to the classification model. Cleaning of the dataset is done first using regular expressions (Regex) to remove punctuation and HTML tags. After that, tokenizer is to be used for splitting the text into set of words. Text normalization is done after tokenization through stemming, lemmatization, and lower-casing of the words to convert different forms of each word into one. Then, stop words are to be removed since they do not carry meaning by themselves (words such as "the"). Finally, words can be checked for their spelling to prevent the chance of having multiple forms of the same word.

Word vectorization or embedding is done after preprocessing to convert the words into a language understood by any machine learning model, which are numbers. There are two approaches for the problem of sentiment analysis, either to use supervised machine learning or unsupervised lexicon-based approach. In one embodiment, semantic word vector spaces can be used in search query can be used where a vector generated from co-occurrence statistics of a word and its adjacent words is used to encode the meaning of this word. Although word vector models have succeeded to perform certain NLP tasks such as sentiment analysis, yet they neglect the compositionality, and context at which these words have been used. Thus, they produce misleading, and erroneous results at sentences where long dependencies exist such as sentences which include negation words or adverbs with similar meanings. Another drawback, word vectors obtained via co-occurrence statistics consider two factors: syntactic, and semantic similarity so if a small window of context has been used then words like bad, good have very similar representation.

One of the supervised models is Word2Vec which can be included in the model to be trained in which the parameters of the embedding can be trained with the labels from the labeled dataset. In other embodiments, models that are trained based on part-of-speech tagging, SentiWordNet, for example, to identify the sense of the word and hence a better embedding. Other vectorizer such as GloVe is trained based on the context or aggregated global word-word co-occurrence statistics of the word in the corpus, so it will map the word into the embedding space based on its context. In addition, some traditional methods are still used today such as term frequency-inverse document frequency (tf-idf). Other embodiments apply n-gram, so instead of just using single words tokens, it can be pairs of example. For example, instead of converting "didn't like movie" into three words, a 3-gram language model can be used to generate triplets of words. The output of the word embedding is fed to the model of the system which can be implemented by enormous methods. A Support Vector Machine (SVM) or Logistic Regression to classify the data within the embedding.

In one case, system descriptions are mainly deduced from complete sentences rather than words for linguistic reasons by either using a model that exhibit a memory or using a vectorizer that consider the context of the word.

In another case, Abstractive Summarization is done. There are two approaches in Abstractive Summarization. The first one is to use Sequence-to-sequence RNNs with attention mechanism, the second one is to use a pointer generator networks which is different from a normal Sequence-to-Sequence model in that it can copy words from the source text via pointing, which aids accurate reproduction of information, while retaining the ability to produce novel words through the generator. It also keeps track of what is summarized to penalize repetition. Attention mechanism is inspired in the visual attention animals have were they focus on specific parts of their visual inputs to compute adequate responses. Attention used in Seq2Seq architectures seeks to give more contextual information to the decoder. At every decoding step, the decoder is informed how much "attention" it should give to the input word, while the transformer model focuses on attention. Positional embeddings provide positional information in the sequence of each element. And despite removing recurrence it still provides an encoder-decoder architecture such as the one seen in Seq2Seq models.

In yet another implementation, Extractive Summarization is done. Summarization produces a concise and fluent summary while preserving key information content and overall meaning. Historically, researches started the process of automating the process of summarization by introducing a method that extracts salient sentences from the text using features such as the work frequency. One implementation introduces weights to the sentences in the documents, ignoring the very frequency common words, the same approach that became very basic in most of NLP applications. The approaches to text summarization vary dramatically according to the output (extractive or abstractive), purpose (generic, specific domain, or query-based), or the number of documents (single or many). By generic, we mean that the model makes no assumptions about the domain or content to be summarized whereas domain-specific assume that the text belongs to a specific domain such as biomedical documents. On the other hand, query-based summarization produces a summary that contains information which answers the input question.

In one embodiment, extractive summarization process identifies the most important parts in the text and produces a subset from the original text that contain only these parts. However, extractive summarization reproduces important parts in a new way after interpreting the meaning to generate a new shorter text that convey the critical information from the original. Each extractive method should be composed of three main steps, construction of an intermediate representation of the input text, scoring the sentences, and selecting a summary comprising of a number of sentences. There are variations in each approach to the task. Firstly, the common is based on topic words where log-likelihood ratio test to identify words known as the topic signature. Secondly, a frequency-driven approach can be used as an indicator of importance using word probability and Term Frequency Inverse Document Frequency (TF-IDF). Sentences with highest words probability are assumed to represent the topic of the document and are included in the summary. Using TF-IDF method, the sentences are represented in a space where documents describing same topic are clustered together. Cluster centroids identify the sentences that are central to the topic Thirdly, Latent semantic analysis can be used for extraction. It is an unsupervised method that is similar to the second method but with minor modification on the produced space of clusters. Fourthly, a discourse-based method can be used to find the semantic relation between sentences using Cross-Document Structure Theory. However, this relation should be explicitly made by humans. Fifthly, Bayesian probabilistic is used to infer the words related to a certain topic based on a corpus of documents. Finally, a machine learning approach can be used where we treat summarization problem as a classification one. In addition, many models such as Hidden Markov Models often outperform classification methods.

In one implementation, the process is as follows: First, a sentence tokenizer splits the text into set of sentences; and After tokenization, a representation for sentences is done. The system uses is the Skip-Thought Encoder where the representations encode the inherent semantics and meaning of the corresponding sentence. The Skip-Gram Word2Vec is method for generating the embeddings for words. A weighted average of the words in the sentences is used to form the sentence embedding.

To put the sequence of words in account, the Skip-Thought sentence encoder is used with two parts, an encoder and a decoder. The encoder part is a GRU-RNN which generate a fixed length vector for each sentence. The decoder part takes the vector representation as an input and tries to generate two sentences (the next and the previous to it). The encoder-decoder network training minimizes the sentence reconstruction loss, so that after training the encoder can produce representation of semantically similar sentence that are closer to each other. After generating the embedding, the next step is to cluster them into a pre-defined number of clusters. The number of clusters represents the desired number of sentences in the summary.

FIG. 2C shows an exemplary process to create a document that can be a fiction or non-fiction work, for example. The process includes:

Provide a document structure having one or more chapters and for each chapter add a seed brief descriptive text for the chapter and add a plurality of sub-plot texts for the chapter For each chapter:
  From the seed brief descriptive text, generating one or more computer-generated text suggestions to supplement the seed brief descriptive text to form a second brief descriptive text
  For each sub-plot text, generate one or more computer-generated component text suggestions based on the second brief descriptive text and each component text; and Create the document by combining each second brief descriptive text with each component text with corresponding one or more computer-generated component text suggestions FIG. 2D shows an exemplary process to create a storyboard document such as a movie or animation storyboard, for example. The process includes:

Provide a storyboard structure having one or more scenes or pictures therein and for each picture add a seed brief descriptive text for the picture and add a plurality of sub-plot texts for the picture For each picture:
  From the seed brief descriptive text, generating one or more computer-generated text and computer-generated image suggestions to supplement the seed brief descriptive text to form a second brief descriptive text
  For each sub-plot text, generate one or more computer-generated component text suggestions and corresponding pictures based on the second brief descriptive text and each component text; and Create the storyboard by combining each second brief descriptive text with each component text with corresponding one or more computer-generated component text and computer-generated image suggestions The structure can be a shot list and the method can take a scene from the script and make a shot list, and the system can suggest how particular camera angles tell the story or make a moment more impactful. The system can suggest revealing details about the characters and the story via camera angles. The system can autogenerate additional rough sketches of the shot list. The method can help the user to choose one of the more complex sequences and scope out a vision for the scene where the shots are sketched in the squares of the storyboard, like a comic strip. One embodiment provides basic shapes and stick figures on a piece of paper. The system can autogenerate images for the user based on similar image search. The system helps the user fill in details. The storyboard has the most important elements of each scene. From static images, the result is a moving video or animation that follows the storyline guided by indicated motions or props in the storyboard and camera angles and framing of each shot. The thumbnails provide a general outline of the relevant details of each shot, without going too deep into distracting details. Once the system receives the images, it auto-suggests additional words at the bottom of the images to give more context such as any voice over to add, for example.

FIG. 2E shows an exemplary process to create a technical document such as an engineering or detailed specification for software coding, for example. The method includes:

Provide a document structure having one or more pictures and for each picture add a seed brief descriptive text for the picture and add a plurality of component texts like a part-list for the picture;

For each picture:
From the seed brief descriptive text, generating one or more computer-generated text suggestions to supplement the seed brief descriptive text to form a second brief descriptive text;
For each component text, generate one or more computer-generated component text suggestions based on the second brief descriptive text and each component text; and
Create the document by combining each second brief descriptive text with each component text with corresponding one or more computer-generated component text suggestions In yet another embodiment for automated computer code generation, the code inbetweening includes receiving a high level description of a predetermined code (such as pseudo-code), and based on each function specified in each line of the pseudocode, generating intermediate code to perform each sub-function by looking up learned code to achieve the desired sub-function. If needed, if the pseudo-code line requires additional break-down into sub lines to achieve the desired functionality, the transformer can perform the in-line substitution to break the desired functionality into digestible sub-tasks to be converted into computer code that in totality achieve the desired effect for the code. In this manner, the computer readable code inbetweens are intermediate lines, function calls, module calls, or even entire external programs which follow the high level pseudo-code to create a cohesive program as specified by the user, all generated using the image transformers or learning machines to generate computer code in accordance with the pseudo-code.

The code can be computer readable code, html code, or hardware ASIC code such as ADL or RTL, among others. High-level synthesis tool flows are can be used for specifying the complete SoC or its constituents. Automatic generation of optimized RTL can be done based on input specification and user-directed constraints. The system can start from open source processors (RISC V), Coarse-Grained Reconfigurable Architectures (CGRAs) and Application-Specific Integrated Circuits (ASICs). The transformer is used to generate a high-level synthesis of ASICs based on Architecture Description Languages (ADLs) and the automated hardware synthesis generated by the transformers/learning machine can be used to explore intermediate design points between an ASIC and a weakly programmable processor, for example.

FIG. 2F shows another exemplary process to create a technical document such as an engineering or detailed specification for software coding, for example. The method includes:

Provide a document structure having one or more pictures and for each picture add a seed brief descriptive text for the picture and add a plurality of component texts like a part-list for the picture;

For each picture:
From the seed brief descriptive text, generating one or more computer-generated text suggestions to supplement the seed brief descriptive text to form a second brief descriptive text;
For each component text, generate one or more computer-generated component text suggestions based on the second brief descriptive text and each component text; and
Create the document by combining each second brief descriptive text with each component text with corresponding one or more computer-generated component text suggestions FIG. 2G shows an exemplary process to generate targeted responses/proposals for the user. The process includes:
Select deep neural network architecture (for example, retrieval, generative, and retrieve/refine, transformer-based, BERT-based, GPT-based, among others) for a learning machine
Train the learning machine with data that is logically grouped or clustered to provide context and accuracy (for example, by technology field or by industry/specialization; by computer code such as ASIC code, database code, html code, neural network code; by type of writing, by type of novel or movie them such as Mysteries, Romance, Thriller, Science Fiction, Fantasy, Historical Fiction, among others)
Gather customization information from user by interacting with the user and request DNN to generate context sensitive text suggestion
Determine the trained group or cluster best matching the customization information and apply the customization information to bias the learning machine to generate context-sensitive responses that are realistic in terms of accuracy and depth FIG. 2H shows one implementation for generating technology or field specific long form text. The process is as follows:
First, the field needs to be identified. For example, the transformer training can be tailored to specific classifications such as the IPC code. In one embodiment, the process identifies the international patent classification (IPC) code using various ways: 1) ask user to indicate or select IPC with graphical user interface, or 2) auto detect IPC from contextual data
Token Bias Process
Train BERT (or similar transformer) to classify sections of patent text (title, summary, abstract, technology field, . . . ) to predict an IPC
Given user contextual data (title, summary, abstract, technology field, . . . ), predict likely IPC
Assign token values to each IPC class (outside of vocabulary)
Tokenize input text
Prepend IPC token to input block—This has the effect of notifying the model at train and generation time of the IPC class at each forward pass, thus biasing predictions towards IPC-specific outputs
One exemplary model has the following parameters: block_size=200, vocab_size=52000, and the ipc parameters are: n_ipcs=1500, the final dimensions of the model are: block_size=201 and vocab_size=53500

FIG. 2I shows in more details one implementation of the token bias process. The token bias includes:
Collate all contextual data (title, claims, abstract, field of invention, . . . )
Tokenize context via model tokenizer
Determine token frequencies as map {token: freq}
At generation step, augment token sampling probabilities using a predetermined policy, for example:
P=sampling probability distribution over all tokens in vocabulary
i=initial token prob given prompt
f=frequency of token in context
d=high-frequency damper (0-1 for damping effect, >1 for emphasis)

a=augmentation constant (user selected)
overwrite i:
   i<=(i*(f^d))*a
   (This has the effect of selectively biasing generation of more frequent tokens)
Re-normalize P s.t. sum (P)==1 (required for sampling):
   P_aug<=softmax (P)
Sample next token using P_aug instead of P.

The foregoing customization of response can be used in other applications such as chatbots and SEO optimization.

To optimize for long text generation, the system performs training on the corpus with a vocabulary of around 52000 words. It then gets a subset of documents (either from a search on terms that is close to the target text or from prior history of text generated by the user, for example) and tokens from the subset of document are then used to bias the predicted probability to generate the final text. This can be done by obtaining a histgorgram of tokens, then normalization is done, and the probability of the subset is merged with the pretrained probability. This increases the probability that new tokens are drawn from the biased set to increase the likelihood that the neural network generates text more like a desired text target.

In one embodiment for generating long form text, supplemental text is used to bias the text generator. The text documentation is exported as 500 newline-delimited json files. This dataset is far too big to fit in memory, so a custom encoding script is used to pre-tokenize and store the dataset in an archive, at a block size of 800 (tokens). The system used a Transformers Dataset class is used to read this dataset into a neural network model such as the GPT training pipeline. This script is modified to export a complete model to disk every 500 iterations, so that model performance can be benchmarked as it trains. Then, using the pipeline API provided in HuggingFace transformers v. 3+, the GPT tokenizer and the custom model is combined into a text generation pipeline using a modified version of the generation_utils.py file, to allow for document biasing as detailed above. This pipeline can perform generation on a GPU, speeding up generation by 10×.

In another embodiment, the method includes generating long form context-sensitive text with a desired token length and targeted at a topic by:
   training a learning machine architecture (LMA) a corpus on a specific domain (such as engineering, medical, chemical, patent), wherein the architecture can be BERT, GPT, or a suitable network, wherein the LMA is trained at the desired token length (such as 200, 500, 800, or longer token frames of data) to avoid generating incoherent text whose length is greater than the desired token length;
   using a first text input (such as a background or summary or tag annotations) to retrieve a first set of documents matching the first text input;
   applying the first set of documents and the topic as input to the LMA to generate the context sensitive text with the desired token length.

For example, a database of patents can be searched to locate documents matching the text input, and then the matching documents (or portions of the matching documents) can be provided to the LMA to bias the LMA to generate documents related to the topic. The long text generation can be used as suggested text to the system described in U.S. Pat. No. 9,990,351 to the instant inventor, the content of which is incorporated by reference. The long form text includes suggested text for the background, description of figures, description and summary text in the document generated by U.S. Pat. No. 9,990,351, for example.

Another embodiment generates context-sensitive text by:
   using a first learning machine to map text matching each topic to a corresponding vector;
   building a search index for the search topics and in response to a search topic returning a responsive first vector;
   at run time, using a second learning machine to map a topic to a second vector;
   determining similarity between the responsive first vector and the second vector, selecting the most responsive first vector and retrieving text for the most responsive first vector.

Yet another embodiment generates context-sensitive text by:
   using a first learning machine to map text matching each topic to a corresponding vector;
   building a search index for the search topics and in response to a search topic returning a responsive first vector;
   training a second learning machine to generate text from a training corpus;
   at run time, using the first learning machine to look up the search index and select responsive documents to provide to the second learning machine generate responsive context-sensitive text. The second learning machine can be a learning machine architecture (LMA) trained a corpus on a specific domain (such as engineering, medical, chemical, patent), wherein the architecture can be GPT, or a suitable network, wherein the LMA is trained at the desired token length (such as 200, 500, 800, or longer token frames of data) to avoid generating incoherent text whose length is greater than the desired token length;
   using a first text input (such as a background or summary or tag annotations) to retrieve a first set of documents matching the first text input; and
   applying the first set of documents and the topic as input to the LMA to generate the context sensitive text with the desired token length.

One embodiment blends text from different fields to arrive at a completely new concept (ideation process). The embodiment uses a Transformer autoencoder, and allows users control over both the global and local structure of a generated concept sample. In particular, the model enables using an existing concept or abstract as input to generate a new concept in a similar style, or harmonize a specific new concept in a different technology, but in the style of the original concept. In other words, given two concepts 1 and 2 each from different patent art unit 1 and 2, the system generates a new concept that is a blend of the concepts 1 and 2 using a Concept Transformer.

The Transformer autoencoder is built on top of the Concept Transformer's architecture as its foundation. As a refresher, Concept Transformer uses relative attention to better capture the complex structure and periodicity present in concepts.

The program encodes abstracts/summaries into idea representations. The Transformer autoencoder's performance encoder takes as input the abstracts and performs a mean-aggregate of the output embedding to learn a global representation of the core concepts. The decoder is allowed to attend to this concept vector.

To harmonize with another input concept, a concept encoder is used in addition to the performance encoder to embed the respective inputs. These two intermediate representations of melody and performance are then aggregated to form a single vector input into the decoder.

Instead of using self-attention to operate over absolute positional encodings of each token in a given sequence done in one embodiment, the preferred embodiment's Transformer replaces this mechanism with relative attention and allows the model to keep better track of regularity based on event orderings.

The standard encoder and decoder stacks of the Transformer have 6 layers which are each comprised of a: (1) multi-head relative attention mechanism; and a (2) position-wise fully connected feed-forward network. The concept encoder takes as input the event-based performance encoding of an input performance, while the melody encoder learns an encoding of the melody which has been extracted from the input performance. Depending on the generation task, the encoder output(s) are fed into the Transformer decoder. The decoder shares the same structure as the encoder network, but with an additional multihead attention layer over the encoder outputs.

At train time the encoder and the decoder use the same inputs, and right-shifting the decoder inputs by one, and doing a single forward pass through the decoder. At generation time, encoder inputs would be the original sequence (same at train), and decoder inputs would be the token and then loop the decoder to generate a new sequence. One approach is to mask out (set to zero) all encoder outputs which correspond to pad tokens, and then (rather than averaging) to stack the tensor along the seq-aka-time (hereinafter 'time') axis (where the encoder output is of shape (batch, time, d_model), and project the resulting (batch, time*d_model) tensor through a feed forward network onto a (batch, d_encoding) space. This is our autoencoded vector, which is used for later sampling. That vector is then mapped back to the original encoder shape via another feed-forward net+reshape (in pytorch, tensor.view( )) step, and the result is used for decoder attentions. In another embodiment, during training, the decoder is provided with: (1) the performance and/or new technology vector representation, which was mean-aggregated across time, and (2) a perturbed performance sequence. you can think of (2) as the input with some added noise (for NLP tasks they could look like masking tokens or random word substitutions). The "noisy training" helped quite a bit on this front. The system uses expanded dataset plus the masking (if present). For the perturbations, masks and substitutions are used.

The DNN generates samples that technologically is similar to a conditioning input performance. The mean-aggregate of the concept embedding to learn a global representation of concepts. This mean-performance embedding is then fed into the autoregressive decoder, where the decoder attends to this global representation in order to predict the appropriate new concept. In this way, the generated concepts are conceptually related yet different due to its application to another inventive space or art unit from to the input sequence. The system applies two distinct Transformer encoders (each with the same architecture) to separately encode the conceptual inputs. The conceptual embeddings are combined to use as input to the decoder.

In combining the intermediate representations, the system can add the concept embeddings together (sum); or alternatively the system can concatenate the two embeddings separated with a stop token (concatenate); or alternatively tile the performance embedding across every dimension of technology in the conceptual encoding (tile). All three cases works with the mean-aggregated representation of the input performance.

To encourage the encoded performance representations to generalize across various technology space in different art units, a denoising autoencoder regularizes the model. For every target concept to be trained, the model is provided with a perturbed version of the input concept as the conditioning signal. Finally, the model is trained end-to-end with maximum likelihood: for a given sequence x of length n, we maximize log $p\theta(x)=Pn$ i=1 log $p\theta(xijx<i)$ with respect to the model parameters θ. Training is conducted inan autoencoder-like fashion. For conceptual conditioning, the Transformer autoencoder is trained to predict a new performance using the combined technology embedding from two or more art units, where the loss is computed with respect to the input performance.

In one exemplary operation, the user desires to mash up two different concepts, and the text command can be: 6G and blockchain and AI. The system responds by inferencing 6G concepts with blockchain concepts and AI concepts to arrive at a new blended concept of using 6G transceivers that are self-aware and communicate its frequency requirements to nearby transceiver with the duration, RFpower, and RF frequency. AI is used to optimize the needs of different transceivers such as proximity contactless transceivers (RFID), PAN transceivers (Bluetooth®), LAN transceivers (WiFi®), cellular transceivers (5G/6G), and LEO satellite transceivers, among others. The transceivers use a mesh network topology and AI to arrive at an agreed upon transmission schedule which is then embedded in a blockchain. The system is used to generate and document IP, such as those disclosed in US Application Ser. _____ and entitled Smart Wireless Systems by the same inventor, the content of which is incorporated by reference.

One the claim formats are done, the system renders images including elements recited in each claim. For software claims, the system provides flowcharts that mention all steps. For drawings that require more than flowchart boxes, the system applies a machine renderer. In alternative embodiment, a transformer language model receives both the claim text and the inventive drawing input as a single stream of data containing up to 1280 tokens, and is trained using maximum likelihood to generate all of the tokens. In this embodiment, a token is any symbol from a discrete vocabulary; for humans, each English letter is a token from a 26-letter alphabet. The system's vocabulary has tokens for illustrated concepts. In one embodiment, each idea abstract/summary is represented using byte pair encoding (BPE) or diagram coding-encoded tokens with a vocabulary size such as 16384. Training is done using the relaxation obviates the need for an explicit codebook, EMA loss, or dead code revival, and can scale up to large vocabulary sizes. The training can not only generate a new drawing from scratch, but also to regenerate any figure variations, in a way that is consistent with the text prompt such as those by a human inventor or by machine.

One embodiment uses a simple decoder-only transformer that receives both the text prompt and the drawings as a single stream of 1280 tokens—256 for the text and 1024 for the concept—and models all of them autoregressively. The attention mask at each of its 64 self-attention layers allows each concept token to attend to all text tokens. A standard causal mask is used for the text tokens, and sparse attention for the image tokens with either a row, column, or convolutional attention pattern, depending on the layer.

In an alternative embodiment, a transformer language model receives both the text and the inventive concept as a single stream of data containing up to 1280 tokens, and is trained using maximum likelihood to generate all of the tokens. In this embodiment, a token is any symbol from a discrete vocabulary; for humans, each English letter is a token from a 26-letter alphabet. The system's vocabulary has tokens for both text and drawing concepts learned from patent illustrations. In one embodiment, each concept/drawing is represented using a BPE-encoded tokens with a vocabulary size of 16384, and the image is represented using 1024 tokens with a vocabulary size of 8192. The images preprocessed to 256×256 resolution during training. Similar to VQVAE, 1415 each image is compressed to a 32×32 grid of discrete latent codes using a discrete VAE1011 that we pretrained using a continuous relaxation. The training procedure not only generates an image from scratch, but also to regenerates any rectangular region of an existing image. The decoder-only transformer that receives both the text and the image as a single stream of 1280 tokens—256 for the text and 1024 for the image—and models all of them autoregressively. The attention mask at each of its 64 self-attention layers allows each image token to attend to all text tokens. Causal mask is used for the text tokens, and sparse attention for the image tokens with either a row, column, or convolutional attention pattern, depending on the layer. In another embodiment, a GAN can be used that is conditioned on text embeddings. The embeddings are produced by an encoder pretrained using a contrastive loss.

One embodiment can predict from the text generated, the destination of a potential reviewer. This is done by first learning the assignment of cases based on the text in a document and its assignment to an art unit. Then during inference, the user's text is processed to predict where the case is likely to be assigned to.

Classification of Patent Texts (and attribution of text weight) is done as follows:
A ROBERTa-style, encoder-only transformer with a sequence classification head (the latter consisting of a Dense feed forward net, a dropout layer, and a Dense feed forward net) was trained to predict the following Technology Center classes, for example:
TC_CLASS_MAP={
  0: '2800—Semiconductors/Memory, Circuits/Measuring and Testing, Optics/Photocopying, Printing/Measuring and Testing',
  1: '1600—Biotechnology and Organic Chemistry',
  2: '2600—Communications',
  3: '3700—Mechanical Engineering, Manufacturing, Gaming, and Medical Devices/Processes',
  4: '1700—Chemical and Materials Engineering',
  5: '3600—Transportation, Construction, Electronic Commerce, Agriculture, National Security and License and Review',
  6: '2100—Computer Architecture and Software',
  7: '2400—Networking, Multiplexing, Cable, and Security'}
}

The dataset was derived from the google public patent dataset. Patents matching the above classes were collated to normalize for class-wise total text length; specifically, the total word count of all patents in the least-represented tech center group from the set was calculated, and all other centers were randomly downsampled so as to have equivalent total word counts upoin download.

The resulting corpus was then processed by tokenizing each patent with the standard ROBERTa tokenizer, and splitting the resulting data into labeled sequences of 512 tokens each (the maximum input size for ROBERTa) and 4096 sequences each (the maximum input size for Longformer). NOTE: The Longformer dataset and models were ultimately not used, as the smoothgrad algorithm used later in the process could not fit the model onto a single GPU (and classification accuracy was not substantially greater than the ROBERTa model). Labels were assigned according to the TC_CLASS_MAP (above).

Training was performed in parallel on GPUs, with fp16 mixed precision (AMP) and gradient accumulation, for an effective batch size of 128. Training was stopped when the evaluation set F1 score started to diverge, and the best model (picked for highest eval F1) was selected for use to predict art unit assignment.

The SmoothGrad algorithm is utilized at prediction time to return both the predicted text label, and a token-wise impact attribution on that prediction. Tokens with higher impact on the prediction are more red. The result is a color coded output that indicates what words are more likely to impact the assignment of a case to an art unit or technology center:

... an iPhone® with a geometric shape to find an English word puzzle. Thus it is clear that it is desirable to provide a system of word puzzle game application in iPhone® in a better enhanced way. The present invention overcomes these and other problems by providing software game application in an iPhone®. Further it will be apparent to those skilled in the art that the objects of this invention have been achieved by providing a software application game in an iPhone® which consists of a English dictionary words that forms as a puzzle word game with a geometrical shape which is unique in nature unlike existing mobile puzzle game that are suited only for limited purposes. Various changes may be made in and without departing from the concept of the invention. Further, features of some stages disclosed in this application may be employed with features of other stages. Therefore, the scope of the invention is to be determined by the terminology, and the legal equivalents thereof. SUMMARY OF THE INVENTION This present invention may be summarized, at least in part, with reference to its objects. The foremost objective of this invention is to provide a system of word puzzle game application in an iPhone®. Another objective of this invention is to entertain an iPhone user by providing a word puzzle game with geometrical shapes. Another objective of this invention is to educate the user of an iPhone® with a simple Label: 3700—Mechanical Engineering, Manufacturing, Gaming, and Medical Devices/Processes|93.89%|

One embodiment provides an interactive tool where the user can globally change a word and see the impact of the assignment. That way, the user can influence the art unit assignment as desired.

FIG. 3A shows a chatbot system that applies the above methodology to answering user questions on an automated basis, thus greatly reducing cost and increasing customer convenience due to its ability to resolve issues 24×7. The process is as follows:
Select deep neural network architecture (for example, retrieval, generative, and retrieve/refine, transformer-based, BERT-based, GPT-based, among others) for a learning machine
Collect training data and update on periodic basis:
Store non-public information into a database from a site desiring to have a chatbot to answer questions, including CRM databases for common user questions and non-public product maintenance or service information for products Crawl web site of the company desiring to have the chatbot to answer questions to extract user manuals, FAQs and all publicly available text Crawl fan sites or product review sites for information about company/product/service Crawl competitor sites to extract industry text Crawl the internet for any mention of the company name or product names including negative reviews and flag such reviews for company responsive text as training data Train learning machine with data that is logically grouped or clustered to provide context and accuracy (for example, by technology field; by product; by customer type (engineers, housewife, student, . . . , or by industry/specialization, etc) and periodically update training with new data Gather customization information from user by interacting with the user and retrieving prior interactions with the user and prior purchases and complaints/returns by the user Determine the trained group or cluster best matching the customization information and apply the customization information to bias the learning machine to generate context-sensitive chats that are optimized to answer or interact with the user Detect user emotions during the interaction based on user facial expression (periodic sampling of camera image and/or verbal expression), or based on text response by user, or by explicit happiness rating next to the chat box text entry space If user is satisfied with the interaction based on detected emotion, continue responding/chatting If user is dissatisfied based on detected emotion, select a call-center agent best matched to the user profile or need and transfer to selected agent at a call center One embodiment employs the poly-encoder architecture which encode global features of the context using multiple representations (n codes, where n is a hyperparameter), which are attended to by each possible candidate response. This final attention mechanism gives improved performance over a single global vector representation (so-called "biencoders"), whilst still being tractable to compute compared to simply concatenating input and output as input to a Transformer (or "crossencoders"). A Seq2Seq Transformer architecture is used to generate responses rather than retrieve them from a fixed set. One implementation is based on the ParlAI version with Byte-Level BPE tokenization trained on the pre-training data, as implemented in HuggingFace's Tokenizers.

To avoid producing dull and repetitive chat responses, given the dialogue history, the retrieval model is first used to produce a draft response which is then appended to the input sequence of the generator, along with a special separator token. The generator then outputs a response as normal given this modified input sequence. Alternatively, the system can retrieve from a large knowledge base, instead of retrieving an initial dialogue utterance and then condition the generation on the retrieved knowledge. The same retrieval system uses a TF-IDF-based inverted index lookup over the collected/crawled data to produce an initial set of knowledge candidates. A Transformer retriever model is then used to rank the candidates and select a single sentence which is used to condition generation. A Transformer-based classifier is trained to choose when to perform retrieval or not on a per-turn basis, as some contexts do not require knowledge. This was trained as a two-class classifier discriminating between contexts that require knowledge or not in the fine-tuning tasks.

The domain specific training of the learning machine enables it to have in-depth knowledge if sufficiently interrogated. The system uses industry specific jargon due to the domain training so that it does not use generic/simpler language and it does not repeat oftused phrases.

In FIG. 4H, the system uses classifiers of toxic language trained on adversarial toxic data that fools existing classifiers and is then used as additional data to make them more robust. The classifier at test time to detect toxic language before it is rendered by the chatbot. The system also mitigates race and gender bias in dialogue through conditional generation, controlling the amount of racial or gendered words to be more neutral.

In the user emotion detection, the chatbot can request access to camera and microphone (mike). If permitted, a variety of analysis can be done, but if not, text-based emotion analysis can be done. The system uses deep learning to recognize emotional intent patterns in human text, speech and facial expressions and respond to those cues in appropriate, empathetic ways—such as offering directions or information. Sentiment analysis for understanding the underlying feelings and emotions in opinions, whether written or spoken. One embodiment uses the transformers described herein and trained to analyze emotion based on the video/sound/text. A transformer model is used to fuse audio-visual-text modalities on the model level. A multi-head attention produces multimodal emotional intermediate representations from common semantic feature space after encoding text, audio and visual modalities, as supplemented by long-term temporal dependencies with self-attention.

If camera/mike access is allowed, facial analysis for frowning and voice pitch analysis and text sentiment analysis can be done in one embodiment. In other embodiments, posture, what's happening in the environment, physiological information such as what's going on with the nervous system, and smile context detection on a specific person in a specific situation can be done. Additionally, patterns in people with similar characteristics like gender sampled across cultures can be done to increase emotion detection accuracy. A number of emotional detection modules can be used, for example: DELTA is a deep learning based natural language and speech processing platform; Emotion Recognition Neural Networks using DNN with tensorflow; Emopy—deep neural net toolkit for emotion analysis via Facial Expression Recognition (FER); Emotion Recognition—Real time emotion recognition; Speech Emotion Analyzer—The neural network model is capable of detecting five different male/female emotions from audio speeches. (Deep Learning, NLP, Python®); Conv Emotion—This repo contains implementation of different architectures for emotion recognition in conversations; Deepface—A Lightweight Deep Face Recognition and Facial Attribute Analysis (Age, Gender, Emotion and Race) Framework for Python®, Emotion Detection—Real-time Facial Emotion Detection using deep learning; Emotion—Recognizes human faces and their corresponding emotions from a video or webcam feed; and Multimodal Emotion Recognition—A real time Multimodal Emotion Recognition web app for text, sound and video inputs; among others, the content of the documentations from their respective github sites are incorporated-by-reference.

For text only analysis, one embodiment uses the vaderSentiment package that provides a measure of positive, negative, and neutral sentiment. For given input text data, vaderSentiment returns a 3-tuple of polarity score percentages and a single scoring measure, referred to as vaderSentiment's compound metric. Other suitable sentiment analysis tools can be used.

If user dissatisfaction is detected, the system forwards the user to a call center agent using a selection process determined by the learning machine trained for routing users to agents includes rating agents on performance or success of agent data and caller data, or both. The checking for optimal interaction includes combining agent work performance, agent demographic/psychographic data, and other work performance data ("agent data"), along with demographic, psychographic, and other business-relevant data about callers ("caller data"). Agent and caller demographic data can be: gender, race, age, education, accent, income, nationality, ethnicity, area code, zip code, marital status, job status, credit score, for example. Agent and caller psychographic data can cover introversion, sociability, work/employment status, film and television preferences, among others.

FIG. 3B shows a chatbot system that applies the above methodology to routing a caller to a predetermined call center agent to optimize conversion, sales, or any other business goals. The process is as follows:

Select deep neural network architecture (for example, retrieval, generative, and retrieve/refine, transformer-based, BERT-based, GPT-based, among others) for a learning machine Collect training data and update on periodic basis:
  Store non-public information into a database from a site desiring to have a chatbot to answer questions, including CRM databases for common user questions and non-public product maintenance or service information for products, and CRM databases for customer profiles and agent profiles
  Crawl web site of the company desiring to have the chatbot to answer questions to extract user manuals, FAQs and all publicly available text
  Crawl fan sites or product review sites for information about company/product/service
  Crawl competitor sites to extract industry text
  Crawl the internet for any mention of the company name or product names including negative reviews and flag such reviews for company responsive text as training data
  Train learning machine with data that is logically grouped or clustered to provide context and accuracy (for example, by customer profile; by agent grade/performance, by agent-caller interaction history; by technology field; by product; by customer type (engineers, housewife, student, . . . , or by industry/specialization, etc) and periodically update training with new data
  Gather customization information from user by interacting with the user and retrieving prior interactions with the user and prior purchases and complaints/returns by the user Determine the trained group or cluster best matching the customization information and apply the customization information to bias the learning machine to generate context-sensitive chats that are optimized to answer or interact with the user Route caller to select agent based on trained learning machine Detect user emotions during the interaction based on user facial expression (periodic sampling of camera image and/or verbal expression), or based on text response by user, or by explicit happiness rating next to the chat box text entry space If user is satisfied with the interaction based on detected emotion, continue agent-caller interaction If user is dissatisfied based on detected emotion, select another call-center agent best matched to the user profile or need and transfer to new selected agent or supervisor (escalation of service)

The training data includes caller data associated with one or more callers (e.g., a caller on hold), agent data associated with one or more agents (e.g., one or more available agents). Caller data (such as a caller demographic or psychographic data) is determined or identified for a caller. The system can get caller data from available databases by using the caller's contact information as an index. Available databases include, but are not limited to, those that are publicly available, those that are commercially available, or those created by a contact center or a contact center client. If the caller's contact information is not already known, caller data can be retrieved from the CallerID information or by requesting this information of the caller at the outset of the contact, such as through entry of a caller account number or other caller-identifying information. Other business-relevant data such as historic purchase behavior, current level of satisfaction as a customer, or volunteered level of interest in a product may also be retrieved from available databases. Agent data includes agent grades (which may be determined from grading or ranking agents on desired outcomes), agent demographic data, agent psychographic data, and other business-relevant data about the agent (individually or collectively referred to in this application as "agent data"), along with demographic, psychographic, and other business-relevant data about callers (individually or collectively referred to in this application as "caller data"). Agent and caller demographic data can comprise any of: gender, race, age, education, accent, income, nationality, ethnicity, area code, zip code, marital status, job status, credit score, and the like. Agent and caller psychographic data can comprise any of introversion, sociability, desire for financial success, film and television preferences, and the like. One method of determining agent demographic or psychographic data can involve surveying agents at the time of their employment or periodically throughout their employment such as agent grades, demographic, psychographic, and other business-relevant data, along with caller demographic, psychographic, and other business-relevant data. The learning machine matches each caller with each agent and estimates the probable outcome of each matching along a number of optimal interactions, such as the generation of a sale, the duration of contact, or the likelihood of generating an interaction that a customer finds satisfying.

The exemplary method may include determining caller data associated with one or more callers (e.g., a caller on hold), determining agent data associated with one or more agents (e.g., one or more available agents), comparing the agent data and the caller data with the transformers, and matching the caller to an agent to increase the chance of an optimal interaction. The learning machine predicts and recommends optimal interactions for every agent against every available caller. Alternatively, the computer model can comprise subsets of these, or sets containing the aforementioned sets. For example, instead of matching every agent logged into the contact center with every available caller, examples can match every available agent with every available caller, or even a narrower subset of agents or callers. Likewise, the present invention can match every agent that ever worked on a campaign—whether available or logged in or not—with every available caller. Similarly, the computer model can comprise predicted chances for one optimal interaction(s).

If best match is no possible, conventional routing via an Automatic Call Distribution (ACD) queue order or the like is done by determining a queue order of the caller. For example, if other callers are on hold waiting for an available agent, the caller may be queued with other callers, e.g., a system may order the callers in terms of hold time and preferentially map those callers that have been holding the longest. The system then maps the agent that has been waiting or idle the longest with the caller that has been holding the longest. The caller may then be routed to the agent. The system can preferentially route callers to those agents shown to have greater ability to generate sales, can increase the chances of achieving greater sales during the contacts. Similarly, other agents may be shown to generate shorter interactions with callers than that of other agents at the same contact center. By preferentially routing contacts to the agents shown to generate shorter interactions with callers, a contact center or contact center client can decrease its overall need for agents and communication bandwidth, and therefore, reduce its costs.

FIG. 3C shows an exemplary search engine optimization (SEO) system. The process is as follows:

Select deep neural network architecture (for example, retrieval, generative, and retrieve/refine, transformer-based, BERT-based, GPT-based, among others) for a learning machine Collect training data:
  Gather customization information from user by collecting web site map and proposed web site content for new web site design, or by crawling an existing web site, focusing on frequently asked questions (FAQs) and question and answers (Q&As) and all publicly available text
  Gather marketing input including marketing positioning, top keywords/semantic concept/questions to be ranked from SEO tools identifying top keywords are being used and what questions are being asked to create high quality content (system can handle target keywords with accurate keyword volume and difficulty metrics)
  Crawl competitor sites to extract industry text
  Crawl the internet for any mention of the company name or product names Train the learning machine with data that is logically grouped or clustered to provide context and accuracy (for example, by technology field; by product; by customer type (engineers, housewife, student, . . . , or by industry/specialization, etc)

Determine the trained group or cluster best matching the customization information and apply the customization information to bias the learning machine to generate context-sensitive structured data markup.

Generate proposed web content that anticipates answers and solutions in the content and grow the authority of the domain Generate Semantic Knowledge Mapping and schema markup for crawlers to use Test SEO performance, and generate new text and repeat until SEO performance reaches a predetermined target The content generator suggests contents for the Website that are Topic Relevant, enabling website to be relevant to the topic and everything that is related and useful. High-scoring web pages do more than just provide sales copy or direct answers to questions. They also contain supporting information. Many times, one answer surfaces another question from the reader, so the system provides related answers and anticipate their needs. Include information the company knows customers will need—and haven't thought of before. This can be done with the custom training data such as frequently asked questions (FAQs) and question and answers (Q&As) related to the industry overall and specifically the company.

The software provides a structured approach to content creation combined with structured data markup. The software anticipates answers and solutions in the content and grow the authority of the domain to grow. In one embodiment, search tools such as Moz are queried on a periodic basis and the system can update its semantic knowledge map to generate content with the following:
1. Research user signals to create a list of questions asked.
2. Narrow the target audience and the top questions asked.
3. Use Jump Links to take viewers immediately to answers
4. Match and organize answers.
5. Optimize existing content for conversational phrases.
6. Provide answers to all top related questions.
7. Add semantic-rich search terms to content.

In addition, the system can convert existing web site content with the following:
  Content Improvement: Rewriting web content with more conversational language.
  Featured Snippets: Optimizing on page content to earn featured snippets atop organic results.
  Schema Markup: Using structured data markup to tag elements of web pages and help search engines more accurately interpret them.

Production questions such as size, color, what a product is made of, etc., are things people are asking. Consumers are asking more questions related to a specific product before making a purchase. Follow the instructions carefully when implementing product markup. The system incorporates JSON-LD markup when possible and fitting. Reviewers often answer the questions other buyers are likely to ask. The system generates wording that aligns which purchase intent. On top of the page, the system creates a table of context, each jump-link taking the user to the part of the page answering each question. Creating jump links makes the work easier for a site visitors to quickly see just the answer that they want. Jump links to specific answers lessens your chances of a low bounce rate and improves crawling and indexing. The system automatically maintains the accuracy and freshness each product item's schema. Maintaining a correct schema helps site's content get featured in the PAA and for additional Related Questions.

Users want the best matching, concise answer immediately. With so many questions being asked, the system deciphers which answers are most needed. This helps structure the order for creating or optimizing that content. Voice searches are more conversational by nature when evaluated to text searches. Local searchers questions most often fall in this segmentation. When on the go and a need arises, people tend to speak a query. The system generates semantic knowledge mapping for both mobile and desktop search experience. The content generated by the system provides the audience with a road map to help them along their purchase journey. The common questions asked may vary at each stage; many fit long-tail keywords. For example early on consumers will likely be price comparison shopping, so their questions will center on value and use. Before pulling the trigger on a purchase, they may be asking about return policies and means of shipping.

The system generates Semantic Knowledge Mapping and generates contextual language instead of verbatim keywords. It focuses on the whole context of searcher's queries. The content length is controlled to match a searcher's intent which differs for detailed informational content and a quick answer in summary form. The system provides a semantic analysis of the natural language content, the system assists the web site content creator to locate the words in the creator's original content that capture the real meaning of the original text and then suggests text elements to assign to their logical and grammatical role and build relationships between different concepts in the text that align with BERT.

The system can apply a knowledge-based library of concepts to help search engines detect different businesses or entities are 'Known for' or to define entities better connected relationships. Web pages for specific entities may gain top positioning in search results when user engagement history indicates that search intent may include that entity within a query. The Natural Language system discerns syntax, entities, and sentiment in text, and organizes text into a predefined set of categories. The resulting content is also highly succinct, with more factual content that is written by authoritative sources. It is also engaging.

The system can transform "traditional SEO copy-writing" to better match the SEO's semantic search and update the Knowledge Graphs, entities. The system is optimized for the Searcher who Relies on Voice-Activated Searching which changes their search behavior from text input to spoken input. The system converts the original text into structured data markup that fits the context with entities along with their unique identifiers which may be used to help describe the content to search engines.

The system generates snippets, structured data, and knowledge graphs to answer people's questions and to convert the website's answers into featured snippets. Generating fresh and unique answer-rich content improves placement as a featured snippet. This is one means of giving the assistants more answer response material to match to spoken queries.

The text generation generates ontological markups or schema markups for entities on web page content, relationships to other entities, their connected relationships to attributes (properties) about those entities and the relationships to entity classifications. The system automatically generates a site's architecture, ontologies, and structured data. The system can handle Query Segmentation related to segmenting out a specific query into units of a smaller size. The system can perform custom entity modeling—especially because entity understanding helps us communicate better with real consumers. The entities provide search engines with a better and deeper understanding of topics which in turn, enable information about the Entity to be delivered in any language (with live translation if necessary), since language has only a supportive role for the query—like a modifier. Whatever Entity Understanding and Entity Relationships the search engine learns in one language can automatically be translated to other languages in the Knowledge Graph. The computer-generated markups are optimized for Direct Answers or direct answers to queries, similar a Featured Snippet. The system provides correct product/service markup and anchor text to assist gaining the position of answering the query.

The computer-generated text leverages the transformer chat-bot contents that are conversational in nature. The content produced for a website or blog incorporates conversational language. With conversational sentences integrated into a website's content, it will be simpler for users to find information on those subjects using text or voice search. A featured snippet is a block of text an SEO shows on the top of organic results for question queries, and the snippet can be used for voice assistant response.

The FAQs are provided with a question and answer schema to the FAQ as featured snippets. Schema code enables search engines to extract facts and information about entities for matching queries better. The site can associate the relationships between its content entities to their attributes and classifications. A confidence scores is then generated form relationships and added to Google's library of answers it may draw from. It not only identifies each page's highlights but is aware of notes, media elements, reviews and such within them, too.

One embodiment optimizes the SEO content for featured snippets. Search engines programmatically determines that a page contains a likely answer to the user's question, and displays the result as a featured snippet displayed in typical search results and are accentuated with a special layout. Begin by determining what is a simple, straightforward question in your market space. Then, craft an equally simple and straightforward answer to that question. The content generated is a full answer to the question and address related issues with that particular question and answer occurring somewhere on that page in a very focused spot in the format of an itemized list or a paragraph shortening the answer so that computers and viewers can quickly spot it on the page. The domain has a strong trusted authority factor for featured snippets and the Knowledge Graph.

FIG. 3D shows an exemplary system to respond to infectious outbreaks. One embodiment provides a chatbot to provide advice to patients of an infectious disease such as COVID19. Such chatbot may get the U.S. Food and Drug Administration (FDA) 510(k) and European CE approval for public use. The system applies a trained chatbot operating in concert with mobile fitness monitoring and contact tracing to assist users in answering their health questions in an efficient timely manner that minimizes compute resources and health professional time to free them up for ICU patients, for example. The system can receive FDA 501k or CE clearance approval. The chatbot crawls official government communications about COVID-19 from governments and the World Health Organization as well as predetermined vetted sources, the chatbot in conjunction with a mobile app assesses known symptoms and answers questions about government policies.

The process starts with the appropriate deep neural network architecture (for example, retrieval, generative, and retrieve/refine, transformer-based, BERT-based, GPT-based, among others) for a learning machine, and then performs the following:

Collect training data and update on periodic basis:
  Store non-public information into a database from a site desiring to have a chatbot to answer questions, including hospital databases for patient private data and databases containing mobile fitness tracking devices for users
  Crawl web site of WHO, government agencies, and predetermined research institutions knowledgeable about infectious diseases to extract instructions, frequently asked questions (FAQs) and question and answers (Q&As), and all publicly available text
  Crawl the internet for any mention of solutions/methods/product names including negative reviews as training data
Train learning machine with data that is logically grouped or clustered to provide context and accuracy (for example, by age, sex, race, home location, health history, social economics, risks for lung or breathing diseases etc) and periodically update training with new data Gather customization information from user by collecting recent data from mobile fitness devices and by interacting with the user and retrieving prior interactions with the user and prior health reports by the user, as well as by the clusters of people the user is affiliated with Determine the trained group or cluster best matching the health condition information and apply the customization information to bias the learning machine to generate context-sensitive chats that are optimized to answer or interact with the user regarding symptoms Detect user emotions during the interaction based on user facial expression (periodic sampling of camera image and/or verbal expression), or based on text response by user, or by explicit happiness rating next to the chat box text entry space If user is satisfied with the interaction based on detected emotion, continue responding/chatting If user appears ill, upset or exhibits unusual behaviors not observed before, request opportunity to have a health professional to follow up at later time, or optionally select a call-center agent best matched to the user profile or need and transfer to selected agent at a call center for assistance.

As part of the analysis, the chatbot detects users with higher risk such as users with suppressed immune systems (cancer treatment or who have recently had an organ transplant), unvaccinated users that may be susceptible against common infectious diseases, healthcare workers, users who are at or traveling to at-risk areas where they may be exposed to mosquitoes that carry pathogens, among others.

In one implementation, vital signs from smart watches can be used to monitor core body temperature pattern, breathing pattern, coughing pattern, and walking/exercise patterns to detect changes indicative of an infectious disease. The breathing rate/pattern can be detected through EKG or other means. The coughing pattern can be detected by sound using a microphone, or can be done through body motions as detected by accelerometers, which also detect the walking/exercise patterns. Contact tracing can be done to detect group activities and associated people to see if there are group activities indicative of an outbreak in the group. Communications with members of such group are also used to infer on-set of the disease among the group.

Such information can be used when the chatbot asks the user for symptoms. Symptoms of infectious disease are particular to the type of disease. For example, Symptoms may appear 2-14 days after exposure to the virus. Symptoms of COVID-19 may include Fever or chills, Cough, Shortness of breath or difficulty breathing, Fatigue, Muscle or body aches, Headache, New loss of taste or smell, Sore throat, Congestion or runny nose, Nausea or vomiting, Diarrhea, Trouble breathing, Persistent pain or pressure in the chest, New confusion, Inability to wake or stay awake, or Bluish lips or face, according to the CDC. Symptoms of influenza include: Fever, Chills, Congestion, Fatigue, Muscle aches and headache. Other infectious diseases, such as *Shigella*, cause more serious symptoms, including Bloody diarrhea, Vomiting, Fever, Dehydration (lack of fluid), and Shock.

The system also helps patients with chronic conditions, many of whom are foregoing urgent care out of fear of getting Covid-19 at the hospital. For example, if the user's medical history shows hypertensive from the data, and if the user is not being treated for or charged for high blood pressure medicine, the system can alert the doctor and suggest medicine for their hypertension. The chatbot can detect situations maybe they were taking it, stopped taking it, and they haven't gotten a refill because of Covid.

The chatbot can serve factual answers to user's questions. Users often query a search engine with a specific question in mind and often these queries are keywords or sub-sentential fragments. The chatbot may rely on multiple methods to measure the matching degree between a question and an answer candidate.

The system becomes a source for trusted information on a topic of interest to the site clients and prospective buyers means that the web pages are successfully putting the user experience first. Schema, a semantic vocabulary of tags (or microdata), can be added to a site's HTML code to enhance search engines' ability to read and represent web pages in SERPs. While rich snippets do not directly influence a site's rankings, structured data markup to enable rich snippets may generate indirect SEO paybacks by making your page more effortlessly indexable. It also informs search engines about what's important to you in your content and does a better job with accurate and targeted metadata. The markup provides search engines with better structured content which in turn it can use to provide answers to searchers. It can affect rankings in SERPs and improve the domain authority of the website by indirectly influencing the page's visibility through SERP featured snippets.

ClaimReview Schema markup is used to help search engines interpret your pages to fit the context of a search query. At a high level, claimReviewed, claimUrl, claimUrilOriginal are all attributes of ClaimReview. The system can use Google Data Search is surfacing new datasets that can be sourced to back up the computer-generated text's claims. ClaimReview-based factcheck markup defines a structure that corresponds to the kind of information included in many fact-checking pages. The fundamental notion is a ClaimReview has an author (schema.org/author), which is typically an Organization (schema.org/Organization) (i.e. the fact checking organization or publisher), but could also be a Person (schema.org/Person). The claimReviewed (schema.org/claimReviewed) property of a ClaimReview (schema.org/ClaimReview) summarizes the claim being reviewed. This may include clarifications of the original wording to address intelligibility, civility, context or brevity, and can include translations. This value of the claimReviewed (schema.org/claimReviewed) property is typically a simple textual string (but could be a Claim (schema.org/Claim) with a text (schema.org/text) property, although this is not encouraged). The itemReviewed (schema.org/itemReviewed) property of ClaimReview (schema.org/ClaimReview) indicates specific manifestations of the claim being reviewed. This can either be a Claim (schema.org/Claim) [preferred] or [historically] a CreativeWork (schema.org/CreativeWork) within which the claim is described or reported. The value of itemReviewed (chema.org/itemReviewed) (preferably a Claim (schema.org/Claim) to avoid ambiguity) has an author (schema.org/author), which is a Person (schema.org/Person) or Organization (schema.org/Organization) that has made the claim. A Claim (schema.org/Claim) can be associated with a CreativeWork (schema.org/CreativeWork) it occurs in, using the appearance (schema.org/appearance) or firstAppearance (schema.org/firstAppearance) properties. This is preferable to describing appearances using itemReviewed (schema.org/itemReviewed) as it distinguishes more explicitly between the author (schema.org/author) of the Claim (schema.org/Claim) versus author (schema.org/author) of materials discussing those claims. The reviewRating (schema.org/reviewRating) property of the ClaimReview (schema.org/ClaimReview) indicates a Rating (schema.org/Rating) of the claim. A rating can be summarized textually with a alternateName (schema.org/alternateName) property, and with a numerical rating on a scale from worstValue (schema.org/worstValue) (lowest) to bestValue (schema.org/bestValue) (highest). The author (schema.org/author) (or creator (schema.org/creator), publisher (schema.org/publisher) of a ClaimReview (schema.org/ClaimReview), or of a Claim (schema.org/Claim), or CreativeWork (schema.org/CreativeWork), can be either an Organization (schema.org/Organization) or Person (schema.org/Person).

In another embodiment, the sensor(s) can collect vital signs such as temperature, heart rate, ECG, EEG, PPG, and bioimpedance, among others. For example, in one aspect, a system includes a cellular, WiFi®, or and Bluetooth® or UWB transceiver coupled to a processor; an accelerometer or a motion sensor coupled to the processor; and a sensor coupled to the processor to sense mood body vital sign, wherein text, image, sound, or video is rendered in response to a sensed mood or body vital sign; and a wearable device operating wirelessly with the processor, wherein the wearable device includes at least one sensor coupled to a back of the wearable device and wherein the wearable device recognizes and executes the speech command. In another aspect, a mobile system, comprising: a transceiver to communicate data via a personal area network (PAN); an accelerometer and a gyroscope; a processor coupled to the transceiver, the accelerometer and the gyroscope, the processor executing one or more applications to record user speech and to record data regarding movement detected by the accelerometer and the gyroscope; two or more sensors in communication with the processor to detect user vital sign data; and a health application executed by the processor to generate a health analysis using the vital sign data and the data regarding movement detected by the accelerometer and the gyroscope, wherein the transceiver communicates the analysis to another computer via the PAN.

In yet another aspect, a system includes a processor; a cellular, WiFi®, or Bluetooth® or UWB transceiver coupled to the processor; an accelerometer or a motion sensor coupled to the processor; and a sensor coupled to the processor to sense mood, wherein text, image, sound, or video is rendered in response to the sensed mood. In another aspect, a system includes an accelerometer to detect movement or fitness; a sensor coupled to a wrist, hand or finger to detect blood-oxygen levels or heart rate or pulse rate and mounted on a wristwatch wearable device and a voice communication device having a wireless transceiver adapted to receive blood-oxygen level or heart rate or pulse rate from the sensor over a wireless personal area network (PAN). In yet another aspect, a system includes a cellular telephone having a vital sign sensor thereon to detect heart rate, pulse rate or blood-oxygen levels; and a wristwatch wearable device in wireless communication with the cellular telephone, including: a sensor coupled to a wrist, hand or finger to detect blood-oxygen levels, heart rate or pulse rate; a wireless transceiver adapted to communicate with the cellular telephone over a wireless personal area network (PAN); and a processor coupled to the sensor and the transceiver to send pulse rate to the cellular telephone. In a further aspect, a health care monitoring system for a person includes one or more wireless nodes forming a wireless network to communicate data over the wireless network to detect a health problem. Implementations can include watches that capture fitness data (activity, heart rate, blood pressure, walking rate, dietary or calorie consumption, among others) and sending the data to a hospital database where medical and fitness data is used to treat the patient. Other implementations include collecting data from different devices with different communication protocols such as blood pressure measurement devices, scales, glucose meters, among others, and upload the data to a computer which converts the data into an intermediate format that is compatible with different protocols for interoperability purposes. In another aspect, a heart monitoring system for a person includes one or more wireless nodes forming a wireless network; a wearable sensor having a wireless transceiver adapted to communicate with the one or more wireless nodes; and a software module receiving data from the wireless nodes to detect changes in patient vital signs. In another aspect, a monitoring system includes one or more wireless nodes forming a wireless network; a wearable blood pressure sensor having a wireless transceiver adapted to communicate with the one or more wireless nodes; and a software module receiving data from the wireless nodes to detect deteriorations in patient vital signs. In another aspect, a health care monitoring system for a person includes one or more wireless nodes forming a wireless mesh network; a wearable appliance having a sound transducer coupled to the wireless transceiver; and a bio-electric impedance (BI) sensor coupled to the wireless mesh network to communicate BI data over the wireless mesh network. In another aspect, a heart monitoring system for a person includes one or more wireless nodes forming a wireless mesh network and a wearable appliance having a sound transducer coupled to the wireless transceiver; and a heart disease recognizer coupled to the sound transducer to determine cardiovascular health and to transmit heart sound over the wireless mesh network to a remote listener if the recognizer identifies a cardiovascular problem. The heart sound being transmitted may be compressed to save transmission bandwidth. In yet another aspect, a monitoring system for a person includes one or more wireless nodes; and a wristwatch having a wireless transceiver adapted to communicate with the one or more wireless nodes; and an accelerometer to detect a dangerous condition and to generate a warning when the dangerous condition is detected. In yet another aspect, a monitoring system for a person includes one or more wireless nodes forming a wireless mesh network; and a wearable appliance having a wireless transceiver adapted to communicate with the one or more wireless nodes; and a heartbeat detector coupled to the wireless transceiver. The system may also include an accelerometer to detect a dangerous condition such as a falling condition and to generate a warning when the dangerous condition is detected. In yet another aspect, a monitoring system for a person includes one or more wireless nodes forming a wireless network; and a wearable device including: a processor; a transceiver coupled to the processor to communicate with the one or more wireless nodes; a wearable sensor on a patch or bandage secured to the person's skin and coupled to the processor; an accelerometer coupled to the processor; and a thumb sensor coupled to the processor. In another aspect, a health monitoring system for a person includes a mobile telephone case including a cellular transceiver to provide wireless data and voice communication; a sensor including one or more electrodes mounted on the mobile telephone case to contact the person's skin and capture bio-electrical signals therefrom; an amplifier coupled to the electrodes; a processor coupled to the amplifier; and a screen coupled to the processor to display medical data such as images of the bio-electrical signals. Implementations of the above aspect may include one or more of the following. The wristwatch determines position based on triangulation. The wristwatch determines position based on RF signal strength and RF signal angle. A switch detects a confirmatory signal from the person. The confirmatory signal includes a head movement, a hand movement, or a mouth movement. The confirmatory signal includes the person's voice. A processor in the system executes computer readable code to transmit a help request to a remote computer. The code can encrypt or scramble data for privacy. The processor can execute voice over IP (VOIP) code to allow a user and a remote person to audibly communicate with each other. The voice communication system can include Zigbee® VOIP or Bluetooth® or UWB VOIP or 802.XX VOIP. The remote person can be a doctor, a nurse, a medical assistant, or a caregiver. The system includes code to store and analyze patient information. The patient information includes medicine taking habits, eating and drinking habits, sleeping habits, or excise habits. A patient interface is provided on a user computer for accessing information and the patient interface includes in one implementation a touch screen; voice-activated text reading; and one touch telephone dialing. The processor can execute code to store and analyze information relating to the person's ambulation. A global positioning system (GPS) receiver can be used to detect movement and where the person falls. The system can include code to map the person's location onto an area for viewing. The system can include one or more cameras positioned to capture three dimensional (3D) video of the patient; and a server coupled to the one or more cameras, the server executing code to detect a dangerous condition for the patient based on the 3D video and allow a remote third party to view images of the patient when the dangerous condition is detected. In another aspect, a monitoring system for a person includes one or more wireless bases; and a cellular telephone having a wireless transceiver adapted to communicate with the one or more wireless bases; and an accelerometer to detect a dangerous condition and to generate a warning when the dangerous condition is detected. In one aspect, systems and methods include one or more entities including a sensor configured to provide data in at least a first information standard from a first manufacturer and a second information standard from a second manufacturer; and an electronic health record database configured to: capture information from the one or more entities, normalize the captured information from first and second manufacturers in a common format, and add metadata for the captured information. In another aspect, an interoperable health-care system includes a network; one or more medical data collection appliances coupled to the network, each appliance transmitting data conforming to an interoperable format; and a computer coupled to the network to store data for each individual in accordance with the interoperable format. The user can take his/her weight, blood pressure, and cholesterol measurement daily, and the data is sent from a health base station to a monitoring service at his doctor's office. Periodically, the user gets an automated health summary generated by a service at his doctor's office as well as information to help him maintain a healthy lifestyle. The health information can be stored in an external HIPAA compliant health storage database so that the user and his doctor can access his health information over the web. The system extends health care system into the home and can record personal health data on a systematic periodic basis. Appointments can be automatically scheduled with providers. Long-term data for medical baseline can be collected. The system can also provide predictive alerts for high-risk conditions. The system can perform initial triage utilizing biosensors, images, e-mail/chat/video.

In one embodiment, the radio is a micro-positioning radio such as a 5G enabled micro-positioning radio. IoT modules include a computer processor connected to UWB via either a cable or via a socket connection. The modules also include a communication radio to send data to a separate processor for display. Modules can be placed on corners but can also be in a variety of components or added as a plug and play using magnets or other forms of temporary attachments. The modules can be placed on a support structure such as a room or a vehicle in a temporary fashion without manually measuring the position because the UWB can be used to range between modules and establish the room, office vehicle, lab, conference room, or cubicle as a constellation with known relative positions. The ranges between the modules are inputted to the software on the processor. The software uses the ranges to create a known geometric constellation of the UWB radios and then uses the known offset of the modules to calculate the relative locations of the modules to one another. These ranges are then used by the software on the processor to trilaterate to the external device. The relative location of the external device is used by software on the processor to produce a range and bearing to the potential target. Event Horizon Calculation is then done. The range and bearing are inputted to software that is running a main event loop to track the event horizon—the timing associated with a possible collision. The software stores the data in a linked list and uses this linked list to compare the current range and bearing to the previous range and bearing for that same external device. The distance between the current and previous locations is used to calculate rate of speed and the time associated with nearby people and then the radio ID of the nearby people can be recorded to enable accurate and rapid automated contact tracing. In this manner, contact tracing using mobile app, smart watches, and physical tracing is provided to rapidly contain infections. One embodiment provides a UWB Exposure Notification Service for proximity detection of nearby wearable devices and smartphones, and for the data exchange mechanism. Exposure Notification Service uses the UWB service for detecting device proximity. It uses a Temporary Exposure Key—A key that's generated every 24 hours for privacy consideration. The result is a Diagnosis Key—The subset of Temporary Exposure Keys uploaded when the device owner is diagnosed as positive for the coronavirus. A Rolling Proximity Identifier which is a privacy preserving identifier derived from the Temporary Exposure Key can be sent in the broadcast of the UWB payload. The identifier changes about every 15 minutes to prevent wireless tracking of the device. An Associated Encrypted Metadata (AEM) is a privacy preserving encrypted metadata used to carry protocol versioning and transmit (Tx) power for better distance approximation. The Associated Encrypted Metadata changes about every 15 minutes, at the same cadence as the Rolling Proximity Identifier, to prevent wireless tracking of the device.

Another embodiment provides a smartphone app for employers that uses UWB signals (but Bluetooth® can be used as well), Wi-Fi®, GPS and other data to track where employees go around the office, who they come into contact with and for how long, to enable human resources or corporate security managers to quickly access the data in the event of a workplace outbreak and notify employees who may have been exposed. Employees will wear wristbands or carry credit card-size badges that collect UWB signals about their whereabouts and proximity to one another; that data is sent to devices that transmit it to the cloud. The chatbot identifies spots where infected workers may have recently gathered, enabling companies to shut down specific areas, rather than an entire building, for deep cleaning. The badges are preferred where employees are not allowed to bring their personal phones, as well as to people who would rather not have their employers track them on their smartphones. A Health Dashboard allows HR admins to view a list of their active employees, the most recent COVID-19 health status for each employee, and the date the record was last updated. Admins can view more details about each employee's COVID-19 history (such as a list of test results over time), and can click to verify or re-verify an employee's status. When an employer clicks "Verify", the designated employee will receive a communication such as a text or an email taking them to a consent-based chatbot flow where they can securely share their COVID-19 health data with their HR team. The employee will be required to submit information such as recent lab test results, and the system may then verify that information with the lab itself. The employee can connect tracing apps to the platform, confirming they have not been in contact with an infected individual.

Office management will opt for the screening of all employees, vendors and visitors entering their facility based on the most appropriate methods for their particular space. These may include app-enabled questionnaires, temperature checks, newly installed thermal cameras or direct virus testing when it becomes more widely available. Hourly or daily screenings of employees, vendors and visitors, making it commonplace and fully integrated with the security access control system to screen out people presenting with symptoms or known to be infected. As the availability of testing increases, those carrying antibodies or testing negative for the virus will screen in and be allowed access. Lobbies include testing stations, screening queues, speed lanes, designated check in times and self-check kiosks. A building access control system is used as part of the contact tracing by mandating credential use for both entry and exit traffic for buildings, floors, tenant office suites and common areas at all times. UWB proximity data can be further supplemented via intelligent face recognition learning machines to investigate close personal contact for more detailed tracking so people who are impacted by pathogen exposure can be quickly and easily notified. The chatbot can monitor and manage real-time space occupancy, supplementing physical guides to reinforce social distancing with real-time data reporting to provide notifications for issues such as exceeding floor-level occupancy and suggest the need for greater social distancing if the number of people in a space is too high. Utilizing access control, the chatbot can assist tenants in enforcing staggered work schedules to minimize density.

By enabling a network of readily connected health and medical devices, people with Covid or infectious disease or other chronic diseases will be able to share vital sign information such as blood pressure and glucose level with their doctors. Adult children will be able to remotely watch over their aging parents and proactively help them manage safely in their own homes. Diet and fitness conscious individuals will also be able to seamlessly share their weight and exercise data with fitness consultants through the Internet. The above system forms an interoperable health-care system with a network; a first medical appliance to capture a first vital information and coupled to the network, the first medical appliance transmitting the first vital information conforming to an interoperable format; and a second medical appliance to capture a second vital information and coupled to the network, the second medical appliance converting the first vital information in accordance with the interoperable format and processing the first and second vital information, the second medical appliance providing an output conforming to the interoperable format. The appliances can communicate data conforming to the interoperable format over one of: cellular protocol, ZigBee protocol, Bluetooth® protocol, WiFi® protocol, WiMAX protocol, USB protocol, ultrawideband (UWB) protocol. UWB is a short-range, wireless communication protocol that uses a wide spectrum of several GHz. UWB acts as a radar that can continuously scan an entire room and precisely lock onto another UWB object or mobile device to discover its location and communicate data and for location discovery and device ranging with precision. The appliances can communicate over two or more protocols. The first medical appliance can transmit the first vital information over a first protocol (such as Bluetooth or UWB protocol) to a computer, wherein the computer transmits the first vital information to the second medical appliance over a second protocol (such as ZigBee prototocol). The computer can then transmit to a hospital or physician office using broadband such as WiMAX protocol or cellular protocol. The computer can perform the interoperable format conversion for the appliances or devices, or alternatively each appliance or device can perform the format conversion. Regardless of which device performs the protocol conversion and format conversion, the user does not need to know about the underlying format or protocol in order to use the appliances. The user only needs to plug an appliance into the network, the data transfer is done automatically so that the electronic "plumbing" is not apparent to the user. In this way, the user is shielded from the complexity supporting interoperability. In another aspect, a monitoring system for a person includes one or more wireless nodes and a stroke sensor coupled to the person and the wireless nodes to determine a medical problem, for example a stroke attack. The stroke monitoring system is interoperable with emergency vehicle and/or hospital systems and provides information to quickly treat stroke once the patient reaches the treatment center.

In one aspect, a monitoring system for a person includes one or more wireless nodes and an electromyography (EMG) sensor coupled to the person and the wireless nodes to determine a medical issue such as a stroke attack. In another aspect, a health care monitoring system for a person includes one or more wireless nodes forming a wireless mesh network; a wearable appliance having a sound transducer coupled to the wireless transceiver; and a bioelectric impedance (BI) sensor coupled to the wireless mesh network to communicate BI data over the wireless mesh network. In a further aspect, a heart monitoring system for a person includes one or more wireless nodes forming a wireless mesh network and a wearable appliance having a sound transducer coupled to the wireless transceiver; and a heart disease recognizer coupled to the sound transducer to determine cardiovascular health and to transmit heart sound over the wireless mesh network to a remote listener if the recognizer identifies a cardiovascular problem. The heart sound being transmitted may be compressed to save transmission bandwidth. In yet another aspect, a monitoring system for a person includes one or more wireless nodes; and a wristwatch having a wireless transceiver adapted to communicate with the one or more wireless nodes; and an accelerometer to detect a dangerous condition and to generate a warning when the dangerous condition is detected. In yet another aspect, a monitoring system for a person includes one or more wireless nodes forming a wireless mesh network; and a wearable appliance having a wireless transceiver adapted to communicate with the one or more wireless nodes; and a heartbeat detector coupled to the wireless transceiver. The system may also include an accelerometer to detect a dangerous condition such as a falling condition and to generate a warning when the dangerous condition is detected. Implementations of the above aspect may include one or more of the following. The wristwatch determines position based on triangulation. The wristwatch determines position based on RF signal strength and RF signal angle. A switch detects a confirmatory signal from the person. The confirmatory signal includes a head movement, a hand movement, or a mouth movement. The confirmatory signal includes the person's voice. A processor in the system executes computer readable code to transmit a help request to a remote computer. The code can encrypt or scramble data for privacy. The processor can execute voice over IP (VOIP) code to allow a user and a remote person to audibly communicate with each other. The voice communication system can include Zigbee VOIP or Bluetooth or UWB VOIP or 802.XX VOIP. The remote person can be a doctor, a nurse, a medical assistant, or a caregiver. The system includes code to store and analyze patient information. The patient information includes medicine taking habits, eating and drinking habits, sleeping habits, or excise habits. A patient interface is provided on a user computer for accessing information and the patient interface includes in one implementation a touch screen; voice-activated text reading; and one touch telephone dialing. The processor can execute code to store and analyze information relating to the person's ambulation. A global positioning system (GPS) receiver can be used to detect movement and where the person falls. The system can include code to map the person's location onto an area for viewing. The system can include one or more cameras positioned to capture three dimensional (3D) video of the patient; and a server coupled to the one or more cameras, the server executing code to detect a dangerous condition for the patient based on the 3D video and allow a remote third party to view images of the patient when the dangerous condition is detected. More details are disclosed in application Ser. No. 16/894,040 and 16/894,058, the contents of which are incorporated by reference.

In one aspect, a method to assist people in an infectious disease outbreak includes: providing a mobile fitness device to monitor and upload activity and vital sign to a fitness device server on a periodic basis; collecting daily health data from the fitness device server, collecting medical data for a person from a medical institution, and collecting infectious treatment data from predetermined sources including a government and a non-governmental organization (NGO); training a chatbot with a deep neural network with the collected data; and responding to a query by querying data from the mobile fitness device and retrieving an answer from the deep neural network based on vital sign and activity history. In another aspect, a system includes a mobile fitness device to collect exercise and vital signs from a user; and a chatbot to assist people in an infectious disease outbreak with a processor to: provide a mobile fitness device to monitor and upload activity and vital sign to a fitness device server on a periodic basis; collect daily health data from the fitness device server, collecting medical data for a person from a medical institution, and collecting infectious treatment data from predetermined sources including a government and a non-governmental organization (NGO); train a chatbot with a deep neural network with the collected data; and respond to a query by querying data from the mobile fitness device and retrieving an answer from the deep neural network based on vital sign and activity history.

Implementations of the above aspects may include one or more of the following additions to the above aspect:
2. training the deep learning machine with logically grouped or clustered data to provide context and biasing the answer based on the context.
3. grouping the data by age, sex, race, home location, health history, exercise history, family genetics, social economics, or risks for one or more diseases.
4. collecting recent data from mobile fitness devices, retrieving prior interactions with the user and prior health reports, and history of people in contact with the user.
5. collecting contract tracing data and training the deep neural network with the contact tracing data and data from people having contacts with a user.
6. capturing contract tracing data using ultra-wide-band (UWB).
7. determining a group or cluster best matching the person's health condition data and apply the customization information to bias the learning machine to generate a context-sensitive answer.
8. detect a user emotion during a chat and altering the answer based on the user emotion to provide empathy or to request professional help.
9. detecting emotion using a user facial expression or a verbal expression.
10. detects risks including suppressed immune system, a cancer condition, an organ transplant condition, infectious disease susceptibility, a healthcare work condition, an at-risk location.
11. collecting vital signs from mobile fitness device and detecting a core body temperature pattern, breathing pattern, coughing pattern, and walking/exercise patterns to detect changes indicative of an infectious disease.
12. detecting a breathing rate, a coughing pattern, a walking pattern, an exercise pattern.
13. detecting with the chatbot and the mobile fitness device fever or chills, cough, shortness of breath or difficulty breathing, fatigue, muscle or body aches, Headache, New loss of taste or smell, sore throat, congestion or runny nose, nausea or vomiting, diarrhea, breathing problem, chest pain or pressure, confusion during chat, ability to wake or stay awake, color change in a lip or a face.
14. detecting if a chronic condition needs treatment, and recommending treatment when treatment is suspended.
15. providing a rich text, a structured markup, a schema, microdata, or sematic tags on a web page for search engine optimization.
16. providing a ClaimReview Schema on a web page to improve trust in a disease recommendation.

In another aspect, a chatbot can be used for determining an infection candidate, comprising: receiving COVID trial enrollment criteria from a user including a combination of genetic variants for which a drug or therapy is likely to respond; searching a knowledge base of patient test information received from a plurality of independent entities for patients that match the trial enrollment criteria, wherein the knowledge base comprises an ontology data structure that identifies a causal relationship between a genetic variant and a phenotype based on a combination of the genetic variant and modifier variant information, wherein the knowledge base links the genetic variant and the modifier variant information, wherein the modifier variant information is based on curated evidence, and wherein the modifier variant information identifies whether modifier variants that modify a severity of the phenotype are likely to exist; and providing to the user search results for consented patients that match the trial enrollment criteria; wherein at least one of the receiving, searching, or providing are performed by one or more computers. In implementations, the test information comprises at least one of patient test information, patient sequence variant information, patient medical record information, patient location information, test site location information, patient phenotype information, and patient consent information.

Advantages of the medical chatbot includes one or more of the following. The bot enables healthcare companies and government entities to reach patients and audience directly. The bot answers questions in a realistic and with empathy through engaging use of personality, knowledge and display of empathy. The length of the agent's utterances is important in achieving better results with human evaluators. If they're too short, the responses are dull and communicate a lack of interest; if they're too long, the chatbot seems to waffle and not listen. The bots also use real time data from fitness monitoring devices such as smart watch and incorporate that information into the conversation and get timely assistance or care for the patient. The bot helps agencies save time and money on patient care. Patients and customers expect 24/7 availability, but they hate waiting on hold. They also ask many of the same questions over and over (and over) again. The bots greet potential customers, by identifying their needs, asking basic questions, (i.e., "Do you have any symptoms?") and only direct urgent care issues to medical professionals. Bots can do the selling with the right script. With the bot, conversational commerce leaves room for personalized upselling as the bot makes suggestions. The bots are capable of retaining information, and those details can reach out personally, offering relevant content at the right time. The bot reminds employees to apply the hand sanitizer and cleaning wipes on the premises, and checks that their offices all be cleaned and sanitized frequently. The system reminds employees at appropriate time to conform to Social Distancing. Data from chatbot screening enables employees to feel comfortable coming back to their offices. A person who is known to be infected or showing symptoms is not to be allowed access. The system provides Privacy & Security. Like other sensitive healthcare information, COVID-19 status data needs to be handled extremely carefully by employers. Top of mind considerations include receiving consent from employees to share their health information, securing data infrastructure to store this info, and limiting access control to this information within the company. The system provides flexibility for multiple inputs. Guidance from government agencies and the scientific community is changing all the time on what an employer needs to verify to bring an employee back to work. This includes a combination of antibody test results, data pulled from contact tracing apps, and any history of confirmed infection. HR teams need to connect these inputs to a variety of human resources information systems (HRIS) to match active employee records with COVID-19 related data. With people consent, the system can combine different inputs (such as user-submitted information and trusted third-party sources) to verify this sensitive data while restricting access to employees and designated admins.

FIG. 4A shows top level views of the GPT, BERT, and Transformer architectures with a token bias process to provide context sensitive short or long form text generation. The context sensitivity becomes important in long form text generation as the result is more responsive to the brief text provided by the user who expects the system to amplify his/her thoughts into a full sentence or paragraph in the case of drafting text. In the case of code generation or ASIC chip generation, the token bias allows more accurate functional blocks to be suggested in a top-down design system, for example.

The GPT-2 is built using transformer decoder blocks. The model is constructed using the basic concept of Transformer, Attention, etc, for pre-training a dataset composed of Common Crawl, Wikipedia™, WebText, Books and some additional data sources. The GPT-3 language model has 175 billion parameters. A parameter is a measurement in a neural network that deploys a large or small weightage to a few aspects of data, for providing that aspect larger or smaller importance in an entire measurement of the data. These are the weights that deliver shape to the data, and provide a neural network an understanding angle on the data. GPT-3 involves adjusted initialization, pre-normalization, and changeable tokenization. It reflects substantial performance on various NLP tasks and benchmarks in three distinct shots, i.e. zero-shot, one-shot and some-shot environments. BERT, on the other hand, uses transformer encoder blocks. One difference between the two is that GPT2, like traditional language models, outputs one token at a time, the model to predict the next token in a sequence, rather than converting one sequence to another functionally identical one. The output layer is modified to reflect the probability biasing. These models predict the next token in a sequence, rather than converting one sequence to another functionally identical one, and the output layer uses probability biasing discussed above. FIG. 4B shows the encoder and decoder stacks of the Transformer architecture. FIG. 4C shows in more detail the encoder and decoder blocks of the Transformer architecture with the output probabilities biased to account for context in generating machine responses.

FIGS. 4D-4E show additional views of the transformer architecture that takes a sequence of n word embeddings. For position information, a positional embedding is added to each word embedding using sine and cosine functions to form a continuous binary encoding of positions in a sequence. Multtihead attention is used to encode the input embeddings where input order in the sequence is lost so positional embeddings are used. As is known to one skilled in the art, the transformer uses the encoder attention, the encoder-decoder attention and the decoder attention. The attention mechanism is implemented as a vector multiplication, where the angle of the vector one can determine the importance of each value. If the angles of the vectors are close to 90 degrees, then the dot product will be close to zero, but if the vectors point to the same direction, the dot product will return a greater value. Each key has a value associated, and for every new input vector, we can determine how much does this vector relates to the value vectors, and select the closest term using a softmax function. Transformers have a multihead attention; similar to filters in CNN's, each one learns to pay attention to a specific group of words. One can learn to identify short-range dependencies while others learn to identify long-range dependencies. The model to predict the next token in a sequence, rather than converting one sequence to another functionally identical one. There would also be some changes made to output layer (probability biasing). This improves the context-awareness to help the model determine the terms referred to when it's not clear; for example, with words such as pronouns.

The Encoder and Decoder are composed of modules that can be stacked on top of each other multiple times and the modules consist mainly of Multi-Head Attention and Feed Forward layers. The inputs and outputs (target sentences) are first embedded into an n-dimensional space since strings are not used directly. The positional encoding of the different words are added to the embedded representation (n-dimensional vector) of each word. One commonly used attention calculation can be:

$$\text{Attention}(Q, K, V) = \text{softmax}\left(\frac{QK^T}{\sqrt{d_k}}\right)V$$

where Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence than Q. However, for the attention module that is considering the encoder and the decoder sequences, V is different from the sequence represented by Q. To simplify, the values in V are multiplied and summed with attention-weights a, defined by:

$$a = \text{softmax}\left(\frac{QK^T}{\sqrt{d_k}}\right)$$

Weights a are defined by how each word of the sequence (represented by Q) is influenced by all the other words in the sequence (represented by K). Additionally, the SoftMax function is applied to the weights a to have a distribution between 0 and 1. Those weights are then applied to all the words in the sequence that are introduced in V (same vectors than Q for encoder and decoder but different for the module that has encoder and decoder inputs).

The attention-mechanism can be parallelized into multiple modules and is repeated multiple times with linear projections of Q, K and V. This allows the system to learn from different representations of Q, K and V. These linear representations are done by multiplying Q, K and V by weight matrices W that are learned during the training. Those matrices Q, K and V are different for each position of the attention modules in the structure depending on whether they are in the encoder, decoder or in-between encoder and decoder. The reason is that we want to attend on either the whole encoder input sequence or a part of the decoder input sequence. The multi-head attention module that connects the encoder and decoder will make sure that the encoder input-sequence is considered together with the decoder input-sequence up to a given position. After the multi-attention heads in both the encoder and decoder, the transformer has a pointwise feed-forward layer. This feed-forward network has identical parameters for each position, which can be described as a separate, identical linear transformation of each element from the given sequence.

While the system uses a standard transformer as described above, the process applies the above commonly used transformer architecture and tunes the training for long text generation that is guided by an outline so that the long form text is useful. This combines increased model size while sacrificing convergence by stopping training early. As larger models converge to lower test error in fewer gradient updates than smaller models, large models achieve higher accuracy faster for training and speed during inference is achieved using model compression. In the instant process, large models are used on large text clustered into specific groups or technology or market segments, or IPC code, for example. The output probabilities are biased according to a customization indicium data (for example the IPC mentioned above). Such training creates custom models for each context based on the output probabilities as biased. One embodiment uses quantization and pruning to reduce the inference latency and memory requirements of storing model weights. Quantization stores model weights in low precision and pruning sets predetermined NN weights to zero.

During inference, the process includes:
Input the full encoder sequence (a short phrase) and as decoder input, an empty sequence is used with only a start-of-sentence token on the first position. This will output a sequence with the first element.
That element will be filled into second position of the decoder input sequence, which now has a start-of-sentence token and a first word/character in it.
Input both the encoder sequence and the new decoder sequence into the model with the biased output probability incorporating the context sensitive data. Take the second element of the output and put it into the decoder input sequence.
Repeat this until done.
One embodiment predicts an end-of-sentence token, which marks the end of the phrase expansion into a sentence, paragraph, or long form text, among others.
Multiple runs through the model are used for the text expansion process.
The models can have different parameters of the Transformer, such as the number of decoder and encoder layers, and the results can be tuned and trained with large corpus for improving output.

In another embodiment for video inferencing, the process is trained on predicting an image (or brief video) and generating a longer video sequence. The process includes:
Input the full encoder sequence (a short phrase or starting image/video) and as decoder input, an empty sequence is used with only a start-of-video token on the first position. This will output a sequence with the first element.
That element will be filled into second position of the decoder input sequence, which now has a start-of-video token and a first image in it.
Input both the encoder sequence and the new decoder sequence into the model (optionally with the biased output probability incorporating the context sensitive data in another embodiment). Take the second element of the output and put it into the decoder input sequence.
Repeat this until done.
Multiple runs through the model are used for the video expansion process.
One embodiment generates videos from a milestone image. They can use transformers, GANs, and VAEs, or combinations thereof. One embodiment (FIG. 4H) uses Generative Adversarial Network (GAN), a framework for training generative models in an adversarial setup with two networks, a generator that creates object instances (e.g., images, sentences) and tries to fool a discriminator; and a discriminator is trained to discriminate between real and synthetic object instances.

FIG. 4G shows a convolutional network for generating videos from thumbnail images or videos in storyboards. The input clip goes through a series convolutions and nonlinearities that preserve resolution. After integrating information across multiple input frames (if multiple), the network up-samples temporally. The network outputs codes for a transformation of the input frames, which produces the final video. In the transformations: For each (x; y; t) coordinate in the video expansion, the network estimates a weighted combination of neighboring pixels from the input frame to render the predicted frame. The transformation is applied by convolution. The transformer output probability is biased by video context as done in the prior transformers.

One embodiment uses the GAN with a spatio-temporal convolutional architecture that untangles the scene's foreground from the background. This model can generate tiny videos up to a second at full frame rate better than simple baselines and can predict plausible futures of static images. The generator uses a deep convolutional network that inputs low-dimensional random noise and outputs a video. Spatiotemporal up-convolutions (2D for space, 1D for time) are used to model video. The generator also models the background separately from the foreground. The network produces a static background (which is replicated over time) and a moving foreground that is combined using a mask. A discriminator network is used to distinguish real videos from fake videos.

Another embodiment utilizes GANs with Spatial Transformer Networks (STNs) as the generator or Spatial Transformer GANs (ST-GANs). ST-GANs seek image realism by operating in the geometric warp parameter space. The ST-GAN can generate high-resolution images indirectly since the predicted warp parameters are transferable between reference frames.

Yet another embodiment uses Variational Autoencoders (VAEs) with two neural networks: an encoder comprised of convolutional layers that encode an object (image, text, sound) into a latent vector; and a decoder comprised of deconvolutional layers that decode a latent vector back into the object. As the autoencoder network reconstructs the data but cannot generate new objects, the variational autoencoder (VAE) requires an additional feature that allows it to learn the latent representations of the inputs as soft ellipsoidal regions rather than isolated data points. New data can be generated by sampling latent vectors from the latent space and passing them into the decoder.

The system can help expand the creativity of the user, and one embodiment applies the system for educational or other charitable purposes. Next, a method for financing education for a student studying at an institution by leveraging from the student's creativity includes: providing an on-line creative work generation tool to the student to draft and submit a creative work as part of an entrance requirement, a class requirement or a graduation requirement; and receiving a completed creative work and checking creative work quality and upon passing acceptant criteria, rewarding the student or the institution with a grant to offset educational expenses for the student.

The above method includes one or more of the following implementation details:

Crowd-sourced quality assurance of the student's creative work by having other students in the class rate, review and critique the creative work.

Crowd-sourced quality assurance of the student's creative work by having the teacher or professor for the class rate, review and critique the creative work.

Crowd-sourced quality assurance of the student's creative work by having an intra school competition where selected members of the school rate, peer-review and critique the creative work.

Crowd-sourced quality assurance of the student's creative work by having an inter-school competition where judges rate, review and critique the creative work.

Crowd-sourced quality assurance of the student's creative work by having industry-experts rate, review and critique the creative work.

Crowd-sourced quality assurance of the student's creative work by having a creative work searcher rate, review and critique the creative work.

The system can rank the quality of the creative work by comparing the requested exclusivity to a library of white-spaces or open spaces for creative working.

The school can require each student to submit a creative work as part of the graduation requirement.

Criteria for grading the creative work can include detail/depth of solution based on number of figures/pages.

The system can establish a professional internship program by obtaining a sponsor contract with a sponsor for a full-time equivalent job internship position to commercialize the subject of the creative work; establishing a program by obtaining a license agreement for the creative work; and acquiring donations for the creative work.

The individual funds are tuition, vouchers, public vouchers, private vouchers, grants, and scholarships, government funds, charter funds.

The educational institution can be physical locations or can be virtual schools where students attend class over the Internet.

The sponsor can be a business, the school, a not-for-profit entity, or a government entity.

A college incentive program can be formed by providing the students direct subsidies for college or college loan repayment assistance upon sale of the creative work.

The student can form a venture to commercialize the idea. The venture can be funded by investors including alumni of the institution, angels, venture capitalists, crowdfunding, micro-funds, or microloans.

The institution can have a financial stake in the new venture in exchange for use of its assets, such as athletic facilities, classrooms, laboratories, libraries, media centers, fine art spaces, performing arts spaces, conference room, technology centers, and the brand name of the institution.

The funders can base their decisions on the novelty of the idea, the current commercial trends in the creative workspace associated with the creative work.

The funders can base their decisions on the students' financial history, grade or educational ranking, and teacher recommendation.

The funders can purchase the creative work and bundle the application into bundles for sale or for use to license as a defense or counterclaim in a creative work litigation.

FIG. 5A shows one embodiment for enabling more students to attend school and providing more resources for the school. The process includes providing an on-line creative work generation tool to the student to draft and submit a creative work as part of a class requirement or graduation requirement (50) and receiving a completed creative work and checking creative work quality and upon passing acceptant criteria, rewarding the student or the institution to offset educational expenses for the student (60).

FIG. 5B shows another embodiment for non-profit financing using student creativity. The method includes providing an on-line creative work generation tool to the student to draft and submit a creative work as part of a class requirement or graduation requirement. Crowd-sourced quality assurance can be done for the student's creative work by having other students in the class rate, review and critique the creative work. Other people who performs quality assurance for creative work can include the teacher or professor or industry expert who rate, review and critique the creative work. The system receives a completed creative work and checking creative work quality and upon passing acceptant criteria, rewards the student or the institution to offset educational expenses for the student. To generate funds for the financing process, the system can pool the creative works to bundles of rights for commercialization with companies.

In one embodiment, when the student submits the creative work as part of the entrance or graduation requirement, the system checks for plagiarism. If plagiarism is detected, the submission is rejected, and school ethics officials are notified and the student faces an investigation and the penalty associated with cheating. Moreover, the student's file is annotated on the social network profile and the credit rating for microloans is negatively affected. The plagiarism check includes checking the creative work that has been submitted as an individual's own work against creative work database and a search engine.

One tool used to help grade the submission and rate the quality of the creative work or intangible asset employs information retrieval technique and/or a learning machine that examines the text of a set of exclusionary claims or requested exclusivity that defines, in technical terms, the extent, i.e. the scope, of the protection sought in an application to be submitted to an authority such as a government agency for example. In other words, the purpose of the claim or exclusivity is to define which subject-matter is protected upon issuance of the government grant. This is termed as the "notice function" of the exclusivity or claim—to warn others of what they must not do or copy. The corresponding creative works or intangible asset may then be ranked according to the degree to which their respective requested exclusivity sets represent significant innovation above and beyond existing work. For example, a creative work may be considered valuable if the subject matter in the creative work is cited by, relied upon, or expanded upon in subsequently filed creative works. In preferred embodiments and implementations, a user may interact in the process to refine the analysis.

Another embodiment of a system or method of financing or providing education utilizes an extension program for alumni to use the IP development program to leverage the connection with the school to get funding for a business idea. In an embodiment, the extension program is a subsidiary of the school, structured as a charitable organization. In one embodiment, each accepted creative work earns the student points in an account managed by the school. When the student has earned sufficient points, he or she can redeem the points at the school web site to assist the student or one or more other students to pay for higher-education costs such as books and other supplies.

In another embodiment, inventors not affiliated with the school can donate ideas and creative work to the school by submitting the concepts using the creative work generation system as donations and then can designate the resulting awards to be disbursed to students. The school acts as an escrow for the future monetization of the idea, and the school can provide a tax receipt showing a predetermined value for the idea based on market valuation so that the donor can get tax benefits and when future royalties arrive, the university can provide tax donation receipts to the donor using predetermined formulas. Thus, any monetization of such donated work will be credited to the donor in the form of tax benefits and good will as donors to the university, while all the rewards accrue for the benefit of the higher-education institution or direct to the students.

In another embodiment, an entrepreneur student can apply for micro-financing to move his/her idea to the marketplace. The student can also borrow small amounts to finance educational expenses. The microlender can make quick decisions from big data associated with cell phone and grade point information, among others. For example, cell phone usage can provide:

---

Average prepaid balance for each of the last twelve months
List of all top up transactions (volume, date)
Top up regularity and frequency will be calculated from #3
Incoming call volume Outgoing call volume Number of unique incoming calls (ie different numbers)
Number of unique outgoing calls (ie different numbers)
Geographical reach of incoming calls
Ocographical reach of outgoing calls
Total number of incoming texts
Total number of outgoing texts
Distance between furthest points of the user's locations
Total miles travelled
Average length of incoming calls (exclude promotional ones unless everyone gets the same ones), Average length of outgoing calls
Total number of minutes the phone is connected to the network
Total amount of time in use ie percentage activity metric for all activities
Texts coming from anique numbers
Texts going to unique numbers
Call regularity
Call frequency
Average prepay balance when new airtime is purchased
Number of SIM cards for given mobile operator
Length of time SIM card has been owned
Whether the SIM has been transferred to or from a different mobile operator
Gender
Zip code of SIM registration (could also be useful to compare to zip code of loan app)
Age/Date of Birth
Active mobile money account
Any payments to businesses/institutions (and volume, frequency, etc.)
Average balance in mobile money account
Number of missed calls per month
Data usage per month
Spending on extras (ringtones, etc)
Tariff/rate plan changes in past X months
Number of international calls incoming/outgoing

---

In another embodiment, micro-lending for a small amount such as $5 or more can be done by the system upon receipt of the creative work submission. The system can rate the creative work as detailed above, and additionally, the student credit rating can be inferred from his/her cell phone statistics, and grade point average and other data gleaned from the students' social network activity. Based on the information, a regression can be done to estimate the probability of defaults so that the computer can allocate lending for educational use or for launching a venture based on the creative work concepts.

Other embodiments provide a method of financing expected future educational expenses by (a) calculating future educational expenses based on current educational expenses, past changes in educational expenses, and assumptions on annual increase rates of educational expenses; (b) establishing a target for future total investment payout for total future educational expenses based on calculated future educational expenses, and assumptions on expected investment yields; (c) deriving present investment amount needed to provide future educational expenses; (d) generating creative works or intangible assets to sell to satisfy the present investment amount and collecting payment of the present investment amount; and (e) investing the payment to provide funds for payment of the future educational expenses.

In another embodiment shown in FIG. 5C, the non-profit entity can pool the ideas into pools that can be used to license commercial entities who in turn pay into a pool to support the non-profit entity. The pool can include unsolicited new ideas and solicited ideas requested by companies, for example. In one example, students can come up with ingenous ideas on a problem without any prompting. In another example, a company can seek ideas in a particular task. For example, SBIR programs commonly request solutions to a predetermined problem, and the university can put these requests on a "problem to be solved" page where students can propose concepts for professor review and upon agreement between professors and students, the students can be granted access to the instant system to document their ideas before implementation and to update the ideas as they are implemented. Moreover, students in the same school or entity can join the system and collaborate as co-creators of the idea. A pool of ideas can be created and such pools can be offered to companies for use. This is controlled crowsourcing where the companies gain benefit from a large number of brains and external ideas without a large risk of paying for a large R&D department that may have NIH syndrome, for example. In one implementation, the pools can periodically apply as provisionals using university discounts or non-profit discounts, and immediately available under agreements to the companies to try for one year, and one utility conversion that is kept alive through continuations is done to ensure continuity of protection for all ideas in the provisional document. This arrangement keeps large number of ideas in the pool alive for twenty years so the university or non-profit can continue to benefit while keeping cost low. Companies that receives rights from the university or non-profit also can claim the benefit of exclusivity or the good will of donors to the schools, or both.

In another embodiment, a company can make available the system as a freemium system where users can try the system for free up to a predetermined number of drawings such as 3 figures. After that, the system offers continued usage for a fee or for a percentage of profit, for example. Ideas entered using the system can be securely tracked using Ethereum blockchain as detailed in U.S. Pat. No. 10,195,513 to the instant inventor, the content of which is incorporated by reference. The use of blockchain provides solid proof of conception and ownership in case the priority date is important, and the use of the instant methods enable rapid filing in a first to file system. The blockchain annotation also is proof that the system was used to generate the idea at a particular time to resolve any rights disputes.

In another embodiment, the system can be ad-supported. As new products are being generated, marketers, consultants, developers can offer to provide commercialization services to the user of the system or portal. As disclosed in United States Patent Application No. 20060190807 to the instant inventor, the content of which is incorporated, after connecting to the portal, the assistant checks for the latest updates in his areas of Interest and show them in a small window at the bottom left portion of the screen. The client software performs multiple tasks, including establishing a connection to the portal; capturing demographic information; authenticating a user via a user ID and password; tracking Web-sites visited; managing the display of advertising banners; targeting advertising based on Web-sites visited and on keyword search; logging the number of times an ad was shown and the number of times an ad was clicked on; monitoring the quality of the online session including dial-up and network errors; providing a mechanism for customer feedback; short-cut buttons to content sites; an information ticker for stocks, sports and news; and a new message indicator. When the user accesses the portal, a background window is shown on his or her computer screen that is always visible while the user is online, regardless of where the user navigates. The window displays advertisements, advertiser-sponsored buttons, icons and drop-down menus. By clicking on items in the background window, users can navigate directly to sites and services such as news, laws, seminars and conferences, connections to others with similar interests, auctions & exchanges, lawyers, businesses, mediators between two companies contesting the same IP subject matter, forms such as a non-disclosure agreement, IP updates and market place updates. Revenues can be generated by selling advertisements and sponsorships on the background window and by referring users to sponsors' Web-sites. The assistant shows advertisements while its window is visible. If the user clicks on an advertisement or news or related feature, the assistant will automatically launch the browser and take the user to the advertiser's site. The portal incorporates data from multiple sources in multiple formats and organizes it into a single, easy-to-use menu. Information is provided to the public free-of-charge with value added databases and services such as patent drafting assistance available to subscribers who pay a subscription fee. At a first level, the public can use without charge certain information domains in the portal. At a second level, individual inventors, very small companies and academic users can access the patent drafting software when they subscribe to a first plan with a predetermined annual membership fee and a transaction fee charged per patent application. At a third level, companies can access additional resources such as an IP portfolio management system, a docket management system, a licensing management system, and a litigation management system, for example. In this manner, the portal flexibly and cost-effectively serves a variety of needs. Other resources that the portal provides access to include traders who mediate between potential licensors and licensees.

The portal also provides access to a bid, auction and sale system wherein the computer system establishes a virtual showroom which displays the IPs offered for sale and certain other information, such as the offeror's minimum opening bid price and bid cycle data which enables the potential purchaser or customer to view the IP asset, view rating information regarding the IP asset and place a bid or a number of bids to purchase the IP asset. The portal has access to IP search engines that continuously search the web and identify information that is of interest to its users. These search engines will use the user profiles to search the web and store the results in the user folders. This information is also relayed to the users using the assistant. The portal delivers focused IP contents to interested subscribers and indirectly drives these subscribers and their businesses to innovate. The portal thus allows users to draft their own applications rapidly and accurately and in a manner that conforms to the requirements of the major national patent offices. Quality in the resulting patent application is achieved by providing an expert system in our software that guides members through each step of preparing an application. Speed is achieved by integrating the IP generation process with existing business workflow. When a communication from the patent office is received, the expert system guides the user through the process of responding. Since the member is generating the bulk of the work product, the cost in procuring the IP asset is reduce, while responsiveness is enhanced. A network of independent professionals such as lawyers can perform value-added pre-filing check to enhance the member's work product, if desired. Information relating to the network of attorneys will be maintained in a searchable database. Thus, members can search by the attorney's specific expertise (legal as well as technical) and by location. Members can then email the selected attorney a question. To prevent conflict issues, the members will be warned that the first question should be couched abstractly so that the invention is not revealed. Further, each attorney in the network automatically observes the applicable conflict rules in his or her jurisdiction before taking on the question.

Investors who wish to support an entrepreneur's creative idea/project have the opportunity to purchase branded tokens backed by the IP created using the instant system. Investors can pay in any tokens/coins or direct Ethereum blockchain transactions to buy the tokens. The investor's contribution is sent to Vault (secured money storage within smart contract). If the crowdsale wasn't successful, all the money from Vault is returned to the investors automatically. Once the funds are raised through the crowdsale, the "Production" stage of the project is launched. From this point, all received funds are stored in "Vault" and do not go directly to the entrepreneur. After successful completion of the crowdsale, the entrepreneur receives funds for the first step in the contract.

| Type | SPONSORSHIP | DEBT | REV. SHARE |
| --- | --- | --- | --- |
| Description | A stakeholder provides resource/support to the venture by buying portions of the IP in exchange for tokens. | An entrepreneur borrows money from a lender secured by the IP to be paid back in with interest | A stakeholder buys portions of an IP in exchange for tokens and revenue share in the project. |
| Vault (smart contract money storage) | Yes | Yes | Yes |
| Production control (Voting) | Yes | Yes | Yes |
| Bucket (storage for return) | — | Yes | Yes |
| Return | — | Yes, % | Yes, % |
| Return type | — | Predetermined recurrent payments (e.g. monthly, weekly payments) | Lifetime recurrent payments (e.g. monthly, weekly payments) paid using tokens |
| Business Control (decision making using voting system) | — | — | — |

One or more attorneys in the network can respond to the first question to initiate the consultation process, if no conflict exists. The parties can then negotiate fees relating to subsequent questions and/or work. As such, the portal supports a market-based system for getting qualified assistance. The portal generates revenues by providing advertisement space to law firms, attorneys, patent-support businesses and corporations. By having access to the member's IP interests, the Web site can provide pre-screened, high-quality investment opportunities that match the investor's identified interests. The web site thus finds and adds value to potential deals, allows investors to invest from seed financing right through to the IPO, and facilitates the hand off to top tier underwriters for IPO. Additionally, members have access to a broad community of investors focused on the cutting edge of high technology, enabling them to work together as they identify and qualify investment opportunities for IP or other corporate assets.

In one embodiment, an incubator model can be used where the incubator provides access to the instant tools herein, and further provides access to an ecosystem of investors and start-up consultants that can help the entrepreneur with engineering/development, sales/marketing, production, human resource, banker, lawyers, among others. In another embodiment, the system can be part of a crowdfunding platform where entrepreneurs can establish connection with investors via four different funding options (smart contracts) offered on the marketplace (donation, debt, revenue share, and equity).

If the entrepreneur uses the Revenue Share approach, the token may be a security and SEC registration may be needed. If the entrepreneur wishes to avoid security registration requirement, s/he can tokenize the asset and sell tokens to fund the project or borrow based on the asset. Buyers of such tokenized IP can have a use license, among others. The smart contract dictates the terms for the project's development. The terms of the offering are embedded in the smart contract. Upon successfully completing each term, the smart contract automatically moves stakeholder money as further financing. Stakeholders vote on whether or not the step was completed if "YES", the entrepreneur automatically receives the next portion of funds and otherwise unused funds from Vault are returned to investors. The project may or may not have a Bucket to store funds earned along the way. For the Revenue Share, and Debt smart contracts, the entrepreneur must deduct a specified amount of money into the contract's "bucket". Once the business begins to profit, the funds from the bucket are distributed amongst token holders. The accrual of "Revenue Share" and "Debt" contracts is extracted from the bucket at the monthly or weekly payments intervals. The smart contract can be Ethereum based or any suitable cryptocurrency. In another embodiment, instead of investing in the asset, the investor can invest in the entrepreneur himself/herself.

In one embodiment, as detailed in Publication 20130317994 to the instant inventor, the content of which is incorporated by reference, the automated text generation can be used in the framework for converting an idea to tangible asset. An exemplary creative work disclosure view or form receives a title, which is descriptive of the creative work, and should be less than 500 characters. As the user enters text into the title, the software automatically retrieves potentially interesting or similar creative works, references, or publications in the right column. The user can click on each document, and a PDF file for the document will be saved in a project directory and opened for his/her review. The user can use these documents as writing samples, and to see if they are relevant to the user's creative work and if so he/she can focus text and diagrams to focus or emphasize aspects that will differentiate the creative work from the publication or reference. In case the user is not familiar with the format of creative work documents, the PDF document will provide the user with example writing style to follow. The user may want to review the results to see if others have thought of the same creative work already and if so, the user may want to abandon the filing effort. Seeing how similar concepts are described in professionally written creative works may also be helpful to the user in drafting his or her own text and can be an excellent way to learn how creative works are written. Relevant documents are then saved for citing to the government agency when required. The Background section is a brief description of the issues or problems to be solved by the creative work. It sets up the need for the creative work. The user may want to describe existing solutions to these problems. In one implementation, a spell-checker is used to highlight potential errors. Instead of focusing on the shortcomings of existing solutions in the Background section, it may be advantageous to focus on how the user's creative work is superior to existing solution(s), and such description should be positively recited as advantages of the preferred embodiment in the Summary section. The Summary section captures what the user considers to be the highlights of the creative work. The user should describe the creative work at a high level and reference only essential components or elements making up the creative work. Non-essential or optional elements should be described later in the Detailed Description section along with the drawings illustrating their relationships to the essential elements. Alternatively, the user can list the optional elements in a separate paragraph that begins with an introductory sentence such as "Implementations of the system can include one or more of the following". The Background section thus collects basic information about the creative work. The user can enter the title or name of the creative work in the first text region. In the second text region, the user can enter background information relating to the creative work, and in the third text region, the user can enter a brief summary of the creative work.

In editing a figure and describing the figure, a series of drawings is prepared that illustrate the operation of exact embodiments or implementations of the user's creative work. The user will also want to generate drawings for alternative ways to implement the creative work to prevent others from designing-around the implementation of the creative work. The drawings can be done by hand and digitized using a scanner or a camera. Alternatively, the user can generate these diagrams using tools such as PowerPoint and Visio, among others, and import them or directly import images (jpeg or png). If the creative work cannot be illustrated, but can be described using photographs, the user can take pictures of the creative work and include them in the application. The picture can be taken from a standard digital camera or can be done using a tablet or cell phone's camera. After the images have been generated, easy to use tools help users import or capture drawings and describe these drawings in detail. The user can annotate these drawings with numbers up front or can use a tool to place or mark reference numerals for elements. Tools are provided to help the user easily and quickly indicate element names and check consistency of usage from his or her text entry. Thumbnails of each drawing are shown in a top bar. When the user clicks on the image thumbnail, an enlarged figure is shown on the bottom left, while text associated with the figure is shown on the right column.

For example, in one implementation, the user can annotate the drawing by clicking a pointer such as a mouse pointer near the desired area. A box with a red dot appears. The red dot is the tip of a pointer arrow. The user can drag the red dot to point it to the correct spot in the figure where the user wants the text to be associated with. The user can also select the number and move the number to a desired position. The box has an automatically generated number that can be changed. Further, the user can add descriptive text after the number to provide more information. If the user enters text after the number, a colon will be shown to separate the text from the number. During printing of the figure, the descriptive text after the number will be suppressed. When the user clicks a mouse pointer near the desired area, a box with a red dot appears. The red dot is the tip of a pointer arrow. The user can drag the red dot to point it to the correct spot in the figure where the user wants the text to be associated. The user can also select the number and move the number to a desired position. The box has an automatically generated number that can be changed. Further, the user can add descriptive text after the number to provide more information. If the user enters text after the number, a colon will be shown to separate the text from the number. During printing of the figure, the descriptive text after the number will be suppressed. When the user clicks on the pointer or the element number, the number is shown, along with a red dot indicating the tip of the pointer. The user can drag the red dot to point to a desired end target on the drawing. The user can also drag the number to a desired beginning target.

In an exemplary process to generate the detailed description of the creative work, the process gets the initial disclosure as well as noun phrases and requested exclusivity elements. Next, for each reference or noun phrase, the process automatically suggests text for use or alternatively asks the user to provide more details on the element and on the relationship with other elements. The process prompts the user to associate a number with a noun phrase. In one embodiment, the noun phrase is automatically generated for the user and the user can edit/add/delete the number as desired. In another embodiment, the user can directly assign a number to an element. The process then asks the user to generate drawing(s) illustrating the part number on the drawing(s).

Pseudo-code for performing noun phrase detection in a claim is:
    Initialize pointer to current text position in claim.
    If claim is method or process claim:
        Identify all gerund phrases in claim except "comprising/including/having" as antecedent basis candidates. Save noun phrase in an element table for the claim.
    Else repeat until end of claim.
        Identify next occurrence of "the" or "said" and identify potential end of noun phrase. Save noun phrase in an element table for the claim. If noun phrase is gerund+means form, add an entry to cover the "means for"+gerund form.

Look for matching occurrence of "a" or "an" indicating a start of noun phrase and identify potential end of noun phrase. Save noun phrase in an element table for the claim. If noun phrase is gerund+means form, add an entry to cover the "means for"+gerund form.

If no matching occurrence for current claim text and if claim is a dependent claim, search parent claims for antecedent basis.

If all claims have been searched and no match exists, highlight element with "the" or "said" and flag antecedent basis error.

Update pointer to current position.
End if

The process then generates a draft detailed description of the creative work for the government application. The draft description is simply an organized document containing the descriptions of the elements and noun phrases in a logical order. This can be done by following the claim sequencing in one embodiment. Alternatively, the system can follow the sequence provided in the creative work disclosure and insert the additional text with the reference and reference numerals according to the sequence of the disclosure. In other embodiments, the process can generate text based on a predetermined order of the reference numerals. The process allows the user to review, revise and edit the draft description as appropriate. Once the user accepts the draft, the process saves the description text as the final version.

To create money to support the students and the educational institutions, the system can monetize the Creative assets by selling and/or licensing the Creative assets. The system can auction one creative work at a time on an auction site similar to ebay, for example. In such as system, interested parties bid on the asset and the highest bidder is awarded the asset.

One embodiment provides the ability to provide a pricing request associated with a single Creative asset. The method includes receiving one or more orders for each IP listing symbol, selecting an order from the one or more orders with consideration of available volume, associated prices, and applying the process to a portfolio of assets wherein an optimized asset pricing across the portfolio is presented to the seller in association with the request to optimize the pricing of a single or multiple asset order in a form which includes, but is not limited to, a list of symbols and associated transaction size and price.

Unique to a market for structured IP products is the ability to list single assets for sale under multiple listing symbols, in accordance with an embodiment of the present creative work. Such work can be tied to a blockchain entry. The ability to list a portfolio of single assets represented by a plurality of technology codes or listing symbols enables sellers and buyers to maximize revenue generated by the sale of the assets or minimize the expense generated by the purchase of the assets, respectively. In the improved systems, methods, and computer program products, a seller of the structured Creative assets requests the technology codes or listing symbols, which would represent the optimal price for the possible sale of an asset or portfolio of assets. In a variation, a buyer is provided with the optimal technology code or listing symbol or symbols for the purchase of an asset or portfolio of assets.

Another embodiment includes receiving, by one or more computing devices, an inventory description of an Creative asset for sale; generating, by the one or more computing devices, plurality of sell orders each representing the Creative asset using a different combination of attributes of the Creative asset, wherein the attributes represent characteristics of technology; prioritizing, by the one or more computing devices the plurality of sell orders to generate an order posting subset of the plurality of sell orders in accordance with historical data associated with the plurality of sell orders; and posting, by the one or more computing devices, the Creative asset for sale under each of the sell orders of the order posting subset concurrently, wherein each of the sell orders of the of the order posting subset is usable to match a buy order with the Creative asset, and wherein matching the buy order with any one of the sell orders of the order posting subset cancels the remaining of the sell orders of the order posting subset.

The system can post the asset for sale under each of the sell orders of the order posting subset concurrently comprises posting the Creative asset for sale using a plurality of listing symbols assigned to the Creative asset.

The organized electronic marketplace will be referred to by several names throughout this disclosure, including by reference to components such as a brokerage system. One skilled in the relevant arts will appreciate that behavior attributed to any of these components can be allocated to different components of the overall system while achieving the same desired effect.

The process begins where the creative asset company makes available access rights and audience profile access rights within the organized electronic market for structured Creative assets queries third party publisher traffic/volume data (e.g., analytic data) to establish its future capacity to create commercialization opportunities and audience profile access opportunities.

The creative asset Buyer provides viewer profile data and displays creative asset inventory data to the brokerage system, in accordance with an embodiment of the creative work. With the necessary data for verification of the structured Creative assets available, the brokerage system then cleanses the data, in accordance with an embodiment of the present creative work. In particular, the data from various supported external third-party analytics providers (e.g., Thomson, Lexis, among others) is reviewed to delete anomalies in the data likely to represent errors or nonconforming asset structures.

Once the verification data has been imported and cleansed, the data can be reviewed for approval, in accordance with an embodiment of the present creative work. With the data approved, it is possible to create and allocate assets into the creative asset Buyer's account with the brokerage system. The profile data and the traffic/volume data are combined, and the system then parses the data at step 106 in preparation to post the assets to the publisher's account (IP Producer's account), in accordance with an embodiment of the present creative work. Parsing the data allows the brokerage system to account for a variety of third-party analytics providers, each having their own unique formats for publishing analytics data.

In accordance with a further embodiment of the present creative work, if the inventory to be offered by the Audience Producer represents online display advertising inventory, then the brokerage system checks for the validity of the display space inventory by querying the location of the display space. If the system finds that the descriptive display space data does not match the results of the query, the system will assign an expired or error status to the display space access right and remove the inventory from the Audience Producer's account. When the brokerage system finds that the descriptive display space data matches what is queried, or alternatively when the media is not callable (e.g., offline assets, although one skilled in the relevant arts will appreciate that these techniques can be converted for application to other non-web assets), the inventory is processed through the symbology assignment process, which is described in further detail below, in accordance with an embodiment of the present creative work. Once symbols have been assigned to the asset, the Audience Producer instructs the brokerage system to offer its inventory for sale at step 109, in accordance with an embodiment of the present creative work. In particular, once the Audience Producer's inventory has been verified, had symbols assigned, and posted to the Audience Producer's account, the Audience Producer can then sell or otherwise trade on their inventory. By way of non-limiting example, the Audience Producer can trade their inventory through the offer posting process and the bid/offer matching process.

In the above example, the brokerage system is configured to use the data imported to estimate the number of creative workspace access rights and audience profile access rights that will be available for advertising placement during a broadcast. The creative asset Producer additionally imports publishers display space inventory data, which describes the attributes of the display space made available by the creative asset Producer. The creative workspace descriptive data and the audience profile data are then cleansed where anomalies in the data likely to represent errors or non-conforming asset structures may be discovered and removed.

With the data cleansed, the brokerage system approves the data for processing. The brokerage system then parses the data to assign individual display space attributes to a creative workspace access right asset and audience profile attribute to an audience profile access right asset, in accordance with an embodiment of the present creative work.

For creative workspace access rights, the system may, subject to certain parameters, automatically verify the presence and characteristic of the creative workspace. If the system finds that the descriptive creative workspace data does not match what is queried by the buyer, the system will assign an expired or error status to the access right and remove the inventory from the creative asset Producer's account. If everything is in order, the assets are provided with symbology through the symbology assignment process. The assets are then posted to the creative asset Producer's (publisher) account. Once the assets are in the account the creative asset Producer (e.g., inventor) may offer inventory for sale from the assets in the account, using a user interface provided by the brokerage system. With an offer to sell in place, the offer is processed through the offer posting process and then the bid/offer matching process to initiate the transaction in accordance with an embodiment of the present creative work.

One embodiment takes an entity's portfolio of assets and groups them into assets that can be subject to a floating privilege and those that the entity does not make available to others. The portfolio of assets represents the total set of assets the entity owns that could be subject to transfer to another. The entity, also referred to as the asset portfolio owner, or portfolio owner, is a corporation and assets are assets and creative works in particular. It will be understood that the assets are not limited to creative work or assets, but can be other types of assets in which rights can be transferred to others. The portfolio owner might own thousands of creative works (P). In this example, the creative asset owner owns "n" creative works, where n is a positive integer. The creative asset owner, in this example, has designated "m" of its creative works P1 to Pm as eligible for selection for transfer to the holders of a floating privilege upon the occurrence of a predetermined event, thereby forming a floating privilege pool, where m is a positive integer less than n. This floating privilege pool is also referred to as a dynamic asset pool, or more simply a "pool". In this example, three of the creative asset owner's clients, A, B and C, each have purchased a floating privilege for the assets in the floating privilege pool 101. The creative asset owner's remaining creative works, Pm+1 to Pn, are not included in the floating privilege pool, but rather are held by the creative asset owner for its own exclusive use. Although creative works P1 to Pm are shown in the floating privilege pool, the specific creative works in the pool may change due to the dynamic nature of the pool. The portfolio owner's portfolio of assets 100 can be divided into a floating privilege pool containing creative works P1 to Pm and also contains a custom floating privilege pool. The custom floating privilege pool contains creative works Pm+1 to Pp, where p is a positive integer greater than m and less than n. In this embodiment client D has contracted with the creative asset owner to have a floating privilege to the custom floating privilege pool. Custom pool is a dynamic asset pool in that the creative works within the pool can change over time. Alternatively, client D can agree with the creative asset owner to limit the changes to the custom pool. For example, the contract between the creative asset owner and client D can specify that the certain creative works remain in the custom pool while others may change. The portfolio owner's portfolio of assets also divided into a floating privilege pool 101 containing creative works P1 to Pm and containing a custom floating privilege pool. The remaining creative works in the portfolio consist of creative works Pp+1 to Pn. The custom floating privilege pool 303 contains creative works that also are included in the floating privilege pool. Accordingly, the custom floating privilege pool contains creative works Pm-q to Pp, where q is a positive integer less than m and p is greater than m and less than n. Creative works Pm-q to Pm are common to both the floating privilege pool and the custom floating privilege pool since they are contained in both pools. Accordingly, clients A, B, C and D each have a floating privilege for the common assets in the two pools.

Due to the diversity of the creative work portfolio, the creative asset company can extract value from a portfolio of assets, for example creative works, utilizing a floating privilege, for example a floating assignment privilege, is summarized by granting to a client for consideration by an asset portfolio owner a floating privilege to a dynamic set of assets, such as a set of creative works, wherein the floating privilege is a right to obtain an interest in one or more of the assets in the dynamic set upon the occurrence of a predetermined event. By employing the techniques described here, a client that lacks a large asset portfolio can have access to the creative asset collective owner's portfolio in a time of need. The client rights to these assets could be publicized so that anyone considering suing the client would have to consider all of the assets at the client's disposal for counterclaims. In this way, a floating privilege to a dynamic asset pool provides both a deterrent value and an enhanced ability for the client to fend off such lawsuits. The right, or option, is not for any specific asset, since the set of assets is considered to be dynamic following the establishment of a floating privilege. The set or pool of assets is dynamic because no particular asset is guaranteed to exist at a later time. The right to obtain an interest in one or more of the assets is a privilege that is not tied to any particular asset in the pool of assets, but rather floats over the assets so that it can be applied to any of the assets in the pool. When the privilege is executed, an interest is obtained to one or more assets selected from the presently available assets within the dynamic set of assets at the time the privilege is executed. By agreement, while the set of assets covered by the floating privilege is dynamic, the number of assets in the set is typically constrained in some way to ensure continuing value to the client.

An example of such a predetermined event can be the initiation of a creative work infringement action by a third party against the client. The client can then use the floating privilege to select one or more creative works from among the set of assets associated with the privilege to assert against the third party. Executing the privilege can include granting sufficient rights in the selected creative works to give the client standing to sue the third party for infringement of those creative works. For example the client can be granted an exclusive license in the creative works or the selected creative works can be assigned to the client. A predetermined event, as used within the context of this specification for the purpose of executing a floating privilege, may be referred to herein as a "trigger event". Thus, clients A-D can buy creative work infringement insurance from the creative work pool owner who in turn uses the money to pay at least a portion of the students/educational institution.

The system can operate with edge computing-moving computation and data storage away from large centers and relying more heavily on local storage and caching, with reduced energy footprints. One embodiment relies on transformers in the cellular base stations located near a mobile device (such as transformers running on a 5G base station in communication with a mobile device).

Embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions. Computer readable program instructions described herein can be stored in memory or downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. Computer readable program instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk®, C++, or the like, and procedural programming languages, such as the "C" programming language or similar programming languages. Python® has a large amount of libraries that are super handy for implementing sentiment analysis or machine learning from scratch. NLTK, or the Natural Language Toolkit, is one of the leading libraries for building Natural Language Processing (NLP) models, thus making it a top solution for sentiment analysis. It provides useful tools and algorithms such as tokenizing, part-of-speech tagging, stemming, and named entity recognition. SpaCy® is an industrial-strength NLP library in Python® which can be used for building a model for sentiment analysis. It provides interesting functionalities such as named entity recognition, part-of-speech tagging, dependency parsing, and word vectors, along with key features such as deep learning integration and convolutional neural network models for several languages. Scikit-learn is a machine learning toolkit for Python® that is excellent for data analysis. It features classification, regression, and clustering algorithms. TensorFlow is the dominant framework for machine learning in the industry. It has a comprehensive ecosystem of tools, libraries, and community resources that lets developers implement state-of-the-art machine learning models. PyTorch is another popular machine learning framework that is mostly used for computer vision and natural language processing applications. Developers love PyTorch® because of its simplicity; it's very pythonic and integrates really easily with the rest of the Python ecosystem. PyTorch also offers a great API, which is easier to use and better designed than TensorFlow's API. Keras® is a neural network library written in Python that is used to build and train deep learning models. It is used for prototyping, advanced research, and production. CoreNLP is Stanford's proprietary NLP toolkit written in Java with APIs for all major programming languages to extract the base of words, recognize parts of speech, normalize numeric quantities, mark up the structure of sentences, indicate noun phrases and sentiment, extract quotes, and much more. OpenNLP is an Apache toolkit designed to process natural language text with machine learning and supports language detection, tokenization, sentence segmentation, part-of-speech tagging, named entity extraction, chunking, parsing, and conference resolution. Wekas is comprised of a set of machine learning algorithms for data mining tasks. It includes tools for data preparation, classification, regression, clustering, association rules mining, and visualization. R is a programming language that is mainly used for statistical computing. Its most common users include statisticians and data miners looking to develop data analysis. Caret package includes a set of functions that streamline the process of creating predictive models. It contains tools for data splitting, pre-processing, feature selection, model tuning via resampling, and variable importance estimation. Mlr is a framework that provides the infrastructure for methods such as classification, regression, and survival analysis, as well as unsupervised methods such as clustering.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments.

Additionally, it is understood in advance that the teachings recited herein are not limited to a particular computing environment. Rather, embodiments are capable of being implemented in conjunction with any type of computing environment now known or later developed. For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. The software/system may be offered based the following service models:

Software as a Service (Saas): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

A cloud computing environment is service oriented with a focus on statelessness, low coupling, modularity, and semantic interoperability. At the heart of cloud computing is an infrastructure comprising a network of interconnected nodes. Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT®.NET®, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims or requested exclusivity rather than by the foregoing description. All changes that come within the meaning and range of equivalency of the requested exclusivity are to be embraced within their scope.

What is claimed is:

1. A method to generate a document having a predetermined outline, comprising:
   providing a user interface to receive a first text to plan a document structure from the first text, wherein the document structure comprises the predetermined outline;
   searching one or more sources to locate one or more second texts matching the first text;
   providing the first text and the one or more second texts to automatically expand into one or more artificial intelligence context-sensitive texts using a transformer with a decoder that produces a text expansion to provide the context-sensitive text based on the first text and the one or more second texts by applying generative artificial intelligence with normalization and tokenization with zero-shot, one-shot or some-shot generation of the one or more artificial intelligence context-sensitive texts from the first text and the one or more second texts, wherein the transformer receives a stream of tokens with an attention mask at one or more self-attention layers, and a causal mask is used for the text tokens;
   generating the document with the predetermined outline by combining the generated artificial intelligence context-sensitive text based on the predetermined outline and the first text and the one or more second texts, wherein the first text or the one or more second texts comprises a chapter or section overview; and
   wherein the generated document comprises the chapter or section outline expanded with the generated artificial intelligence context-sensitive text.

2. The method of claim 1, wherein the generated document comprises a fiction work, a non-fiction work, a computer readable code, a machine specification, a patent application, a blog, a legal document, a response to a query, a response to a search, a marketing content, or a mechanical description.

3. The method of claim 1, wherein the document structure comprises one or more figures, wherein each of the one or more figures comprises a brief description of the drawing, a figure description overview, and an artificial-intelligence-generated detailed description of the figure from component texts corresponding to items in the figure.

4. The method of claim 1, further comprising combining a title and a machine generated background text with the first text and providing the combined title, background, and the first text to a learning machine to synthesize artificial intelligence context-sensitive text.

5. The method of claim 1, further comprising: extracting one or more reference signs from a figure and annotating each the one or more reference signs with a part name; and forming an artificial intelligence-generated reference text suggestion from the one or more reference signs.

6. The method of claim 1, wherein the transformer comprises a generative pre-trained transformer (GPT) model or a BERT (Bidirectional Encoder Representations from Transformers) model.

7. The method of claim 1, further comprising:
   determining when component, module, code, data structure, or image perform a similar task and showing the determined component, module, code, data structure, or image to a user and breaking-down the one or more second texts into one or more alternate components with different component text and show the one or more alternate components as an artificial-intelligence-generated design satisfying the first text or the one or more second texts.

8. The method of claim 1, further comprising:
   generating a part list by detecting noun phrases (NPs) in the generated document and corresponding numbers for the NPs.

9. The method of claim 1, wherein the generated document comprises a response to a query.

10. The method of claim 1, wherein the generated document comprises a patent application.

11. The method of claim 10, further comprising from one or more sets of input text, generating artificial intelligence context-sensitive text for at least one of: a title, a background, a summary, a description, additional claims and an abstract.

12. The method of claim 10, further comprising:
    detecting at least one of: an error, an antecedent basis error, a claim support error, and a functional language.

13. The method of claim 10, further comprising:
    generating one or more figures or drawings from a user specification.

14. The method of claim 1, further comprising:
    responding to the first text by searching for one or more responsive documents to supplement the first text and applying the generative artificial intelligence to provide a search result.

15. The method of claim 1, further comprising: generating a multimedia file, a blog, a book, a story, a legal document, a business document, a plan, or a chatbot response.

16. The method of claim 1, further comprising:
    receiving a document as a the first text and applying generative artificial intelligence to generate a response to a query based on the document.

17. The method of claim 1, further comprising iteratively searching the first text or the one or more second texts.

18. A system to generate a document having a predetermined outline, the system comprising:
    a processor; and
    a data storage storing computer readable code, that when executed by the processor, cause the system to perform operations, the operations comprising:
       providing a user interface to receive a first text to plan a document structure from the first text, wherein the document structure comprises the predetermined outline;
       searching one or more sources to locate one or more second texts matching the first text;
       providing the first text and the one or more second texts to automatically expand into one or more artificial intelligence context-sensitive texts using a transformer with a decoder that produces a text expansion to provide the context-sensitive text based on the first text and the one or more second texts by applying generative artificial intelligence with normalization and tokenization with zero-shot, one-shot or some-shot generation of the one or more artificial intelligence context-sensitive texts from the first text and the one or more second texts, wherein the transformer receives a stream of tokens with an attention mask at one or more self-attention layers, and a causal mask is used for the text tokens;

generating the document with the predetermined outline by combining the generated artificial intelligence context-sensitive text based on the predetermined outline and the first text and the one or more second texts, wherein the first text or the one or more second texts comprises a chapter or section overview; and wherein the generated document comprises the chapter or section outline expanded with the generated artificial intelligence context-sensitive text.

19. The system of claim 18, wherein the operations further comprises iteratively searching the first text or the one or more second texts.

* * * * *